(12) United States Patent  
Endo et al.

(10) Patent No.: US 8,350,790 B2  
(45) Date of Patent: Jan. 8, 2013

(54) VIDEO DISPLAY SYSTEM

(75) Inventors: Taro Endo, Tokyo (JP); Yoshihiro Maeda, Tokyo (JP); Hirotoshi Ichikawa, Tokyo (JP); Fusao Ishii, Menlo Park, CA (US)

(73) Assignees: Silicon Quest Kabushiki-Kaisha (JP); Olympus Corporation (JP)

( * ) Notice: Subject to any disclaimer, the term of this patent is extended or adjusted under 35 U.S.C. 154(b) by 971 days.

(21) Appl. No.: 12/381,635

(22) Filed: Mar. 13, 2009

(65) Prior Publication Data

US 2009/0180039 A1    Jul. 16, 2009

Related U.S. Application Data

(63) Continuation-in-part of application No. 11/827,455, filed on Jul. 11, 2007, and a continuation-in-part of application No. 11/121,543, filed on May 4, 2005, now Pat. No. 7,268,932, and a continuation-in-part of application No. 10/698,620, filed on Nov. 1, 2003, now abandoned, said application No. 11/121,543 is a continuation-in-part of application No. 10/698,620, and a continuation-in-part of application No. 10/699,140, filed on Nov. 1, 2003, now Pat. No. 6,862,127, and a continuation-in-part of application No. 10/699,143, filed on Nov. 1, 2003, now Pat. No. 6,903,860.

(60) Provisional application No. 61/069,420, filed on Mar. 15, 2008.

(51) Int. Cl.  
G09G 3/34    (2006.01)

(52) U.S. Cl. ............ 345/84; 345/82; 345/690; 348/383; 359/630

(58) Field of Classification Search ............... 345/87–89, 345/690, 82–84; 348/383; 359/630, 631  
See application file for complete search history.

(56) References Cited

U.S. PATENT DOCUMENTS

| | | |
|---|---|---|
| 4,771,331 A | 9/1988 | Bierling et al. |
| 5,214,420 A | 5/1993 | Thompson et al. |
| 5,448,314 A | 9/1995 | Heimbuch et al. |
| 5,537,258 A | 7/1996 | Yamazaki et al. |
| 5,572,258 A | 11/1996 | Yokoyama |
| 5,589,852 A | 12/1996 | Thompson et al. |
| 5,617,243 A | 4/1997 | Yamazaki et al. |
| 5,668,611 A | 9/1997 | Ernstoff et al. |
| 5,751,379 A | 5/1998 | Markandey et al. |
| 5,767,828 A | 6/1998 | McKnight |
| 5,917,558 A | 6/1999 | Stanton |
| 5,920,299 A * | 7/1999 | Ohshima et al. ............... 345/88 |
| 6,278,736 B1 | 8/2001 | De Haan et al. |
| 6,633,301 B1 * | 10/2003 | Dallas et al. ................. 345/597 |
| 6,897,884 B2 | 5/2005 | Tsuge et al. |
| 6,911,963 B2 * | 6/2005 | Baba et al. ..................... 345/88 |
| 2006/0181653 A1 | 8/2006 | Morgan |
| 2007/0120786 A1 | 5/2007 | Bellls et al. |
| 2008/0068359 A1 | 3/2008 | Yoshida et al. |

* cited by examiner

Primary Examiner — Kimnhung Nguyen  
(74) Attorney, Agent, or Firm — Bo-In Lin

(57) ABSTRACT

A video display system includes a plurality of primary color light sources; and a spatial light modulator (SLM) for modulating an illumination light emitted from at least one of the plurality of primary light sources. The video display system further includes a display controller for controlling a process to display a sequence of video images within a period of one frame comprising each of a plurality of primary colors and each of a plurality of complementary colors to minimize a number of emissions of each of the plurality of primary color light sources and also displaying the video images of the colors of the plurality of primary colors and the plurality of complementary colors in sequence.

28 Claims, 58 Drawing Sheets

VIDEO DISPLAY SYSTEM

CROSS REFERENCE TO RELATED APPLICATIONS

This application is a Non-provisional Application of a Provisional Application 61/069,420 filed on Mar. 15, 2008 and a Continuation in Part Application of another Non-provisional patent application Ser. No. 11/827,455 filed on Jul. 11, 2007 and Ser. No. 11/121,543 filed on May 4, 2005 issued into U.S. Pat. No. 7,268,932 and another Non-provisional application Ser. No. 10/698,620 filed on Nov. 1, 2003 now abandoned. The application Ser. No. 11/121,543 is a Continuation In Part (CIP) Application of three previously filed Applications. These three applications are Ser. No. 10/698,620 filed on Nov. 1, 2003, Ser. No. 10/699,140 filed on Nov. 1, 2003 now issued into U.S. Pat. No. 6,862,127, and Ser. No. 10/699,143 filed on Nov. 1, 2003 now issued into U.S. Pat. No. 6,903,860 by the Applicant of this patent applications. The disclosures made in these patent applications are hereby incorporated by reference in this patent application.

BACKGROUND OF THE INVENTION

1. Field of the Invention

The present invention relates to a video display system which generates and displays the frame signal of an output video signal at a higher frame rate than that of an input video signal from the frame signal of a continuously inputted video signal.

2. Description of the Related Art

After the dominance of CRT technology in the display industry for over 100 years, Flat Panel Display (FPD) and Projection Display have gained popularity because of their space efficiency and larger screen size. Projection displays using micro-display technology are gaining popularity among consumers because of their high picture quality and lower cost. There are two types of micro-displays used for projection displays in the market. One is micro-LCD (Liquid Crystal Display) and the other is micro-mirror technology. Because a micro-mirror device uses un-polarized light, it produces better brightness than micro-LCD, which uses polarized light.

Although significant advances have been made in technologies of implementing electromechanical micro-mirror devices as spatial light modulators, there are still limitations in their high quality images display. Specifically, when display images are digitally controlled, image quality is adversely due to an insufficient number of gray scales.

Electromechanical micro-mirror devices have drawn considerable interest because of their application as spatial light modulators (SLMs). A spatial light modulator requires an array of a relatively large number of micro-mirror devices. In general, the number of required devices ranges from 60,000 to several million for each SLM. Referring to FIG. 1A, an image display system 1 including a screen 2 is disclosed in a relevant U.S. Pat. No. 5,214,420. A light source 10 is used to generate light beams to project illumination for the display images on the display screen 2. The light 9 projected from the light source is further concentrated and directed toward lens 12 by way of mirror 11. Lenses 12, 13 and 14 form a beam collimator operative to columnate the light 9 into a column of light 8. A spatial light modulator 15 is controlled by a computer through data transmitted over data cable 18 to selectively redirect a portion of the light from path 7 toward lens 5 to display on screen 2. FIG. 1B shows a SLM 15 that has a surface 16 that includes an array of switchable reflective elements 17, 27, 37, and 47, each of these reflective elements is attached to a hinge 30. When the element 17 is in an ON position, a portion of the light from path 7 is reflected and redirected along path 6 to lens 5 where it is enlarged or spread along path 4 to impinge on the display screen 2 to form an illuminated pixel 3. When the element 17 is in an OFF position, the light is reflected away from the display screen 2 and, hence, pixel 3 is dark.

The on-and-off states of the micromirror control scheme, as that implemented in the U.S. Pat. No. 5,214,420 and in most conventional display systems, impose a limitation on the quality of the display. Specifically, applying the conventional configuration of a control circuit limits the gray scale gradations produced in a conventional system (PWM between ON and OFF states), limited by the LSB (least significant bit, or the least pulse width). Due to the ON-OFF states implemented in the conventional systems, there is no way of providing a shorter pulse width than the duration represented by the LSB. The least quantity of light, which determines the gray scale, is the light reflected during the least pulse width. The limited levels of the gray scale lead to a degradation of the display image Specifically, FIG. 1C exemplifies, as related disclosures, a circuit diagram for controlling a micromirror according to U.S. Pat. No. 5,285,407. The control circuit includes memory cell 32. Various transistors are referred to as "M*" where "*" designates a transistor number and each transistor is an insulated gate field effect transistor. Transistors M5, and M7 are p-channel transistors; transistors, M6, M8, and M9 are n-channel transistors. The capacitances, C1 and C2, represent the capacitive loads in the memory cell 32. The memory cell 32 includes an access switch transistor M9 and a latch 32a based on a Static Random Access switch Memory (SRAM) design. All access transistors M9 on a Row line receive a DATA signal from a different Bit-line 31a. The particular memory cell 32 is accessed for writing a bit to the cell by turning on the appropriate row select transistor M9, using the ROW signal functioning as a Word-line. Latch 32a consists of two cross-coupled inverters, M5/M6 and M7/M8, which permit two stable states that include a state 1 when is Node A high and Node B low, and a state 2 when Node A is low and Node B is high.

The control circuit positions the micro-mirrors to be at either an ON or an OFF angular orientation, as that shown in FIG. 1A. The brightness, i.e., the number of gray scales of display for a digitally control image system, is determined by the length of time the micro-mirror stays at an ON position. The length of time a micromirror is in an ON position is controlled by a multiple bit word.

FIG. 1D shows the "binary time intervals" when controlling micromirrors with a four-bit word. As shown in FIG. 1D, the time durations have relative values of 1, 2, 4, 8, which in turn define the relative brightness for each of the four bits where "1" is the least significant bit and "8" is the most significant bit. According to the control mechanism as shown, the minimum controllable differences between gray scales for showing different levels of brightness is a represented by the "least significant bit" that maintains the micromirror at an ON position.

For example, assuming n bits of gray scales, one time frame is divided into $2^n-1$ equal time periods. For a 16.7-millisecond frame period and n-bit intensity values, the time period is $16.7/(2^n-1)$ milliseconds.

Having established these times for each pixel of each frame, pixel intensities are quantified such that black is a 0 time period, the intensity level represented by the LSB is 1 time period, and the maximum brightness is $2^n-1$ time periods. Each pixel's quantified intensity determines its ON-time during a time frame. Thus, during a time frame, each pixel with a quantified value of more than 0 is ON for the number of time periods that correspond to its intensity. The viewer's eye integrates the pixel brightness so that the image appears the same as if it were generated with analog levels of light.

For controlling deflectable mirror devices, the PWM applies data to be formatted into "bit-planes", with each bit-plane corresponding to a bit weight of the intensity of light. Thus, if the brightness of each pixel is represented by an n-bit value, each frame of data has the n-bit-planes. Then, each bit-plane has a 0 or 1 value for each mirror element. According to the PWM control scheme described in the preceding paragraphs, each bit-plane is independently loaded and the mirror elements are controlled according to bit-plane values corresponding to the value of each bit during one frame. Specifically, the bit-plane according to the LSB of each pixel is displayed for 1 time period.

Among conventional display systems, there is a system which generates and displays the frame signal of an output video signal at a higher frame rate than that of an input video signal from the frame signal of a continuously inputted video signal.

A system which displays a video image using a display device, such as a liquid crystal display (LCD) panel, retains one frame of video image information of each pixel for a single frame period and is enabled to display a smooth video image with little shaking of a dynamic image by generating and displaying an output video signal with a 120 Hz frame rate from an input video signal with a 60 Hz frame rate.

FIG. 2 is a diagram showing an example of generating a 120 Hz high frame rate output video signal from a 60 Hz frame-rate input video signal. This example is configured to generate anew the video signal of one frame on the basis of information from two adjacent frames of an input video signal, insert the generated video signal in between the aforementioned two input video signals, and generate anew a continuous video signal, and thereby a higher frame rate output video signal than the input video signal is generated. Incidentally, in the example shown in FIG. 2, the video image of the input video signal is the image of a ball moving from the bottom left to the top right. Further, the inputted video signal of each frame has 10-bit gray scale data for each pixel, and the video signal of a frame generated from the video signal of the two adjacent frames of the input video signal also has 10-bit gray scale data for each pixel. Therefore, the gray scale level of intensity (i.e., brightness) perceived by the human eye, in this example, is the same between the input video signal and the output video signal.

In order to more smoothly display the motion of a video image, it is desirable to use a video signal with a higher frame rate to display the image.

More specifically, the conventional method for generating a continuous video signal having a higher frame rate from a video signal continuously inputted at a specific frame rate, described above, includes a method of detecting the moving portion of the video image from the continuously inputted video signal and generating a new video signal of a frame so as to interpolate the motion. The conventional method also includes a method of generating a video signal of an interpolation frame by determining the intensity of each pixel constituting the video image of a frame to be interpolated on the basis of the change in the intensity information of each pixel constituting the aforementioned continuously inputted video signal.

Such techniques for generating and displaying the output video signal from an input video signal at a higher frame rate than that of the input video signal are disclosed in, among others, U.S. Pat. No. 4,771,331, JP2007-166050A, and WO/1997/046022. In recent years, such techniques enable the generating and displaying of video signals of a high frame rate in excess of 240 Hz without degrading the image quality of a video signal which is inputted at a 60 Hz frame rate.

Furthermore, in a display system employing a color sequential display method, it is also possible to prevent the color breakup phenomena by carrying out a display using a high frame rate video signal. In a display system such as an LCD display system, however, if a high frame rate video signal is generated by a video image processing apparatus, such as a video processor, and if the generated video signal is displayed, problems occur such as an increased load taken up by the display processing and lower response speed, thus limiting the simple improvement of a frame rate of the video signal to be displayed.

FIG. 3 is a diagram showing an example of generating a 360 Hz high-frame rate output video signal from a 60 Hz frame rate input video signal in a display system employing a color sequential display method. More specifically, the video image of the input video signal is the image in which a ball is moving from the bottom left to the top right, also shown in FIG. 3.

Referring to FIG. 3, if the input video signal is a color video signal constituted by an RGB (red, green and blue) signal and if the video signal of the frame has 10-bit gray scale data for each of the respective colors R, G and B for each pixel, a high frame rate output video signal is preferably generated so that the video signal of the frame has 10-bit gray scale data for each of the respective colors R, G and B for each pixel. In order to accomplish this, however, it is necessary to drastically improve the processing speed of the video image processing apparatus used for generating the new video signal of the frame by processing the input video signal, and to increase the memory space used for temporarily storing the video signals of a plurality of frames of the input video signal or the generated video signals of the frames.

Specifically, if an output video signal with a 360 Hz frame rate is to be generated, and if the video signal of the frame is to have 10-bit gray scale data for each of the respective colors R, G and B, it is necessary to use a video image processing apparatus having at least three times the processing speed and three times the memory space than when generating a 120 Hz frame rate output video signal from a 60 Hz frame rate input video signal, as shown in FIG. 3. This introduces the problems of an enlarged system size and a substantial cost increase.

Moreover, while it is necessary to provide a display system enabled to display a video image at three times the speed of the current rate, if such a system cannot be employed due to the problems described above, the information volume of each frame signal of a video signal to be displayed needs to be decreased to a third.

SUMMARY OF THE INVENTION

In consideration of the above-described limitations and difficulties, one aspect of the present invention is to provide a video display system to increase the gray scale levels of a video image perceived by the human eye while decreasing the amount of data in a frame signal required to process at a high frame rate for reducing the load of video image processing and display processing of an image display system.

In order to accomplish the aim described above, a video display system according to a first exemplary embodiment of the present invention includes a video display system includes a plurality of primary color light sources; and a spatial light modulator (SLM) for modulating an illumination light emitted from at least one of the plurality of primary light sources. The video display system further includes a display controller for controlling a process to display a sequence of video images within a period of one frame comprising each of a plurality of primary colors and each of a plurality of complementary colors to minimize a number of emissions of each of the plurality of primary color light sources and also displaying the video images of the colors of the plurality of primary colors and the plurality of complementary colors in sequence.

A video display system according to a second exemplary embodiment of the present invention includes a plurality of primary color light sources; and a spatial light modulator (SLM) for modulating an illumination light emitted from at least one of the plurality of primary light sources, wherein a display controller for controlling a process to display a sequence of video images within a period of one frame comprising of each of a plurality of primary colors and each of a plurality of complementary colors to maximize a number of emissions of each of the plurality of primary color light sources and also displaying the video images of the colors of the plurality of primary colors and the plurality of complementary colors in sequence.

A video display system according to a third exemplary embodiment of the present invention includes an image processing unit receives continuously an input video signal including input frame signals for generating an output video signal having a higher frame rate than the input video signal; and a spatial light modulator (SLM) applies the output video signal for modulating an illumination light, wherein the image processing unit further receives an individual frame signal of the input video signal into a frame for sequentially displaying a plurality of sub-frame video images in different colors within a display frame, and the image processing unit further generates the output video signal includes a frame signal for sequentially displaying the sub-frame video images of different colors, wherein a number of gray scale levels of a sub-frame video image of each color of the output video signal is smaller, or smaller in a part of sub-frame images, than a number of gray scale levels of a sub-frame video image of each color of the input video signal.

A video display system according to a fourth exemplary embodiment of the present invention includes an image processing unit receives continuously an input video signal including input frame signals for generating an output video signal including output frame signals having a higher frame rate than the input frame signals; and a spatial light modulator (SLM) applies the output frame signals for modulating an illumination light, wherein the input frame signal comprises signals to sequentially display sub-frame video images of a plurality of colors, and the image processing units generates the output video signal includes sub-frame signals of the plurality of colors applied to the SLM to carry out a modulation process to sequentially display the sub-frame video images of the plurality of colors.

BRIEF DESCRIPTION OF THE DRAWINGS

The present invention is described in detail below with reference to the following Figures.

DESCRIPTION OF THE PREFERRED EMBODIMENTS

Preferred embodiments according to the present invention are described below with reference to the accompanying drawings.

First Preferred Embodiment

Figure 4:
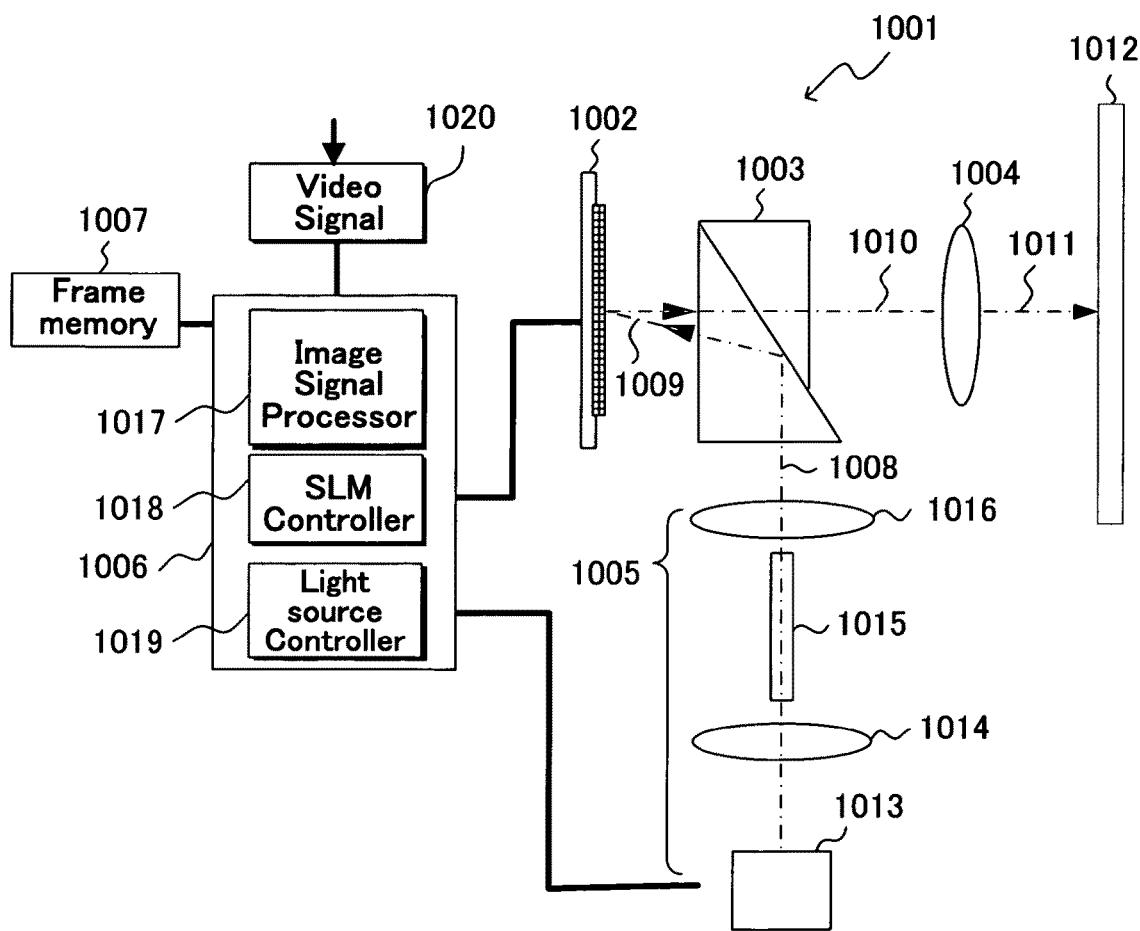
FIG. 4 is a functional block diagram showing an exemplary configuration of a video display system according to a preferred embodiment of the present invention.

FIG. 4 is a diagram showing an exemplary configuration of a video display system according to a preferred embodiment of the present invention.

As shown in FIG. 4, the video display system 1001 includes one spatial light modulator (SLM) 1002, a total internal reflection (TIR) prism 1003, a projection optical system 1004, a light source optical system 1005, a display processing unit 1006, and frame memory 1007.

The SLM 1002 and TIR-prism 1003 are place in the optical axis of the projection optical system 1004, and the light source optical system 1005 is placed in such a manner that its optical axis is aligned with that of the projection optical system 1004.

The TIR prism 1003 causes an illumination light 1008, incoming from the light source optical system 1005 placed onto the side, to enter the SLM 1002 at a prescribed inclination angle as incident light 1009 and causes a reflection light 1010, reflected by the SLM 1002, to transmit to the projection optical system 1004.

The projection optical system 1004 projects the reflection light 1010, incoming by way of the SLM 1002 and TIR prism 1003, as projection light 5603 onto a screen 1012 or the like.

The light source optical system 1005 comprises a variable light source 1013 for generating the illumination light 1008, a first condenser lens 1014 for focusing the illumination light 1008, a rod type condenser body 1015, and a second condenser lens 1016.

The variable light source 1013, first condenser lens 1014, rod type condenser body 1015, and second condenser lens 1016 are sequentially placed in the aforementioned order in the optical axis of the illumination light 1008 emitted from the variable light source 1013.

The variable light source 1013 includes a red (R) semiconductor light source, a green (G) semiconductor light source, and a blue (B) semiconductor light source (not shown in the drawing), which allow independent controls for the light emission states. More specifically, the semiconductor light source may employ a laser light source, a light emitting diode (LED), or the like. Here, the assumption is that a laser light source is employed. Therefore, the R, G and B laser lights may be used as the illumination light 1008 by controlling the R, G and B laser light sources to emit light. Additionally, a synthesized light constituted by two or more of the three laser light sources R, G and B may be used as the illumination light 1008. For example, the illumination light 1008 can be changed to a white light by causing the three laser light sources R, G and B to emit light simultaneously. Further, the R, G or B laser light source may be controlled to emit light sequentially, or two or more of the three laser light sources R, G and B may be caused to emit light sequentially. With such controls, the video display system 1001 is enabled not only to carry out a monochromatic display but also to carry out a color display on the screen 1012 by means of a color sequential method using one SLM 1002. When performing a color display, an operation is carried out in which one frame of display data is divided into three sub-frames corresponding to each of the colors R, G and B, and the respective laser light sources R, G and B are controlled to emit light sequentially in the period corresponding to a sub-frame of each color.

The display processing unit 1006 includes an image processing unit (Image Signal Processor) 1017 for processing a continuously inputted video signal 1020, SLM controller 1018 for controlling the SLM 1002, and a light source controller 1019 for controlling the variable light source 1013.

The frame memory 1007 is memory used for temporarily storing the data of an input video signal in the amount of at least one frame. The frame memory 1007 is also used as working memory for the image processing unit 1017.

Figure 5:
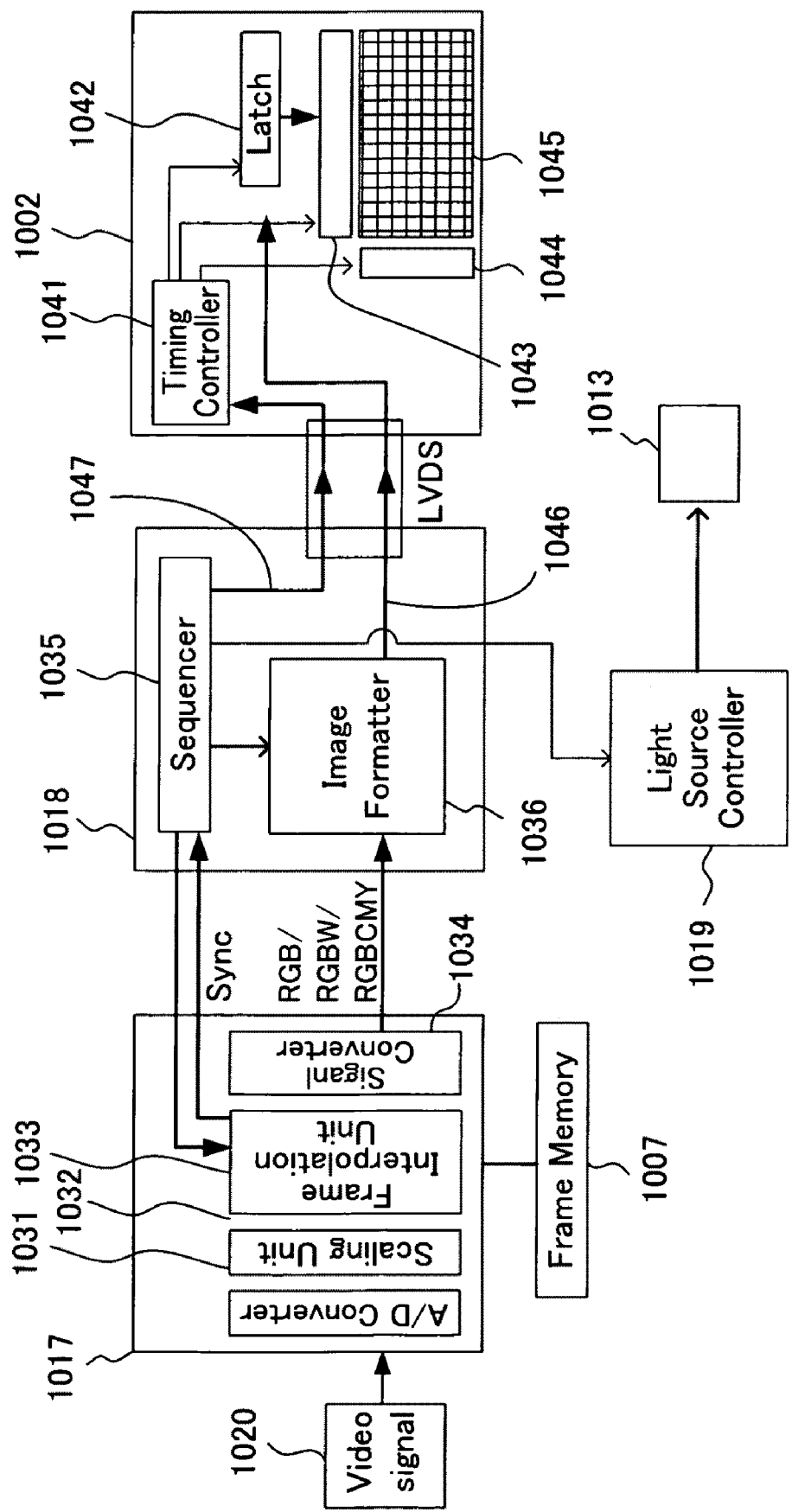
FIG. 5 is a functional block diagram showing an exemplary circuit configuration of a video display system according to a preferred embodiment of the present invention.

FIG. 5 is a functional block diagram showing an exemplary circuit configuration of the video display system 1001.

As shown in FIG. 5, the image processing unit 1017 includes an AD converter 1031, a scaling unit 1032, a frame interpolation unit 1033, and a signal conversion unit (Signal Converter) 1034.

The AD converter 1031 converts an analog signal into the digital signal if the continuously inputted video signal 1020 is the analog signal, and outputs the post-conversion signal.

If the resolution of the continuously inputted video signal 1020 is different from that of the video display system 1001, and if a video signal which is a digital signal output from the AD converter 1031 is a digital signal or if the continuously inputted video signal 1020 is a digital signal, the scaling unit 1032 applies a scaling process to the signal, thereby converting the resolution of the inputted video signal 1020 into the resolution of the video display system 1001, and outputs the post-conversion signal.

The frame interpolation unit 1033 performs a process in accordance with a control signal outputted from a sequencer 1035 (which is described later) and, when the resolution of a video signal output from the scaling unit 1032 or the resolution of a video signal output from the AD converter 1031 is the same as the resolution of the video display system 1001, the frame interpolation unit 1033 generates, from the video signal, a video signal having a higher frame rate than that of the video signal 1020 and outputs the generated video signal. When the continuously inputted video signal 1020 is a digital signal and the resolution of the video signal 1020 is the same as that of the video display system 1001, the frame interpolation unit 1033 generates, from the video signal, a video signal having a higher frame rate than that of the video signal 1020 and outputs the generated video signal.

The frame interpolation unit 1033, however, carries out the processing so that the data volume for each frame of the video signal to be outputted is smaller than the data volume per frame of the video signal input into the frame interpolation unit 1033. Here, the data volume may be related to the gray scale of an image and/or to the number of pixels.

More specifically, the video signal of a portion of the high frame rate video signal generated by the frame interpolation unit 1033 is generated from the video signals of a plurality of frames of the video signal input into the frame interpolation unit 1033 by means of a motion image interpolation. This method detects a moving portion of a video image from the continuously inputted video signal and generates a new video signal of a frame so as to interpolate the motion. The method of generating a video signal of an interpolation frame determines the intensity of each pixel constituting a video image of a frame to be interpolated on the basis of a change in the intensity information of each pixel constituting continuously inputted video signal.

Furthermore, the frame interpolation unit 1033 generates and outputs a frame synchronous signal (sync) in accordance with the generated high frame rate video signal.

The signal conversion unit 1034 converts, on an as-required basis, the video signal output from the frame interpolation unit 1033 into a plurality of sub-frame video signals having the color data of at least one color from among red (R), green, (G), blue (B), cyan (C), magenta (M), yellow (Y), white (W), black (K) and gray (Gy), and outputs the post-conversion video signals. This operation makes it possible to convert, on an as-required basis, a video signal sent from the frame interpolation unit 1033 into various video signals (i.e., the video signals of a plurality of sub-frames having the color data of the colors R, G and B, those of a plurality of sub-frames having the color data of the colors R, G, B and W, and those of a plurality of sub-frames having the color data of the colors R, G, B, C, M and Y) when a color video image is displayed. Further, when, for example, a monochromatic video image is displayed, the above described operation makes it possible to convert a video signal from the frame interpolation unit 1033 into the video image of a frame having the color data of no less than one color from among the respective colors W, K and gray (Gy), on an as-required basis.

When the form of a signal to be outputted is configured to be the video signals of a plurality of sub-frames having the color data of R, G and B, the signal conversion unit 1034 outputs the video signals of the respective sub-frames of the inputted video signal, as is, to a later-stage circuit if the form of the input signal and that of a signal to be outputted are identical, such as when the form of the input signal has the data of the colors R, G and B. Further, if the video signal 1020 is a YUV signal and if a monochromatic video image is to be displayed, the signal conversion unit 1034 outputs a Y signal, as is, expressing the intensity of the inputted video signal, to a later-stage circuit.

The SLM controller 1018 includes a sequencer 1035 and an image formatter 1036.

The sequencer 1035 controls the frame interpolation unit 1033 and also controls the operational timings of the image formatter 1036, SLM 1002, and light source controller 1019 in accordance with a frame synchronous signal which is outputted from the frame interpolation unit 1033.

The image formatter 1036 generates display-use data (Video Data) 1046 for the SLM 1002 from the signal of the frame (noted as "frame signal" hereinafter) of a video signal output from the signal conversion unit 1034 and outputs the generated data. For example, when a color video image is to be displayed, and when a video signal having the color data of each of the colors R, G and B is inputted, the image formatter 1036 generates the video signals for the R-, G- and B-use sub-frames corresponding to the video images of the inputted frames as the video data for the SLM 1002, and outputs the generated video signals in a time sequence. Further, when, for example a monochromatic video image is to be displayed, and when a video signal constituted by frame signals having the color data of at least one color of the colors W, K and gray (Gy) (or a video signal which is a YUV signal) is inputted, the image formatter 1036 generates a monochrome-use video signal corresponding to the inputted video signals of the respective frames as the video data for the SLM 1002, and outputs the generated video signal.

The SLM 1002 is connected to the SLM controller 1018 by way of a transmission path compliant with a Low-Voltage Differential Signaling (LVDS) Standard, and includes a timing controller 1041, a latch circuit 1042, a Column driver 1043, a Row driver 1044, and a pixel element array 1045, in which a plurality of pixel elements is placed in an array (noted as "arrayed" hereinafter).

The timing controller 1041 controls the operational timings of the latch circuit 1042, Column driver 1043, and Row driver 1044, in accordance with a timing signal (Address data Clock) 1047 which is outputted from the sequencer 1035.

The latch circuit 1042 retains the video data, which is outputted from the image formatter 1036 temporarily, and supplies the Column driver 1043 with the video data.

The individual pixel elements of the pixel element array 1045 are driven by the operations of the Column driver 1043 and Row driver 1044.

Figure 6:
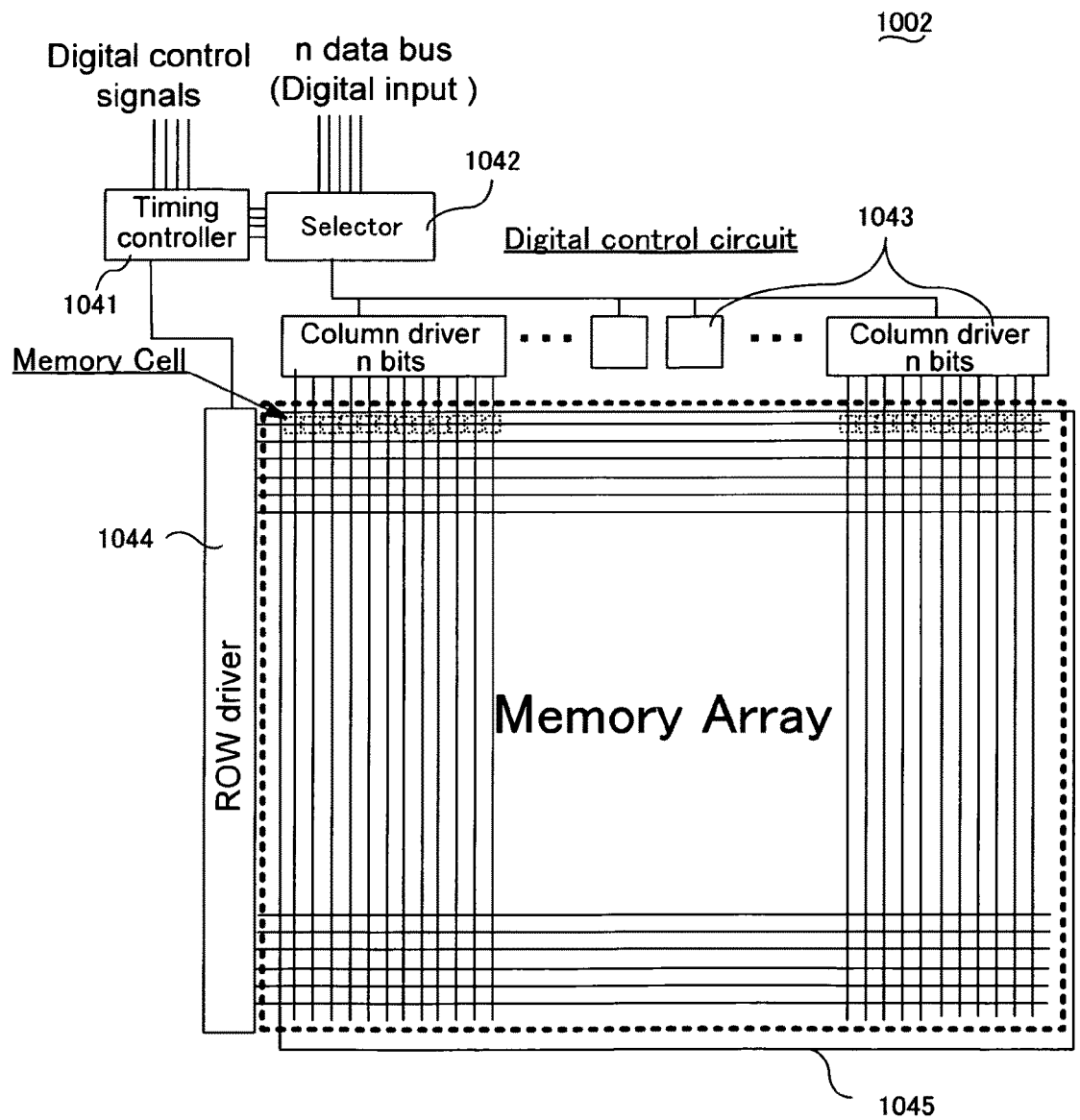
FIG. 6 is a diagram showing the layout of the internal configuration of an SLM in further detail.

FIG. 6 is a diagram showing the configuration of an SLM 1002 in further detail.

Referring to FIG. 6, the above described latch circuit 1042 is shown as a selector. Further, the Column driver 1043 is shown as a plurality of Column drivers. Timing signals inputted into the timing controller 1041 are shown as Digital control signals. The transmission line for the video data inputted into the latch circuit 1042 is shown as n data bus. The individual pixel element includes a memory cell, as described later in detail, and therefore the pixel element array 1045 is also defined as including a memory array in which a plurality of memory cells is arrayed.

As shown in FIG. 6, a plurality of pixel elements is placed in a grid pattern at the positions where individual bit lines, extending vertically from the Column driver 1043, cross individual word lines, extending horizontally from the Row driver 1044, in the pixel element array 1045.

Figure 7:
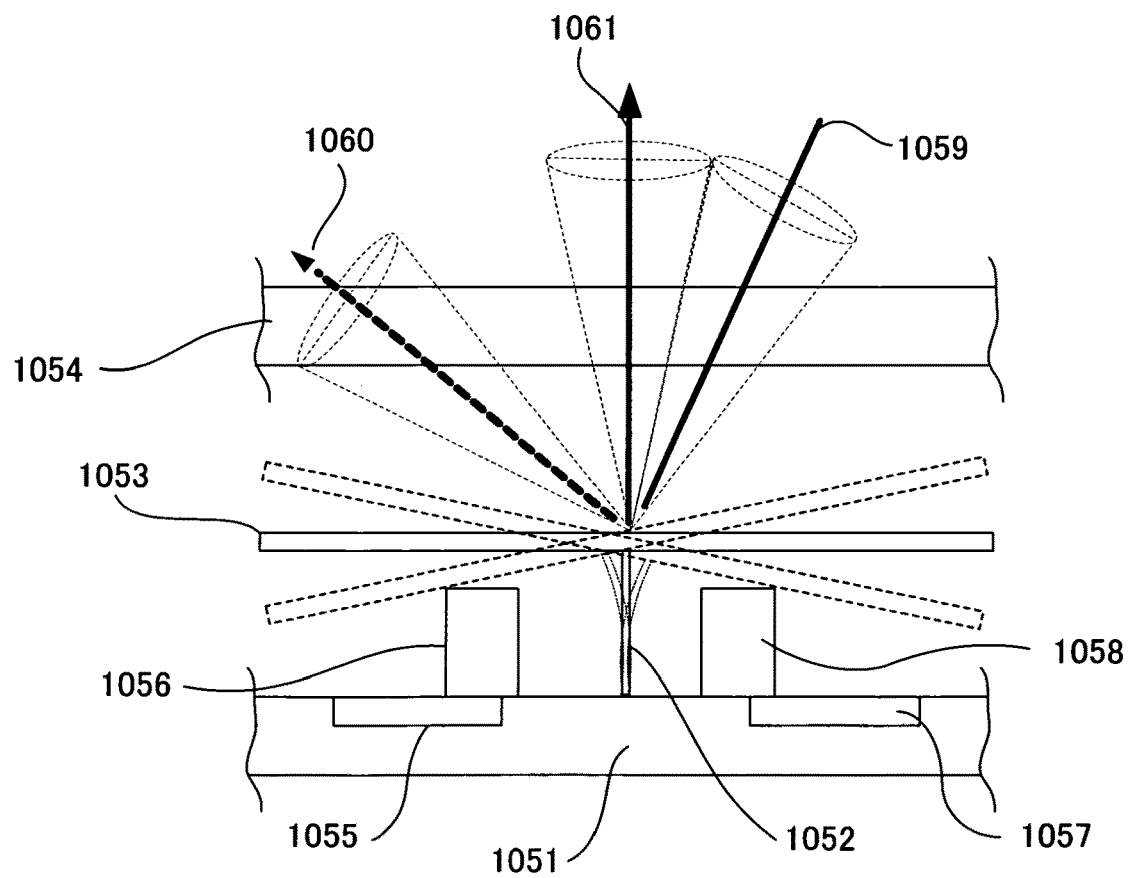
FIG. 7 is a cross-sectional diagram showing an exemplary configuration of an individual pixel element.

FIG. 7 is a cross-sectional diagram showing an exemplary configuration of an individual pixel element.

As shown in FIG. 7, an individual pixel element includes a deflectable mirror 1053 supported on a substrate 1051 by an elastic hinge 1052. The mirror 1053 is covered with a cover glass 1054 for protection.

The mirror 1053 is connected to the ground (GND) potential or a specific potential by way of the elastic hinge 1052 and substrate 1051.

An OFF electrode 1055 and an ON electrode 1057 are placed symmetrically across the elastic hinge 1052 on the substrate 1051, and likewise an OFF stopper 1056 and an ON stopper 1058 are placed on the substrate 1051.

When a predetermined voltage is applied to the OFF electrode 1055, it attracts the mirror 1053 with a Coulomb force generated between the mirror and the OFF electrode 1055 so as to tilt the mirror 1053 to a position abutting the OFF stopper 1056. This causes the incident light 1059 to be reflected by the mirror 1053 to the OFF light path 1060, which is shifted away from the optical axis of the projection optical system 1004. The state of the mirror 1053 in this position is known as the OFF state.

When a predetermined voltage is applied to the ON electrode 1057, it attracts the mirror 1053 with a Coulomb force generated between the mirror and the ON electrode 1057 so as to tilt the mirror 1053 to a position abutting the ON stopper 1058. This causes the incident light 1059 to be reflected by the mirror 1053 to the ON light path 1061, which is aligned with the optical axis of the projection optical system 1004. The state of the mirror 1053 in this position is known as the ON state.

By stopping the application of a voltage to the OFF electrode 1055 (or the ON electrode 1057) when the mirror 1053 is tilted in a position abutting the OFF stopper 1056 (or the ON stopper 1058), the Coulomb force generated between the mirror 1053 and the OFF electrode 1055 (or the ON electrode 1057) is eliminated, causing the mirror 1053 to oscillate freely in accordance with the elasticity of the elastic hinge 1052. During the free oscillation, the incident light 1059 is reflected by the mirror 1053 to a light path between the OFF light path 1060 and the ON light path 1061. The state of the mirror 1053 in this position is known as an oscillation state. More specifically, the total intensity of light (also noted as "light intensity" hereinafter) reflected towards the projection optical system 1004 by the mirror performing the free oscillation is lesser than the light intensity when the mirror 1053 is in the ON state and is greater than the light intensity when the mirror 1053 is in the OFF state. That is, it is possible to set the light intensity between the light intensities of the ON state and OFF state.

Figure 48:
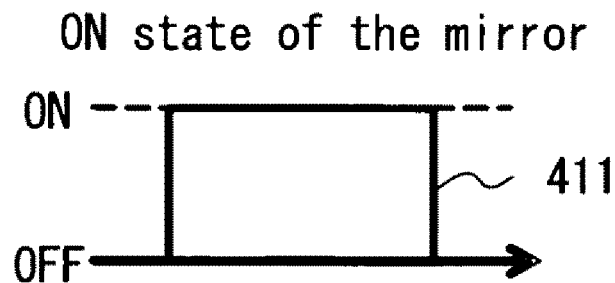
FIG. 48 is a chart showing the intensity of projection light obtained in the ON state of a micromirror.
Figure 49:
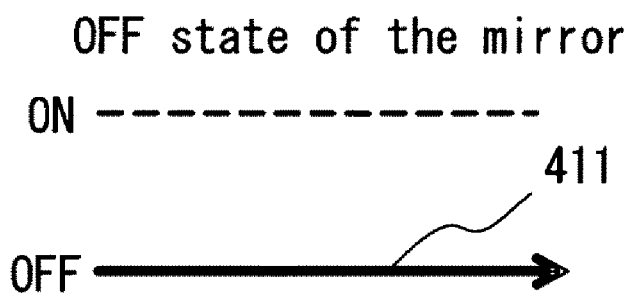
FIG. 49 is a chart showing the intensity of projection light obtained in the OFF state of a micromirror.
Figure 50:
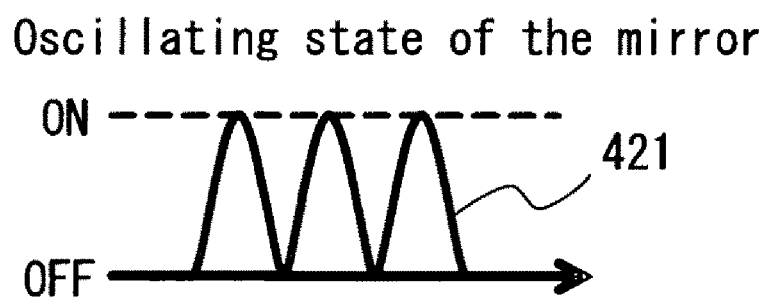
FIG. 50 is a chart showing the intensity of projection light obtained in the oscillation state of a micromirror.

FIGS. 48, 49 and 50 show the intensity of light projected by the projection optical system 1004 when the mirror 1053 is in the ON state, OFF state and oscillation state, respectively.

Figure 8:
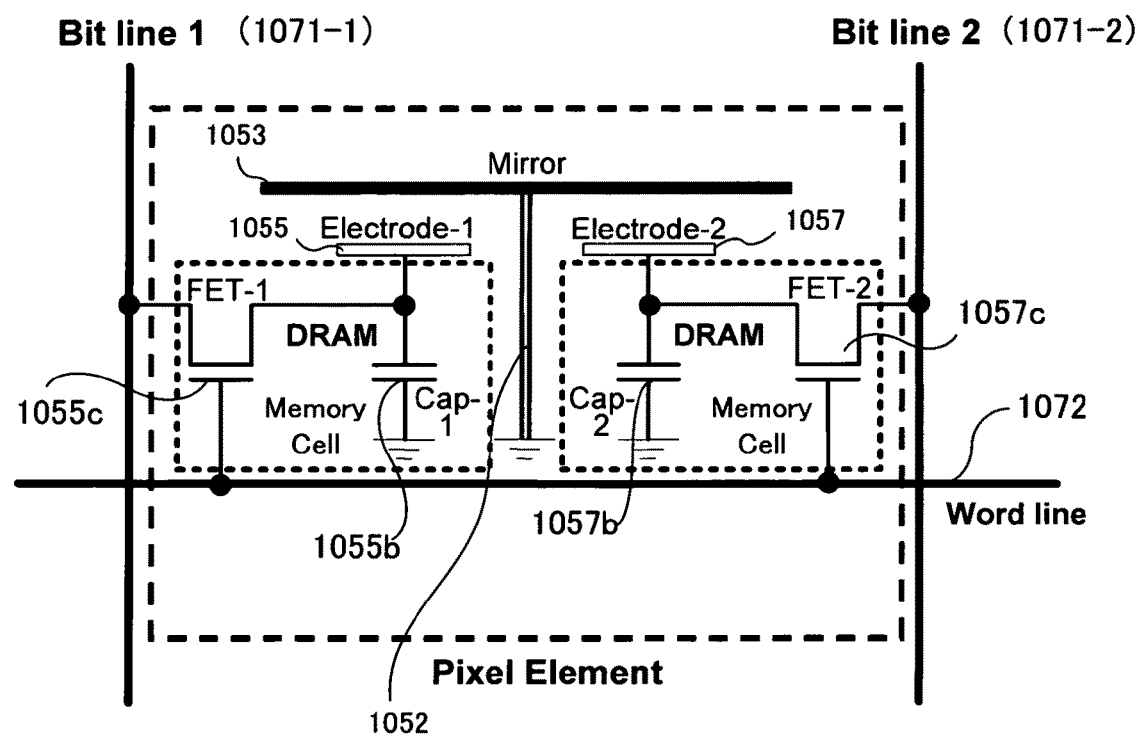
FIG. 8 is a diagram showing an exemplary configuration of the circuit for an individual pixel element.

FIG. 8 is a diagram showing an exemplary configuration of the circuit for an individual pixel element.

As shown in FIG. 8, an OFF capacitor 1055*b* is connected to the OFF electrode 1055, and the OFF capacitor 1055*b* is connected to a bit line 1071-1 and a word line 1072 by way of a gate transistor 1055*c*. Here, the OFF capacitor 1055*b* and gate transistor 1055*c* constitute a DRAM-structured memory cell.

Further, an ON capacitor 1057*b* is connected to the ON electrode 1057, and the ON capacitor 1057*b* is connected to a bit line 1071-2 and a word line 1072 by way of a gate transistor 1057*c*. Here, the ON capacitor 1057*b* and gate transistor 1057*c* constitute a DRAM-structured memory cell.

The opening and closing of the gate transistor 1055*c* and gate transistor 1057*c* are controlled by the word line 1072.

Specifically, a single horizontal row of the pixel elements in line with an arbitrary word line 1072 are simultaneously selected, and the charging and discharging of capacitance to and from the OFF capacitor 1055*b* and ON capacitor 1057*b* are controlled by way of the bit lines 1071-1 and 1071-2, and thereby the individual ON/OFF and oscillation controls for the mirrors 1053 in the pixel units within a single horizontal row are carried out.

At this point, a description is provided for binary data and non-binary data with reference to FIGS. 51, 52, 53 and 54.

Figure 51:
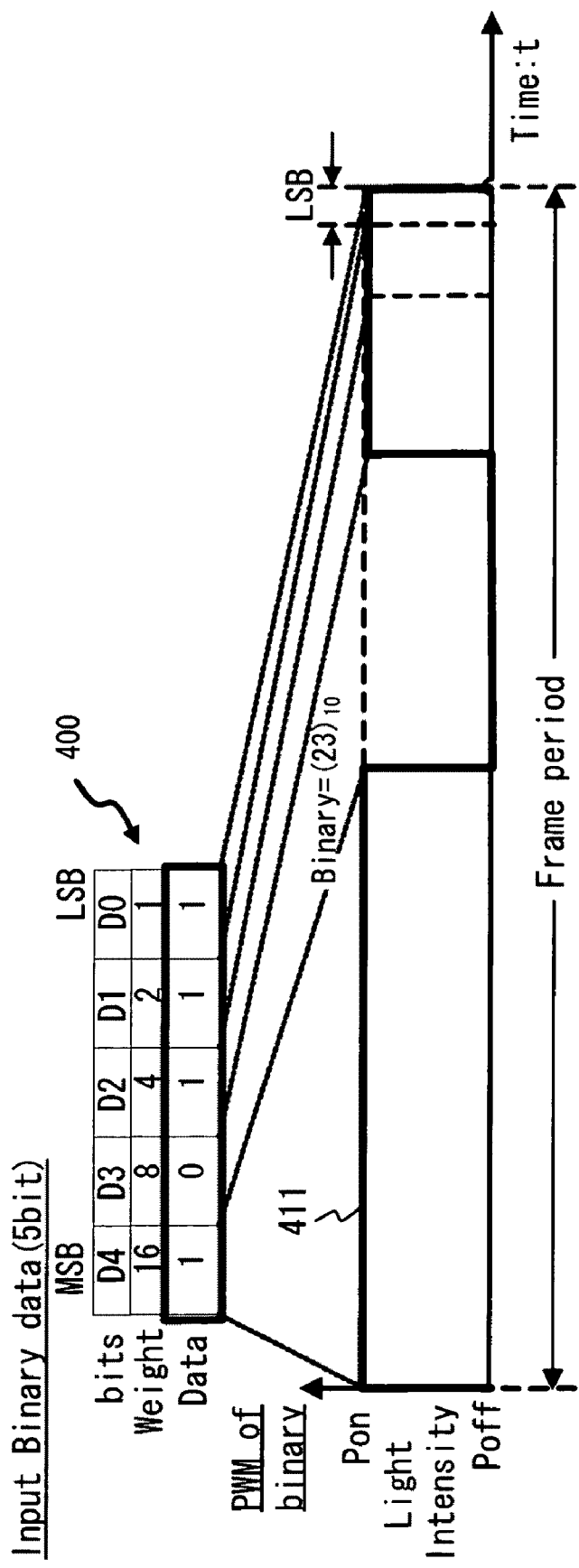
FIG. 51 is a chart exemplifying a pulse width modulation (PWM) using binary data.

As shown in FIG. 51, the N bits of binary data (i.e., a binary video signal 400) are data which have different weights from the least significant bit (LSB) to the most significant bit (MSB).

When a gray scale is represented by means of a pulse width modulation (PWM), the weight of each bit expresses a length of time for performing a pulse control, that is, the period of an ON state of each segment (i.e., a sub-frame).

Figure 52:
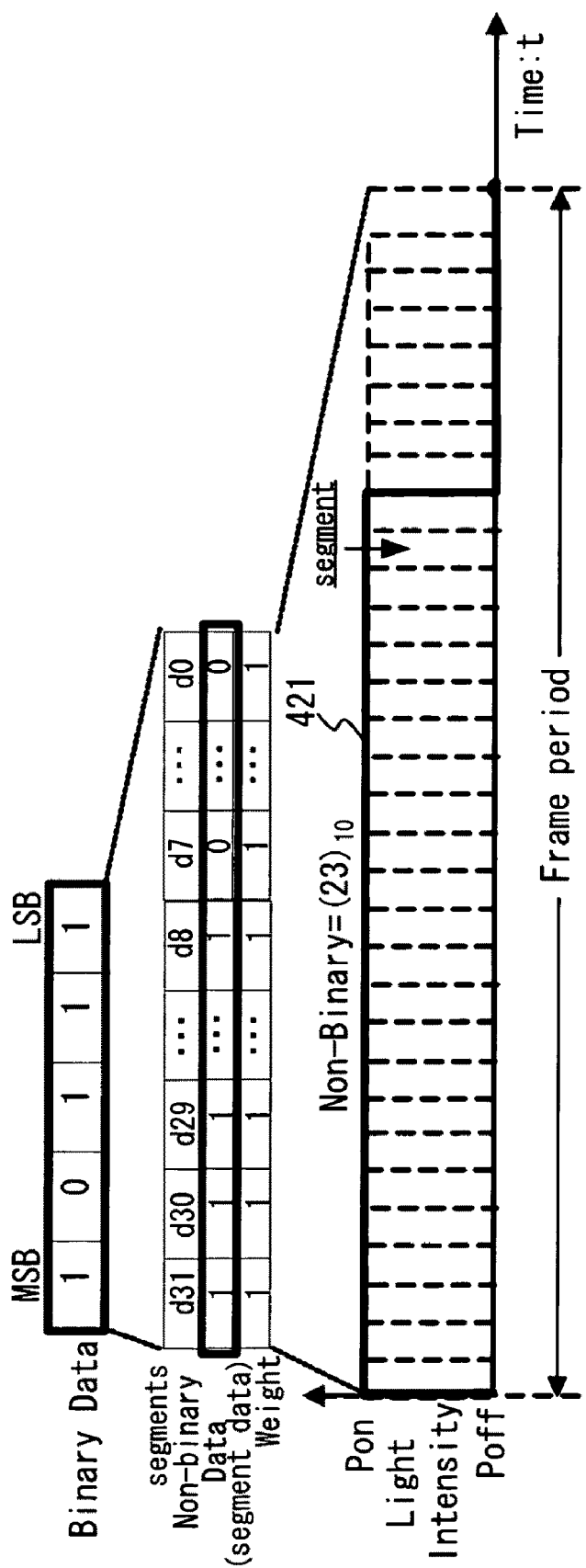
FIG. 52 is a chart exemplifying a conversion of binary data into non-binary data.

The example shown in FIG. 52 is an embodiment in which the entire 5 bits of input binary data is converted into non-binary data with "weight"=1.

For data of the entire 5 bits of the binary data, the period of a segment (i.e., a sub-frame) is determined with the weight (i.e., weight=1) of the LSB, the data is converted into non-binary data (i.e., a bit string) for each segment and is transferred to the spatial light modulator 1002.

Specifically, the number of times the ON state appears in the LSB interval of the binary data is calculated and a gray scale is represented so that the period of an ON state continues for the duration of the bit string.

Figure 53:
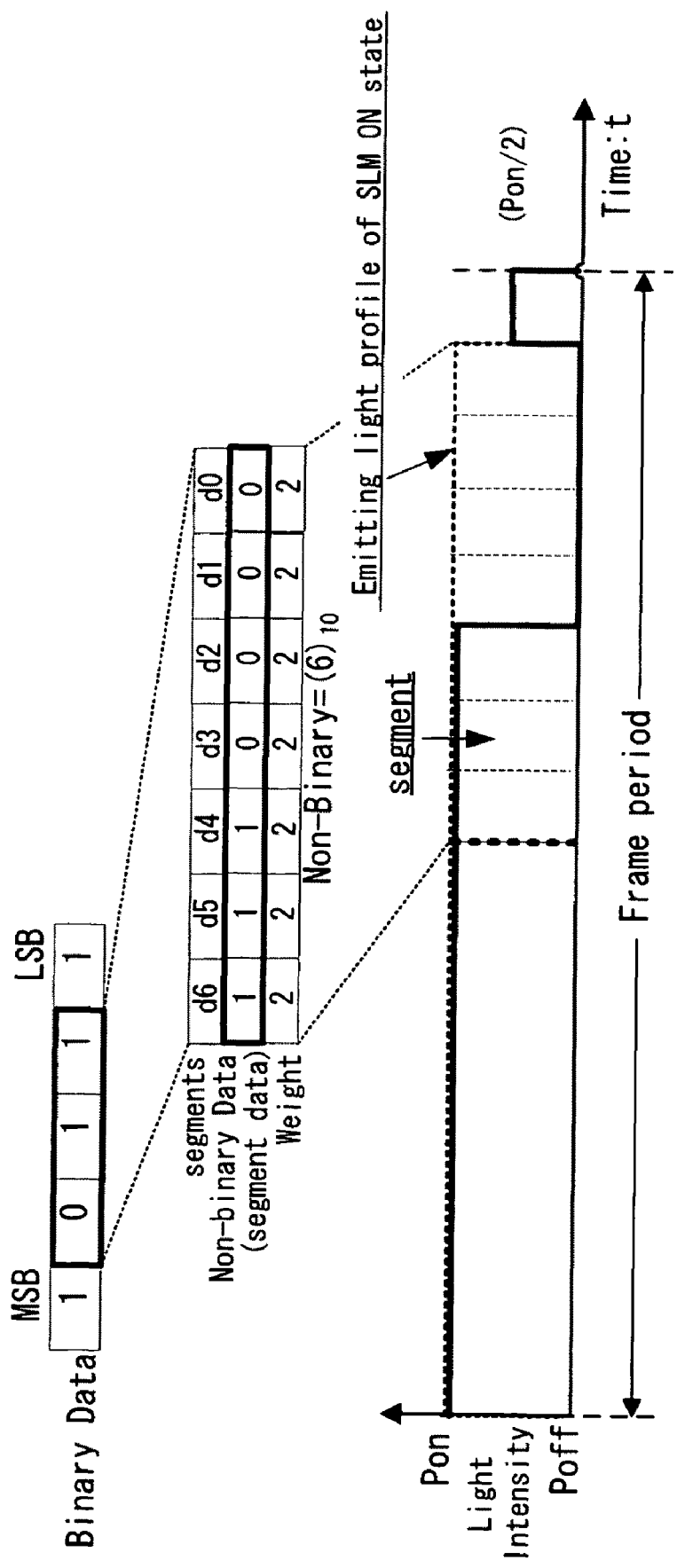
FIG. 53 is a chart exemplifying a conversion of a part of binary data into non-binary data.

Meanwhile, the example shown in FIG. 53 is an embodiment in which the intermediate 3 bits of binary data is converted into non-binary data. The example also shows a case in which the least significant bit (LSB) of the binary data is subjected to a light intensity modulation (at the ratio of light intensity=1/2) by means of the spatial light modulator 1002 or variable light source 1013. In this case, the weight of all bits, other than the most significant bit (MSB), of the binary data is "2" to extend the interval of one segment, and thereby the interval of the LSB segment is lined up with the intervals of other segments.

The individual pixel element (i.e., the pixel unit 1045) of the spatial light modulator 1002 is a micromirror 1053 which is controlled under any of the states including the ON/OFF (positioning) state, oscillating state and intermediate state.

Figure 54:
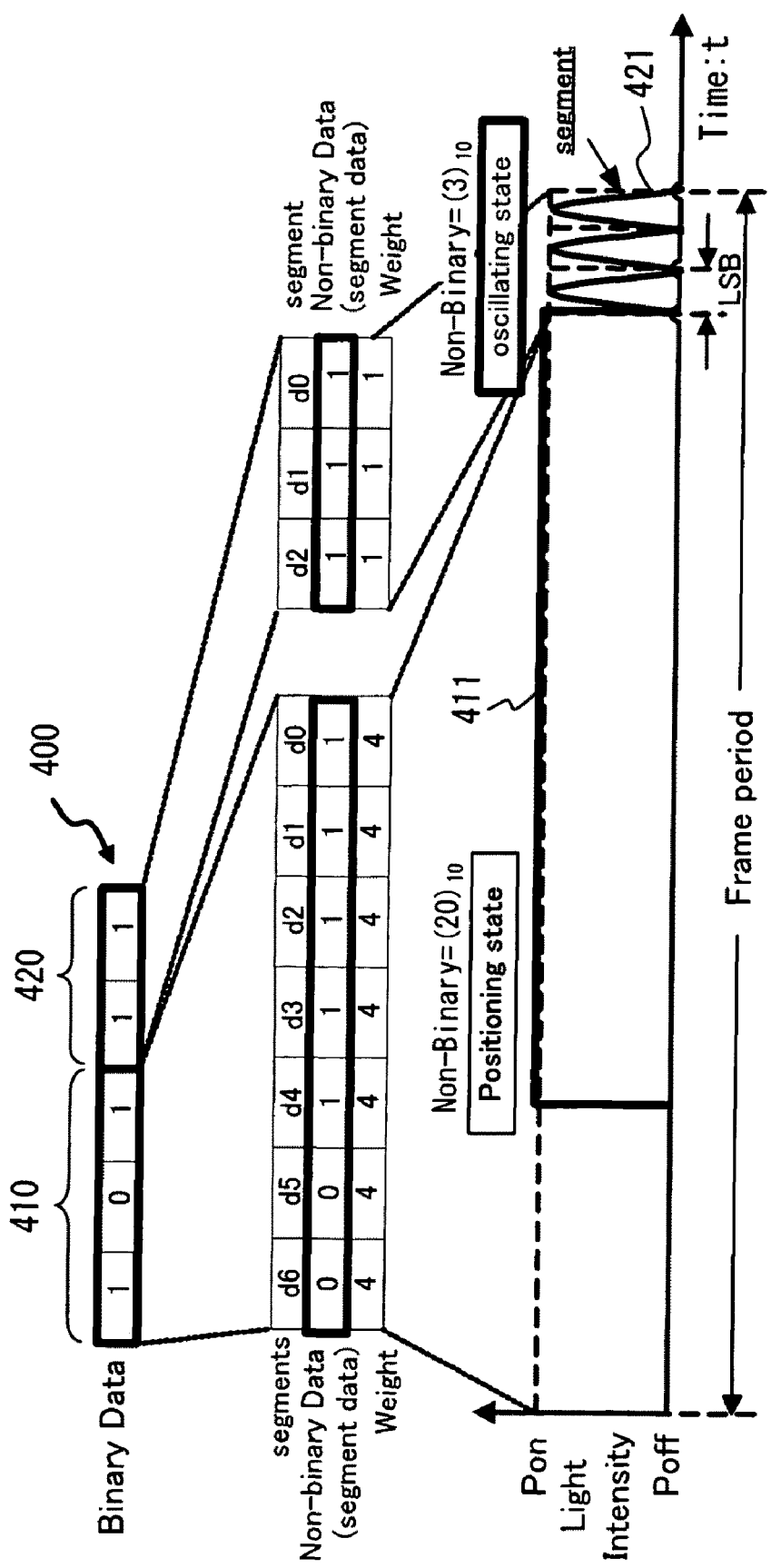
FIG. 54 is a chart exemplifying a conversion of binary data into non-binary data in a display system according to a preferred embodiment of the present invention.

As shown in FIG. 54, the present embodiment is configured to control the ON/OFF (positioning) state and oscillating state with display-use data (video data) 1046 outputted from the image formatter 1036 and with a timing signal (address data clock) 1047 which is outputted from the sequencer 1035.

What follows is a description of an exemplary operation of the image processing unit 1017 comprised in the display processing unit 1006, as an exemplary operation related to the present embodiment in the video display system 1001, with reference to FIGS. 9 through 15.

In each of the FIGS. 9 through 15, "input video signal," shown in the upper half, represents a video signal which is inputted into the frame interpolation unit 1033, and "output video signal," shown in the lower half, represents a video signal which is outputted from the signal conversion unit 1034.

Assuming that a video signal 1020 continuously inputted into the image processing unit 1017 is a digital signal and also that the resolution of the input signal is the same as that of the video display system 1001, the "input video signal" shown in the upper half of the figure constitutes a video signal 1020. Further, in each of the FIGS. 9 through 15, the video image of the "input video signal" shown in the upper half is an image of a ball moving from the bottom left to the top right.

Figure 9:
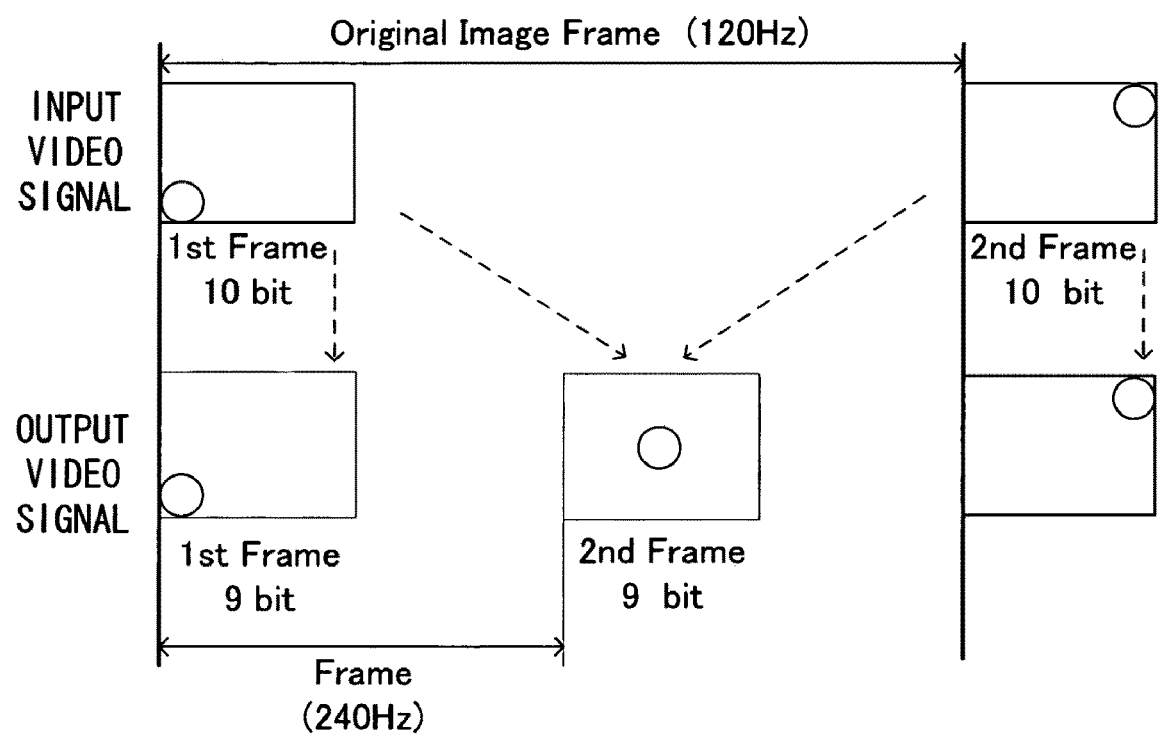
FIG. 9 is a diagram showing an exemplary operation of an image processing unit according to a first preferred embodiment.

FIG. 9 is a diagram showing an exemplary operation of the image processing unit 1017.

FIG. 9 exemplifies the case of generating, from an input video signal which has a 120 Hz frame rate and in which the video signal of each frame has 10-bit gray scale data for each pixel, an output video signal which has a 240 Hz frame rate and in which the video signal of each frame has 9-bit gray scale data for each pixel.

In the present example, an output video signal generated within the period of one frame of an input video signal consists of signals of two frames, i.e., the video signal of the first frame of an output video image, which is the video signal generated by converting the gray scale data, 10-bit data, of the video signal of the first frame of an input video image for each pixel into 9-bit data, and the video signal of the second frame of an output video image, which is the video signal generated from the video signals of the two adjacent frames of the input video image, specifically, the video signals of the first and second frames of the input video image generated by a motion image interpolation which has 9-bit gray scale data for each pixel.

In the present example, since the video signal of each frame of the input video image has 10-bit gray scale data for each pixel and the video signal of each frame of the output video image has 9-bit gray scale data for each pixel, the data volume of the gray scale data of the video signal of each frame of the output video image for each pixel is one half (=$2^9/2^{10}$) of the corresponding data volume of the input video image. The data volume related to the gray scale data for each video signal of one frame of an output video image is one half ("fra 1/2") of the corresponding data volume of the input video image.

Furthermore, in the present example, the frame rate of the input video signal is 120 Hz, while the frame rate of the output video signal is 240 Hz, and therefore, the output video signal has a frame rate two times that of the input video signal.

Since the output video signal has a gray scale data volume one-half that of the input video signal, with the frame rate two times that of the input video signal, it is possible to generate an output video signal at two times the frame rate of the input video signal without the need to change the data volume for the period of one frame of the input video signal.

Figure 10:
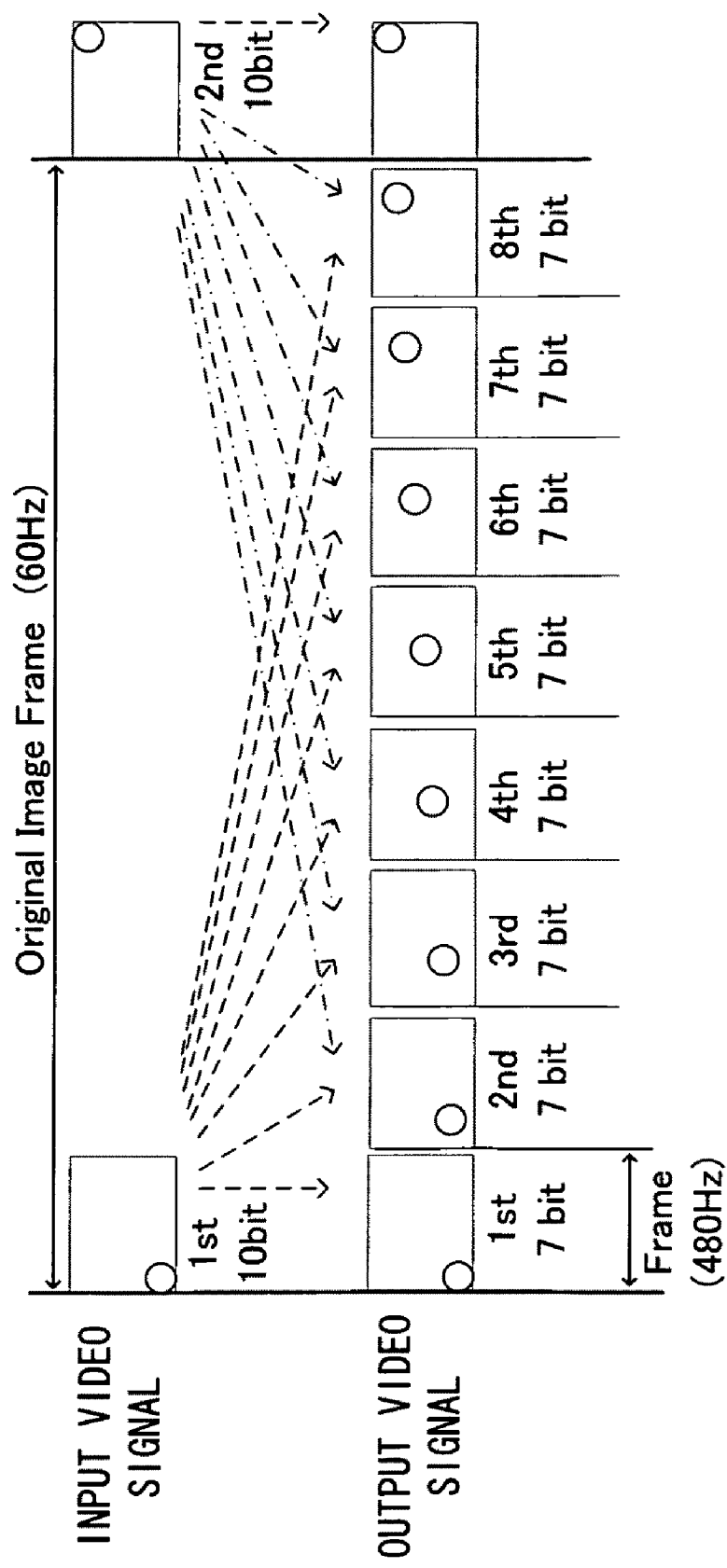
FIG. 10 is a diagram showing another exemplary operation of an image processing unit according to a first preferred embodiment.

FIG. 10 is a diagram showing another exemplary operation of the image processing unit 1017.

FIG. 10 exemplifies the case of generating, from an input video signal which has a 60 Hz frame rate and in which the video signal of each frame has 10-bit gray scale data for each pixel, an output video signal which has a 480 Hz frame rate and in which the video signal of each frame has 7-bit gray scale data for each pixel.

In this example, an output video signal generated in the period of one frame of an input video signal consists of signals of eight frames, specifically, the video signal of the first frame of an output video image, which is the video signal generated by converting the 10-bit data of the video image of the first frame into 7-bit data, and the seven video signals of the 2nd through 8th frames of the output video image, which are generated from the video signals of the first frame and second frame of the input video image, by means of a motion image interpolation and which have 7-bit gray scale data for each pixel.

In the present example, since the video signal of each frame of the input video image has 10-bit gray scale data for each pixel and the video signal of each frame of the output video image has 7-bit gray scale data for each pixel, the data volume of the gray scale data, per pixel of the video signal of each frame of the output video image, is one eighth ("1/8") (=$2^7/2^{10}$) of the corresponding data volume of the input video image. The data volume related to the gray scale data for one frame of an output video image is one eighth (⅛) of the corresponding data volume of the input video image.

Further, in the present example, the frame rate of the input video signal is 60 Hz, while the frame rate of the output video signal is 480 Hz, and therefore the output video signal has a frame rate eight times (8×) that of the input video signal.

Since, the output video signal has a gray scale data volume one eighth (⅛) that of the input video signal, with a frame rate of eight times (8×) that of the input video signal, it is possible to generate an output video signal at eight times the frame rate of the input video signal without the need to change the data volume for the period of one frame of the input video signal.

More specifically, the exemplary operations shown in FIGS. 9 and 10 exemplifies the case of generating a video signal output at higher frame rates, respectively, two times and eight times the frame rate of the video signal 1020 inputted. It is likewise possible to generate an output video signal which has a higher frame rate ranging from two times to eight times the frame rate of the video signal 1020.

Also More specifically, the exemplary operations shown in FIGS. 9 and 10 exemplify the cases in which the gray scale data volume for each video signal of one frame of the output video image are, respectively, ½ and ⅛ of the corresponding data volume of the input video signal. It is likewise possible to designate a gray scale data volume for each video signal of one frame of the output video image to range from ½ to ⅛ of the corresponding data volume of the input video signal.

Figure 11:
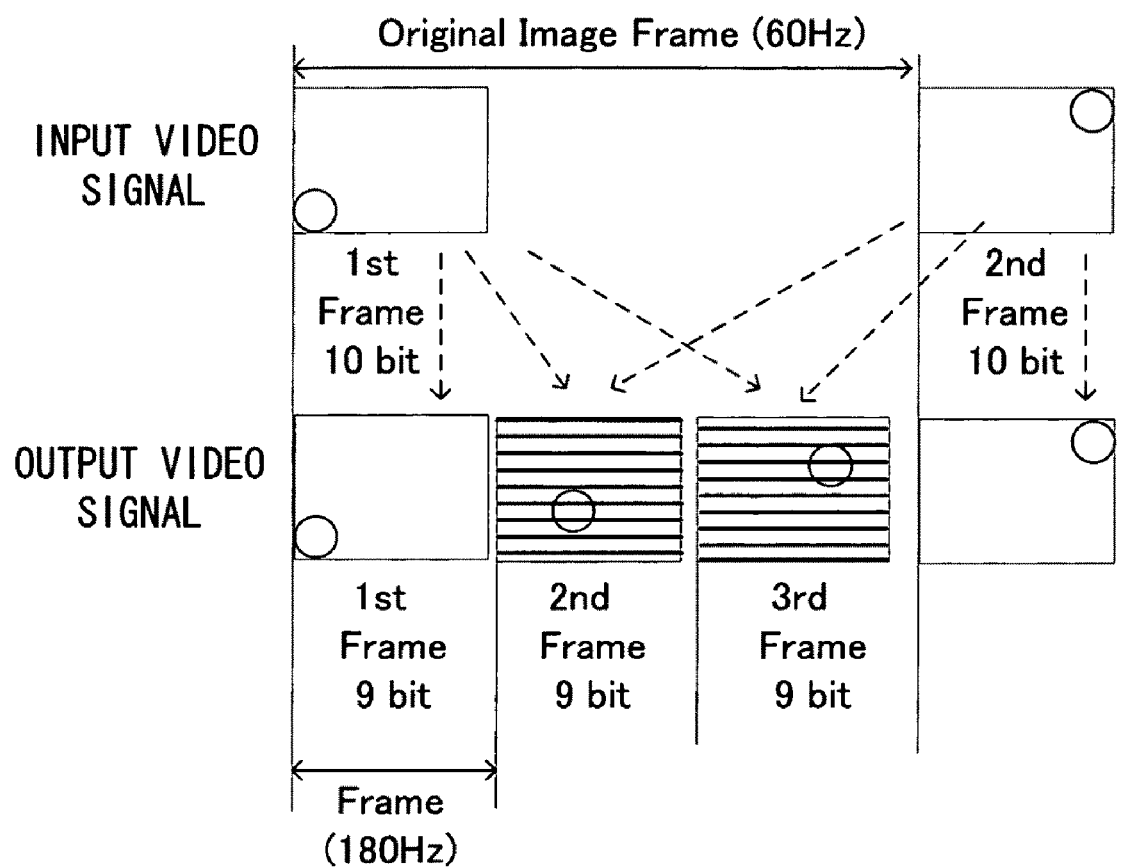
FIG. 11 is a diagram showing a yet another exemplary operation of an image processing unit according to a first preferred embodiment.

FIG. 11 is a diagram showing yet another exemplary operation of the image processing unit 1017.

FIG. 11 exemplifies the case of generating, from an input video signal which has a 60 Hz frame rate and in which the video signal of each frame has 10-bit gray scale data for each pixel, an output video signal which has a 180 Hz frame rate and in which the video signal of each frame has 9-bit gray scale data for each pixel. In this case, however, the video signal of each frame is generated such that in two out of three frames (i.e., the second and third frames) of the output video signal generated within the period of one frame of the input video signal, the pixels on the odd-numbered lines are thinned out from the video signal of one frame and the pixels on the even-numbered lines are thinned out from the video signal of the other frame.

In the present example, the output video signal generated within the period of one frame of the input video signal consists of signals of three frames: the video signal of the first frame of the output video image, which is the video signal generated by converting the 10-bit data of the video signal of the first frame of an input video signal for each pixel into 9-bit data, and the video signals of the second frame and third frame of the output video image, which are obtained by generating the video signal of the two frames having 9-bit gray scale data for each pixel from the video signals of the adjacent first frame and second frame of the input video image. These frames are generated by means of a motion image interpolation, thinning out the pixels on the odd-numbered lines from the video signal of one of the two frames having 9-bit gray scale data and thinning out the pixels on the even-numbered lines from the video signal of the other frame. More specifically, in this case, the number of pixel lines of each of the video signals of the two frames is smaller than the number of pixel lines of the input video signal.

In the present example, the input video signal has 10-bit gray scale data for each pixel and the video signal of the first frame of the output video image has 9-bit gray scale data for each pixel in the period of one frame of the input video signal. Therefore, the data volume of the gray scale data of the video signal of the first frame for each pixel is one-half ("½") ($=2^9/2^{10}$) of the corresponding data volume of the video signal of the first frame of the input video signal. Further, each of the video signals of the second and third frames of the output video signal has 9-bit gray scale data for each pixel, and the pixels on the odd-numbered lines or even-numbered lines are thinned out, and therefore, the gray scale data volume of each of the video signals of the second and third frames is a quarter ("¼") ($=2^9/2^{10}/2$) of the corresponding data volume of the input video signal.

Furthermore, in the present example, the frame rate of the input video signal is 60 Hz, while that of the output video signal is 180 Hz, and therefore, the output video signal has a frame rate three times that of the input video signal.

As such, the gray scale data volume of the video signal of the first frame of the output video signal is ½ of the corresponding data volume of the input video signal, and the gray scale data volume of each of the video signals of the second and third frame of the output video signal is ¼ of the corresponding data volume of the input video signal in the period of one frame of the input video signal, and furthermore, the frame rate of the output video signal is three times that of the input video signal. Thereby it is possible to generate an output video signal with a frame rate three times that of the input video signal without a need to change a data volume for the period of one frame of the input video signal.

More specifically, if the SLM 1002 is controlled on the basis of a frame signal produced by thinning out the pixels on the odd-numbered or even-numbered lines of an output video signal, the mirror 1053 of the pixel element corresponding to the thinned out pixel is controlled under the OFF state.

Figure 12:
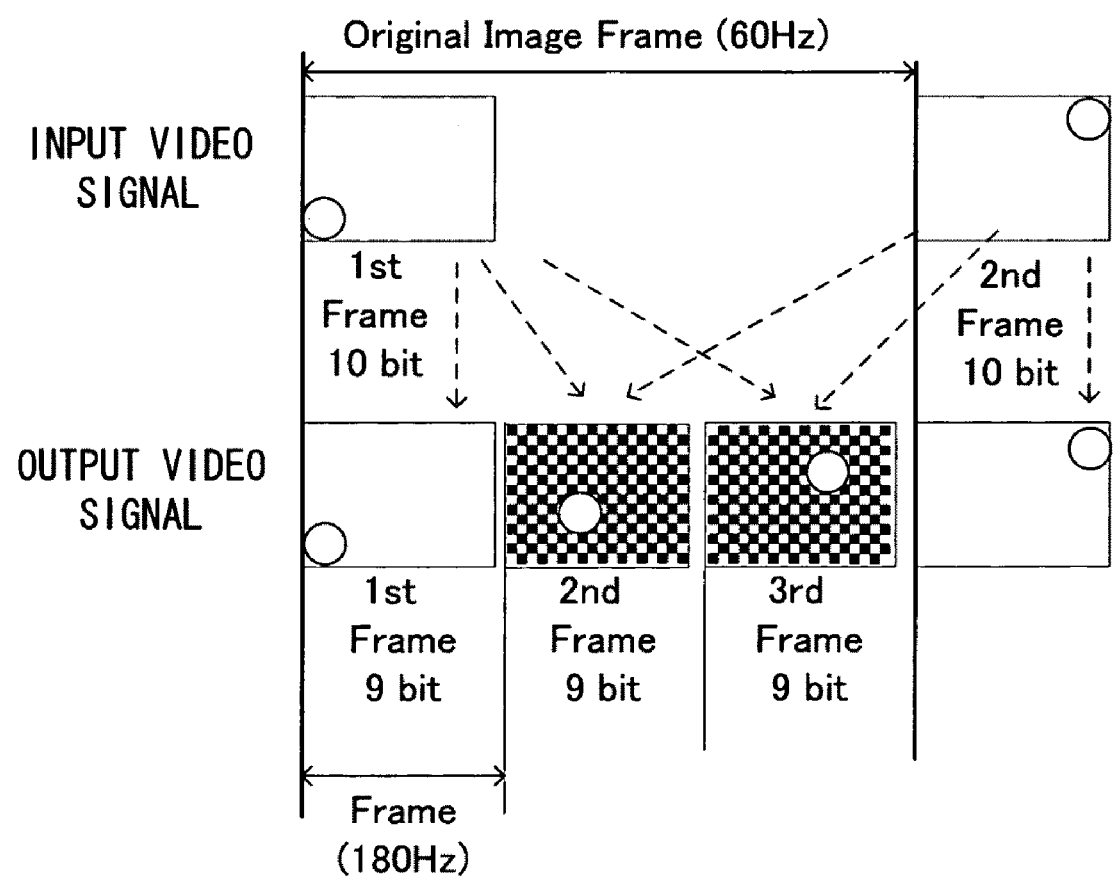
FIG. 12 is a diagram showing a yet another exemplary operation of an image processing unit according to a first preferred embodiment.

FIG. 12 is a diagram showing yet another exemplary operation of the image processing unit 1017.

FIG. 12 exemplifies the case of generating, from an input video signal which has a 60 Hz frame rate and the video signal of each frame has 10-bit gray scale data for each pixel, an output video signal which has a 180 Hz frame rate and in which the video signal of each frame has 9-bit gray scale data for each pixel. In this case, however, the video signal of each frame is generated such that, of the video signals of the second and third frames, from among three frames of output video signal generated within the period of one frame of the input video signal, the pixels in the odd-numbered columns of the odd-numbered lines and the pixels in the even-numbered columns of the even-numbered lines are thinned out from the video signal of one frame (of the aforementioned two frames), while the pixels in the even-numbered columns of the odd-numbered lines and the pixels in the odd-numbered columns of the even-numbered lines are thinned out from the video signal of the other frame.

In the present example, the output video signal generated within one frame of the input video signal consists of signals of three frames, i.e., the video signal of the first frame of the output video image, generated by converting the 10-bit data of the video signal of the first frame of the input video signal for each pixel into 9-bit data, and the video signals of the second and third frame of the output video image, which are obtained by generating the video signals of the two frames having 9-bit gray scale data for each pixel from the video signals of the adjacent first and second frame of the input video image. These frames are generated by means of a motion image interpolation, thinning out the pixels in the odd-numbered columns of the odd-numbered lines and the pixels in the even-numbered columns of the even-numbered lines from the video signal of one frame (of the aforementioned two frames having 9-bit gray scale data), and thinning out the pixels in the even-numbered columns of the odd-numbered lines and the pixels in the odd-numbered columns of the even-numbered lines from the video signal of the other frame.

In the present example, the video signal of the frame of the input video image has 10-bit gray scale data for each pixel, and the video signal of the first frame of the output video image has 9-bit gray scale data for each pixel in the period of one frame of the input video signal. Therefore the volume of the gray scale data of the video signal of the first frame for each pixel of is one-half (½) (=$2^9/2^{10}$) of the corresponding volume of the video signal of the frame of the input video image. Specifically, the gray scale data volume of the video signal of the first frame of the output video signal is one-half of the corresponding data volume of the video signal of the frame of the input video image. Further, the video signal of each of the second and third frames of the output video signal has 9-bit gray scale data for each pixel. Also the pixels in the odd-numbered columns of the odd-numbered lines and the pixels in the even-numbered columns of the even-numbered lines, or the pixels in the even-numbered columns of the odd-numbered lines and the pixels in the odd-numbered columns of the even-numbered lines, are thinned out. Therefore the gray scale data volume of each of the video signals of the two frames, i.e., the second and third frames, is a quarter ("¼") (=$2^9/2^{10}/2$) of the corresponding data volume of the video signal of the frame of the input video image.

Further in the present example, the frame rate of the input video signal is 60 Hz, while that of the output video signal is 180 Hz, and therefore the output video signal has a frame rate which is three times that of the input video signal.

As such, the gray scale data volume of the video signal of the first frame of the output video image is ½ of the corresponding data volume of the video signal of the frame of the input video image, and the gray scale data volume of each of the video signals of two frames, i.e., the second and third frames, of the output video image is a quarter ("¼") of the corresponding data volume of the video signal of the frame of the input video image. Furthermore, the frame rate of the output video signal is three times that of the input video signal in the period of one frame of the input video signal. Thereby it is possible to generate an output video signal with a frame rate three times that of the input video signal without a need to change the data volume for each period of one frame of the input video signal.

More specifically, if the SLM 1002 is controlled on the basis of the video signal of the frame of an output video signal, in which the pixels in the odd-numbered columns of the odd-numbered lines and the pixels in the even-numbered columns of the even-numbered lines, or the pixels in the even-numbered columns of the odd-numbered lines and the pixels in the odd-numbered columns of the even-numbered lines, are thinned out, the mirror 1053 of a pixel element corresponding to the thinned out pixel is controlled under the OFF state.

Figure 13:
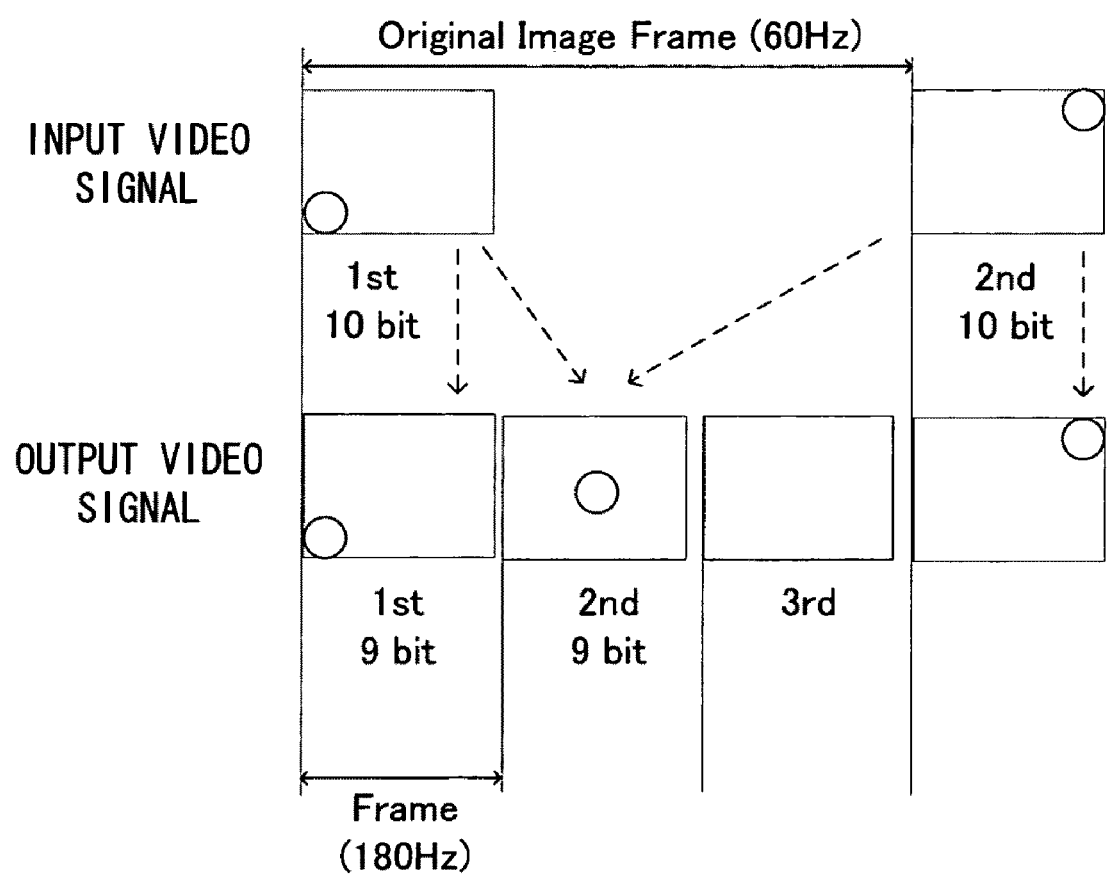
FIG. 13 is a diagram showing a yet another exemplary operation of an image processing unit according to a first preferred embodiment.
Figure 14:
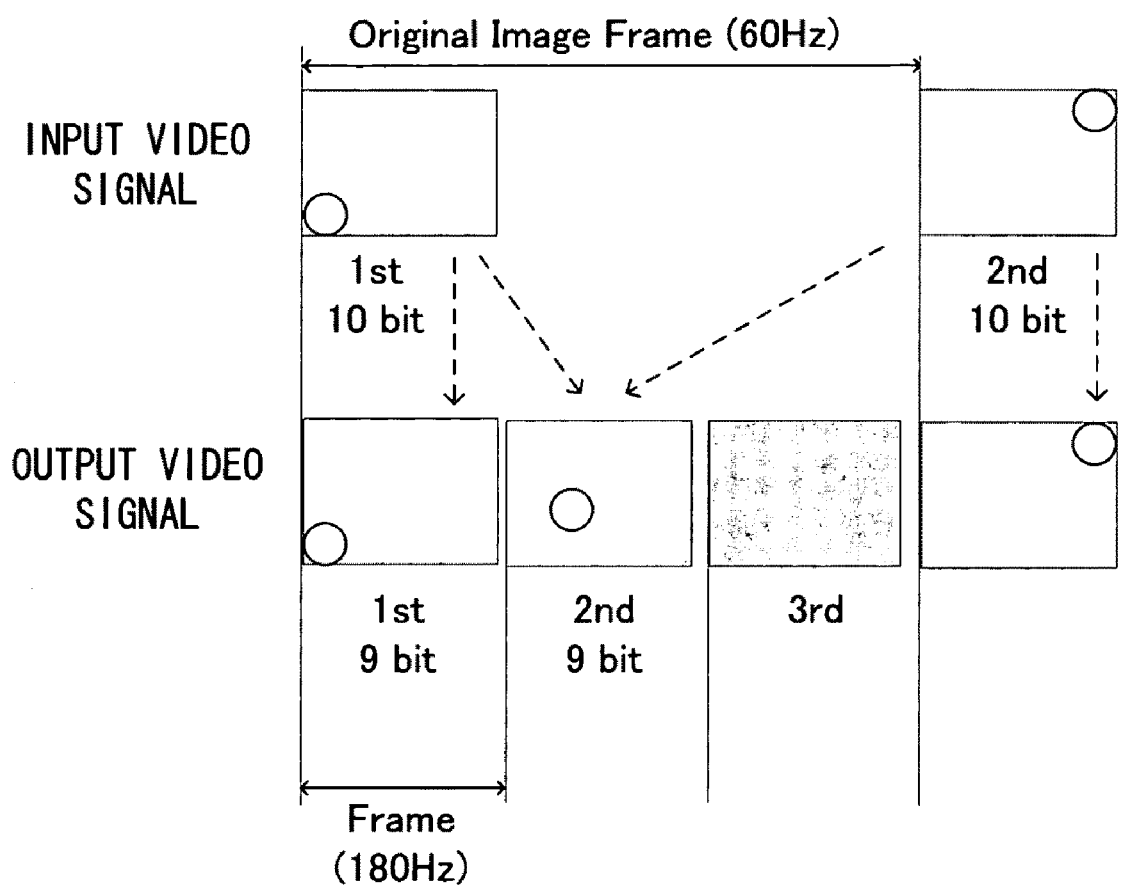
FIG. 14 is a diagram showing a yet another exemplary operation of an image processing unit according to a first preferred embodiment.

FIGS. 13 and 14 are diagrams showing yet another exemplary operation of the image processing unit 1017.

FIGS. 13 and 14 illustrate the process of generating an output video signal which has a 180 Hz frame rate from an input video signal which has a 60 Hz frame rate and in which the video signal of each frame has 10-bit gray scale data for each pixel. In this case, however, the video signal of a frame is generated such that, of the video signals of three frames of an output video image are generated within the period of one frame of the input video signal, each of the video signals of the first and second frames has 9-bit gray scale data for each pixel, and such that the video signal of the third frame has only grayscale designation data designating all pixels to be white (W), black (K) or gray (Gy).

In the present example, the output video signal generated within the period of one frame of the input video signal consists of signals of three frames, i.e., the video signal of the first frame of an output video image, which is the video signal generated by converting 10-bit data of the video signal of the first frame of an input video signal for each pixel into 9-bit data, the video signal of the second frame of an output video signal having 9-bit gray scale data for each pixel generated from the video signals of the adjacent first and second frames of the input video image by means of a motion image interpolation, and the video signal of the third frame of output video image having only grayscale designation data designating all pixels to be white (W), black (K) or gray (Gy).

Specifically, the grayscale designation data is generated by the frame interpolation unit 1033. If the SLM 1002 is controlled on the basis of a signal having only the grayscale designation data, the mirrors 1053 of all of the pixel elements are likewise controlled so that all pixels are displayed in white, black or gray on the basis of the grayscale designation data.

FIG. 13 exemplifies the case of applying data so as to designate a gray scale in which all pixels are white. This example makes it possible to obtain a bright video image with less degradation in the contrast.

FIG. 14 illustrates the process of applying data to designate a gray scale in which all pixels are gray. In this example, a gray scale which designates all pixels to be gray can be determined on the basis of the average value of intensity of the entire video image in a continuously inputted video signal.

As described above, the load related to the generation processing of the video signal of a frame can be alleviated by designating one of the video signals of the three frames of output video signals as the signal of a frame having only grayscale designation data.

Further, the gray scale data volume of the signal of a frame having only the grayscale designation data is limited to a data volume required to designate a gray scale common to all pixels, significantly reducing the data volume when compared with the data volume of another frame of an output video image. Therefore, the present example also makes it possible to generate an output video signal having a frame rate three times that of the input video signal without a need to change the data volume related to the gray scale data for the period of one frame of the input video signal.

Figure 15:
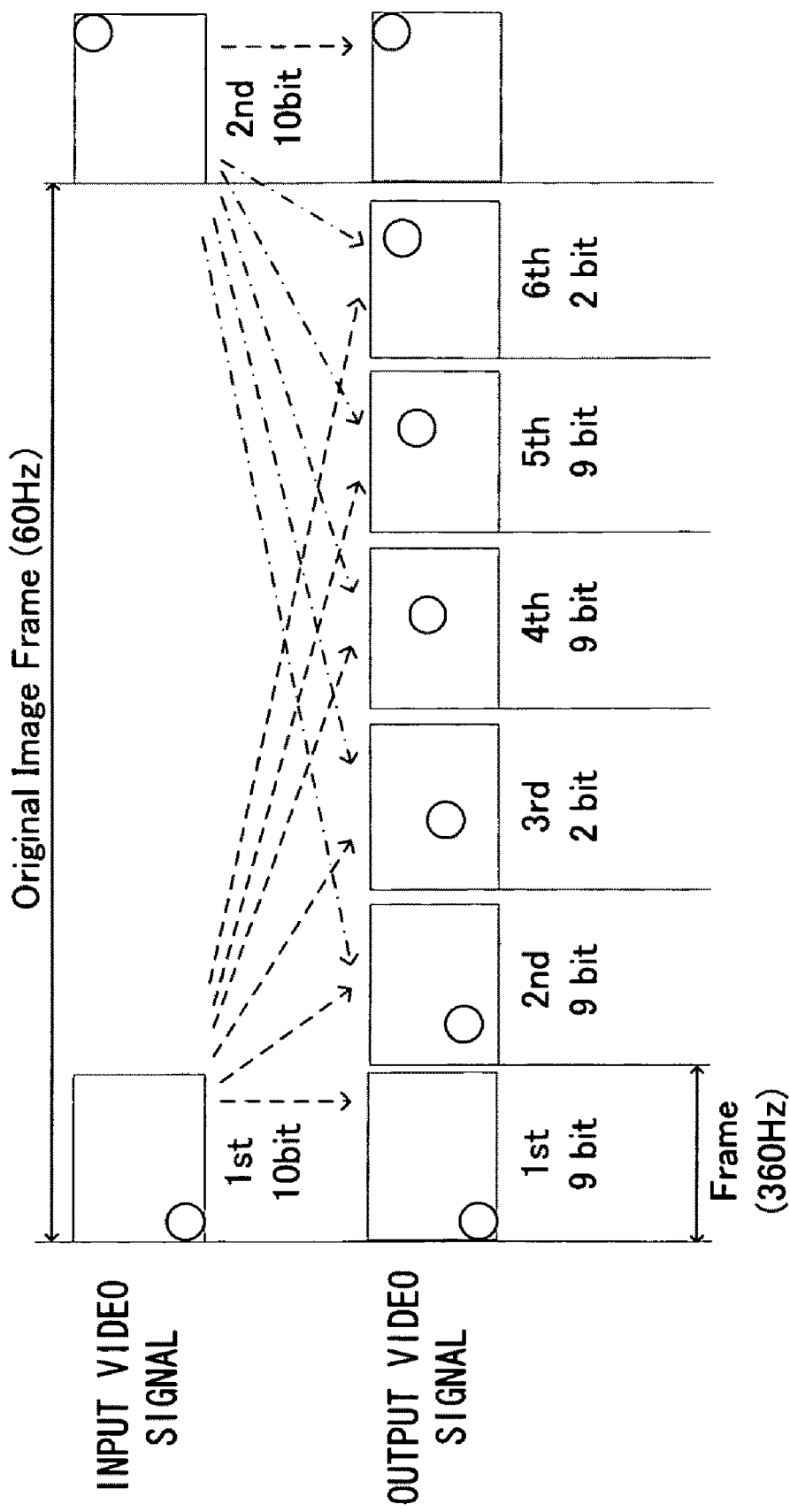
FIG. 15 is a diagram showing a yet another exemplary operation of an image processing unit according to a first preferred embodiment.

FIG. 15 is a diagram that shows yet another exemplary operation of the image processing unit 1017.

Figure 1A:
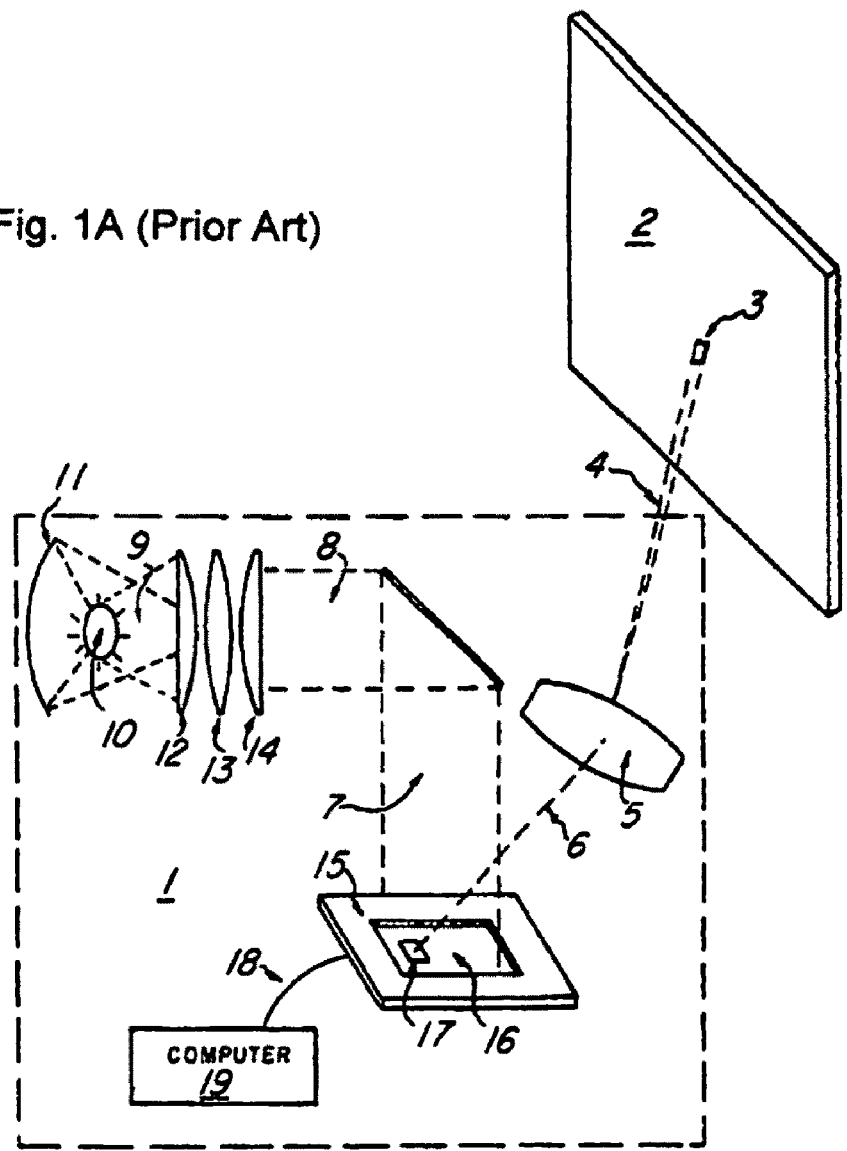
FIG. 1A illustrates the basic principle of a projection display using a micromirror device, as disclosed in a prior art patent.
Figure 1B:
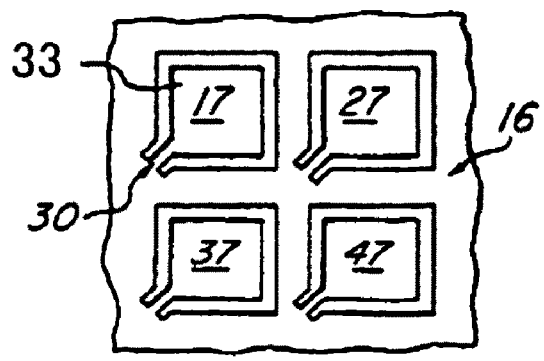
FIG. 1B is a top view diagram showing the configuration of mirror elements of a portion of a micromirror array of a projection apparatus disclosed in a prior art patent.
Figure 1C:
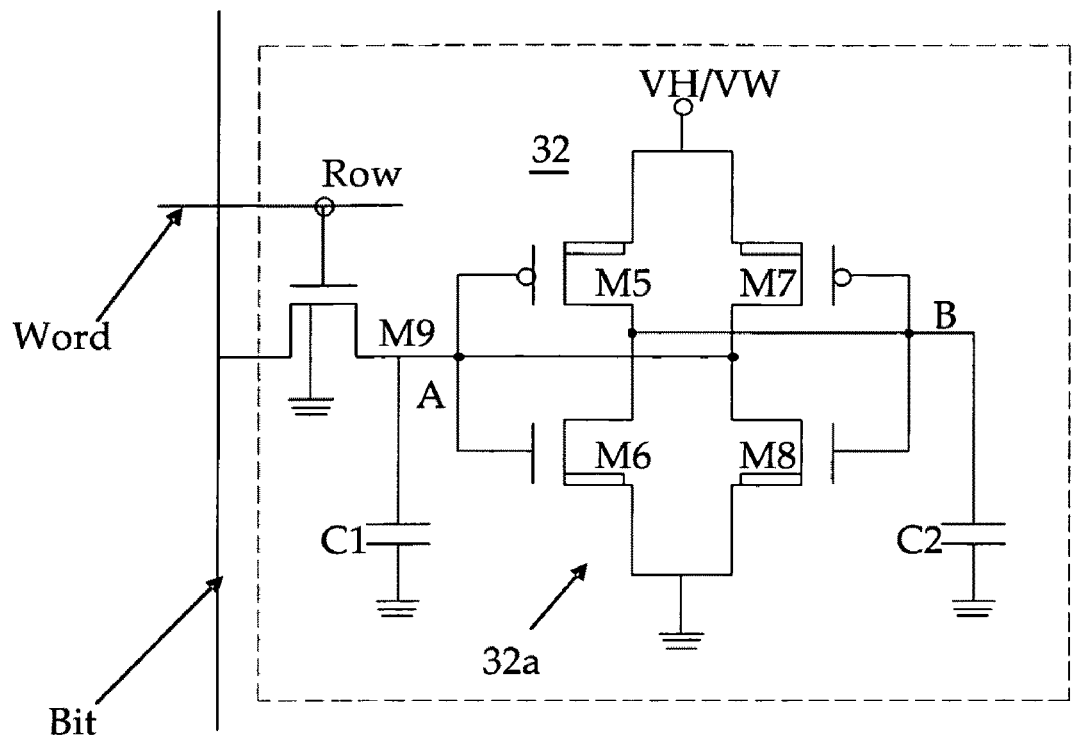
FIG. 1C is a circuit diagram showing the configuration of a drive circuit of mirror elements of a projection apparatus disclosed in a prior art patent.
Figure 1D:
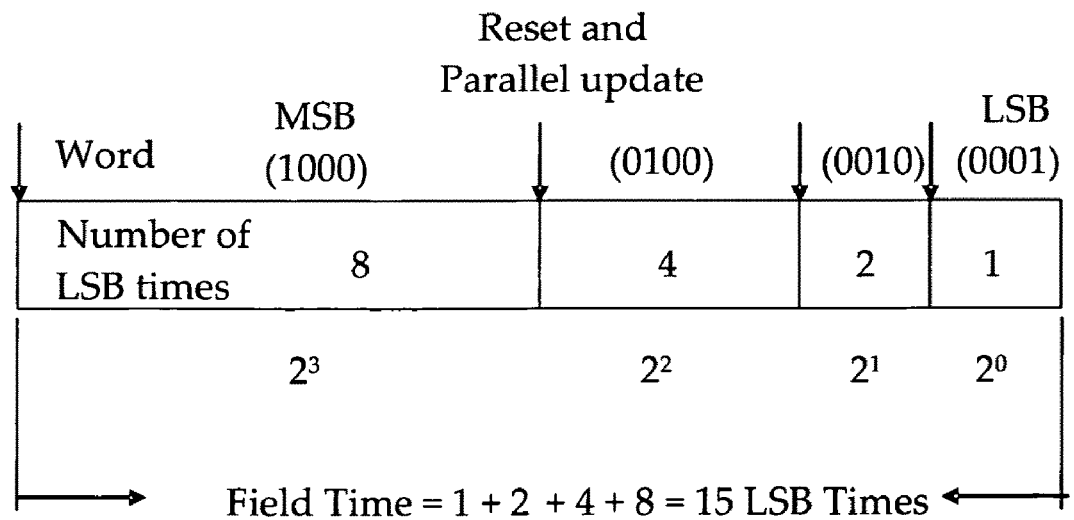
FIG. 1D shows the scheme of Binary Pulse Width Modulation (Binary PWM) of conventional digital micromirrors for generating a grayscale.
Figure 2:
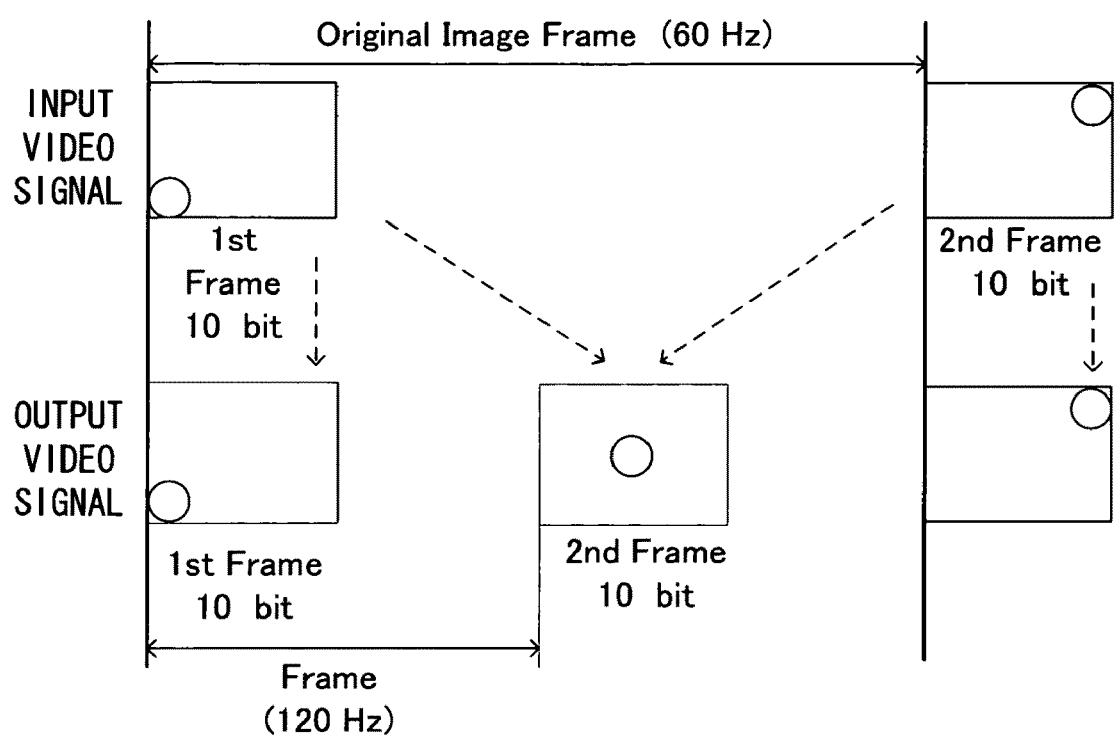
FIG. 2 is a diagram showing an example of generating the frame signal of a 120 Hz high-frame rate output video signal from a 60 Hz frame rate input video signal.
Figure 3:
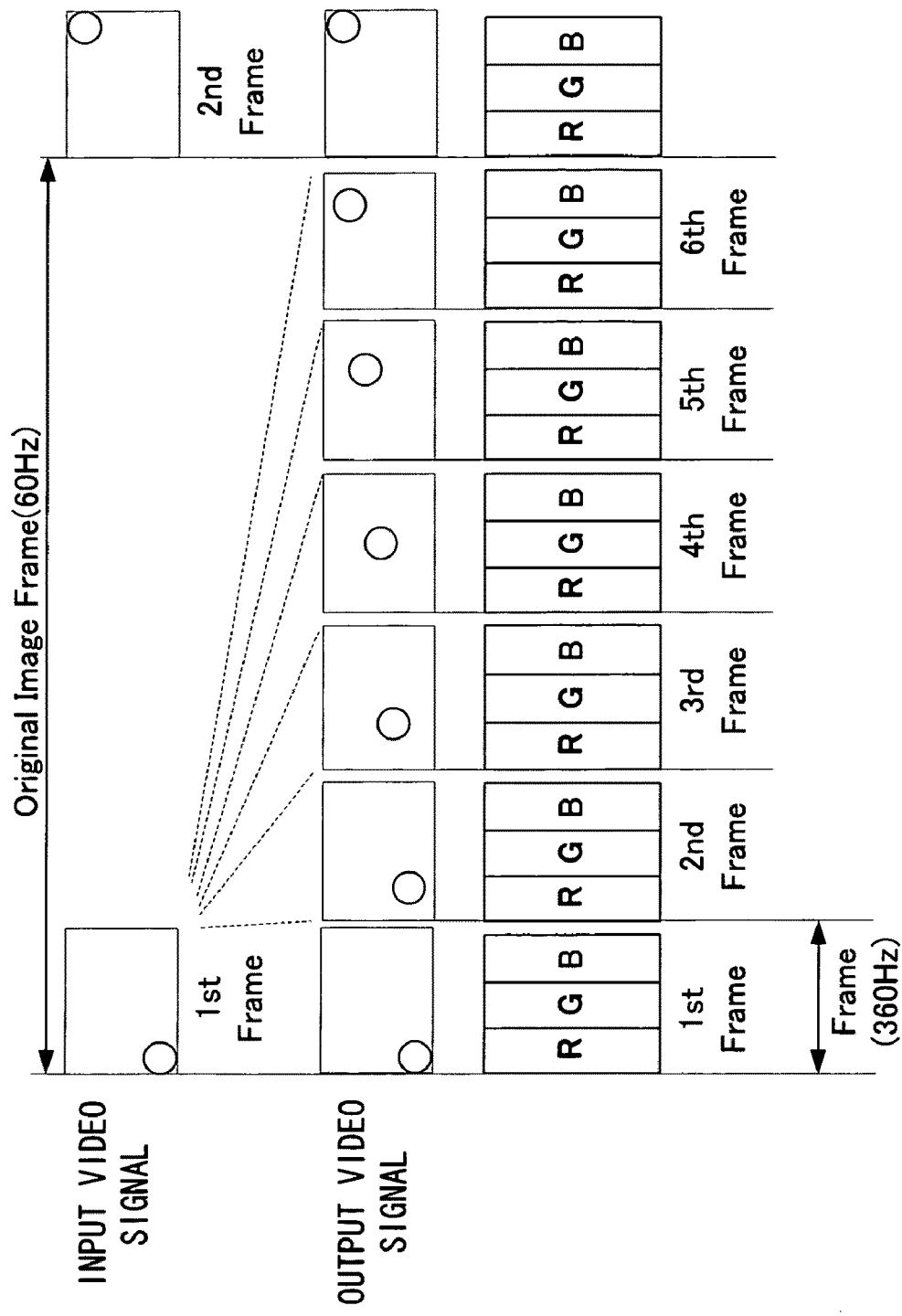
FIG. 3 is a diagram showing an example of generating a 360 Hz high-frame rate output video signal, as a video signal to be displayed, from a 60 Hz frame rate input video signal in a display system employing a color sequential display method.

The image processing unit 1017 used for the present exemplary operation similar to a unit included in the existing image processing system that was described for FIG. 2, has a processing capability of generating, from an input video signal which has a 60 Hz frame rate and in which each pixel has 10-bit data, an output video signal which has a 120 Hz frame rate and in which each pixel has 10-bit gray scale data. Specifically, the image processing unit 1017 used for the present exemplary operation includes a frame interpolation unit 1033 having a data processing capability of approximately two times the image interpolation process shown in the systems shown in FIGS. 9 through 14.

FIG. 15 exemplifies the case of generating an output video signal which has a 360 Hz frame rate from an input signal which has a 60 Hz frame rate and in which the video signal of each frame has 10-bit gray scale data for each pixel. In this case, however, an output video signal is generated such that, of the video signals of six frames of an output video image generated within one frame of the input video signal, each of the video signals of the first, second, fourth and fifth frames has 9-bit gray scale data for each pixel, and such that each of the video signals of the remaining two frames, the third and sixth frames, has 2-bit gray scale data for each pixel.

In the present example, an output video signal generated within the period of one frame of the input video signal consists of signals of six frames, i.e., the video signal generated by converting the gray scale data of the video image of the first frame of an input video signal for each pixel, that is, 10-bit data, into 9-bit data, the video signals of the second, fourth and fifth frames of the output video image which are generated from the video signals of the adjacent first and second frames of the input video image by means of a motion image interpolation and which have 9-bit gray scale data for each pixel, and the video signals of the third and sixth frames of the output video image, which have 2-bit gray scale data for each pixel and are generated in a similar manner to the aforementioned video signals of three frames.

According to the present example, the frame rate of the input video signal is 60 Hz, while the frame rate of the output video signal is 360 Hz. Therefore the output video signal has a frame rate 6 times (6×) that of the input video signal. However, in contrast to a video signal of a frame of an input video image having 10-bit gray scale data for each pixel generated within the period of one frame, the video signals of the first, second, fourth and fifth frames of the output video image have 9-bit gray scale data for each pixel, and the video signals of the third and sixth frames have 2-bit gray scale data for each pixel. Therefore the total gray scale data volume of the output video signal for the period of one frame of input video image is a little larger than two times that of the input video signal. Such an operation can be carried out if the video display system 1001 has a high display processing capability.

Specifically, the present example is configured with each of the video signals of the third and sixth frames have 2-bit gray scale data for each pixel. An alternative configuration may be such that the aforementioned video signal has, for example, 1-bit gray scale data for each pixel. Such a configuration makes it possible to adjust the total gray scale data volume of the output video signal for the period of one frame of the input video signal to be closer to two times the data volume of the input video signal. Specifically, the configuration makes it possible to change the number of gray scales in which the display is performed to the equivalent of one pixel of the video signals of the third and sixth frames, in accordance with the processing capability of an image processing apparatus.

As described above, the present embodiment is configured to generate video signals of a plurality of frames of an output video image so that the total volume generated within the period of one frame of the continuously inputted video signal is the same as the volume of the input video signal, thereby making it possible to attain a motion image display with smoother movement without increasing the load of video image processing and display processing.

Second Preferred Embodiment

The following is a description of an exemplary operation of the image processing unit 1017 equipped in the display processing unit 1006, SLM controller 1018, and spatial light modulator (SLM) 1002, according to the present embodiment performed in the video display system 1001.

According to the present embodiment, the number of gray scales of brightness of each piece of pixel data in the video signal of each frame continuously outputted from the signal conversion unit 1034 is smaller than the corresponding number in the video signal of each frame inputted into the frame interpolation unit 1033, but in which the image processing unit 1017 and SLM controller 1018 processes the data such that the number of gray scales of brightness perceived by an observer viewing the video image is approximately the same as the number of gray scales of brightness of the data in the input video signal 1020.

Further specifically, the image processing unit 1017 generates, from a video signal which is inputted into the frame interpolation unit 1033, an output video signal in which the gray scale data volume of the video signal for each frame is smaller than the corresponding data volume of the input video signal and which has a higher frame rate than that of the input video signal. For a plurality of continuous frames of the output video signals generated within the period of one frame of the input video signal, the SLM controller 1018 predetermines an offset amount in the level of brightness in other frames relative to a first frame, which functions as a reference frame. Then, an output video signal, having a plurality of continuous frames, is generated so that the gray scale of brightness of a video image, perceived by an observer viewing and sequentially integrating a plurality of video images, is approximately equal to the gray scale of brightness of a video image perceived when viewing the video image in accordance with the frame signal of the input video image.

This operation sets the perceived gray scale of brightness of a video image, continuously projected in accordance with the output video signal, approximately equal to the gray scale of brightness of the video image of the input video signal.

Figure 16:
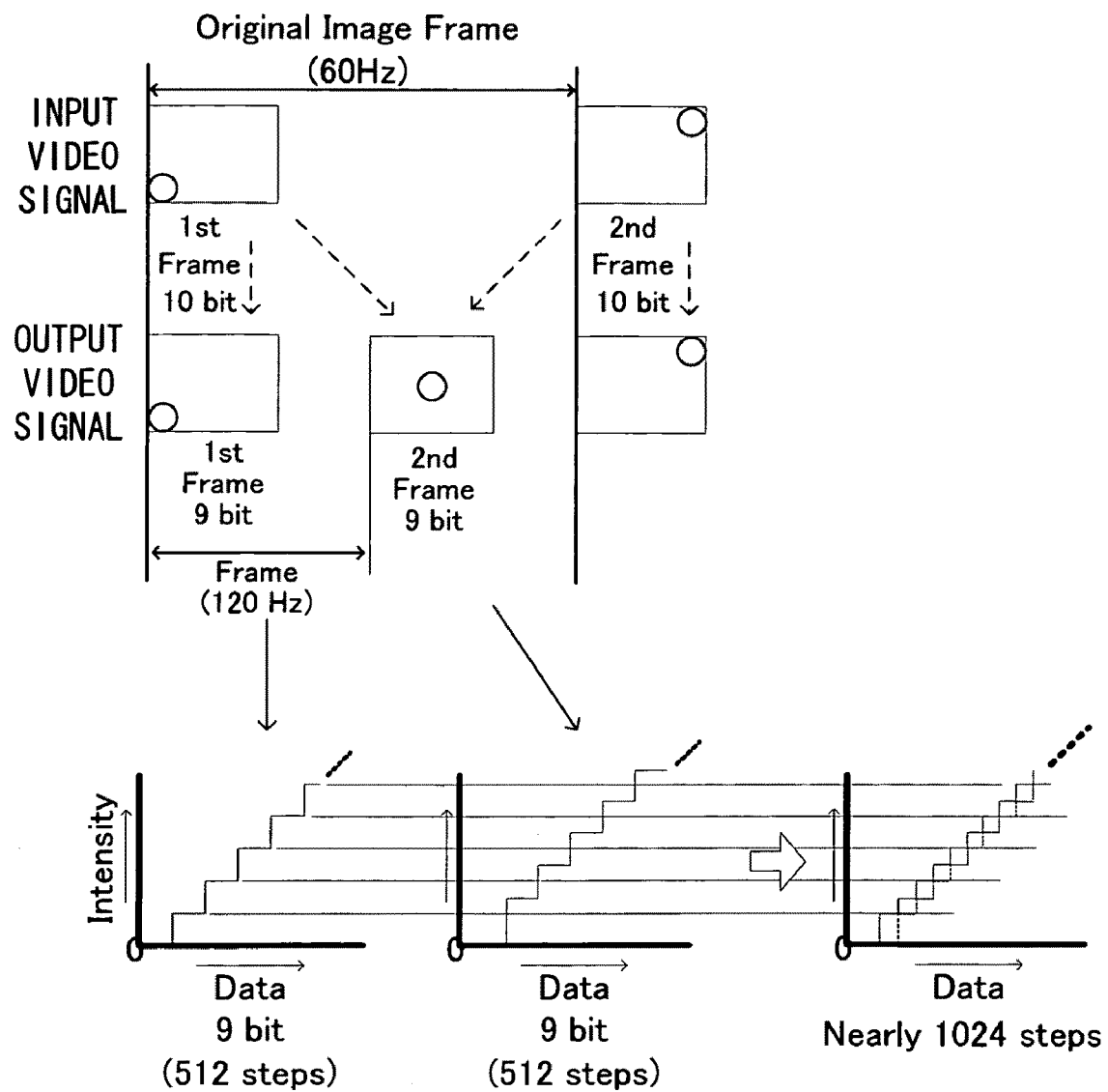
FIG. 16 is a diagram showing an exemplary operation of an image processing unit according to a second preferred embodiment.

FIG. 16 is a diagram showing such an exemplary operation of the image processing unit 1017.

Referring to FIG. 16, more specifically, the label, "input video signal" represents a video signal inputted into the frame interpolation unit 1033, and the label, "output video signal" represents a video signal outputted from the signal conversion unit 1034 (this designation is the same for FIG. 17 and FIGS. 20 through 23). Assuming that a video signal 1020 continuously inputted into the image processing unit 1017 is a digital signal and also that the resolution of the video signal 1020 is the same as that of the video display system 1001, the "input video signal" constitutes the video signal 1020. Further, in FIG. 16, the video image of the "input video signal" is a video image of a ball moving from the bottom left to the top right (which is the same for FIG. 17 and FIGS. 20 through 23).

FIG. 16 exemplifies the case of generating, from an input video signal which has a 60 Hz frame rate and in which the video signal of each frame has 10-bit gray scale data for each pixel, an output video signal which has a 120 Hz frame rate and in which the video signal of each frame has 9-bit gray scale data for each pixel.

In this example, an output video signal generated within the period of one frame of an input video signal consists of signals of two frames: 1.) the video signal of the first frame, which is generated by converting the 10-bit data of the video image of the first frame of an input video image for each pixel into 9-bit data, and 2.) the video signal of second frame, which is generated from the video signals of the adjacent first and second frames of the input video signal by means of a motion image interpolation, and which has 9-bit gray scale data for each pixel.

For the output video signals of the two frames, the brightness of a display video image determined in accordance with the value (excluding "0") of gray scale data is set differently for the video signal of the first frame than for the second frame. In this example, it is predetermined that one-half ("½") of the amount of change of brightness per gray scale level, which can be expressed by the video signal of the first frame, is designated as an offset amount. The gray scale levels (excluding "0") expressible with the video signal of the second frame is calculated by adding the offset amount to each of the gray scale levels (excluding "0") of the first frame. For example, assuming that the amount of change of brightness per gray scale level of the first frame is "1", the gray scale levels (excluding "0") of the second frame is calculated by adding 0.5 (=½), as the offset amount, to each of the gray scale levels (excluding "0") of the first frame. In this case, the value of the next higher gray scale level after "0" of the first frame is "1", and therefore, the next higher gray scale level after "0" of the second frame is "1.5" (=1+0.5). Likewise, the next higher gray scale level after "1" of the first frame is "2", and therefore, the next higher gray scale level to "1.5" of the second frame is "2.5" (=2+0.5).

By applying the calculations described above, an output video signal, which has two continuous frames per one frame of the input video signal, is generated such that the perceived gray scale of brightness of a video image (obtained by the SLM 1002 modulating the illumination light 1008 in accordance with the output video signal) is approximately equal to the perceived gray scale of brightness of a video image obtained by the SLM 1002 modulating the illumination light 1008 in accordance with the video image of the input video image.

With this operation, the number of gray scales of brightness expressible with the output video signals constituting the two continuous frames is "512" (=9 bits), whereas the number of gray scales of brightness perceived by the observer, integrating the two continuous video images, is approximately "1024" (=10 bits), which is the number of gray scales of brightness expressible with the video image projected onto the screen 1012 in accordance with the input video signal. Therefore, when a plurality of continuously outputted video images is projected onto a screen 1012 in accordance with the output video signals, the gray scale of brightness of perceived by an observer is approximately equal to the gray scale of brightness of the video image of the input video signal.

Figure 17:
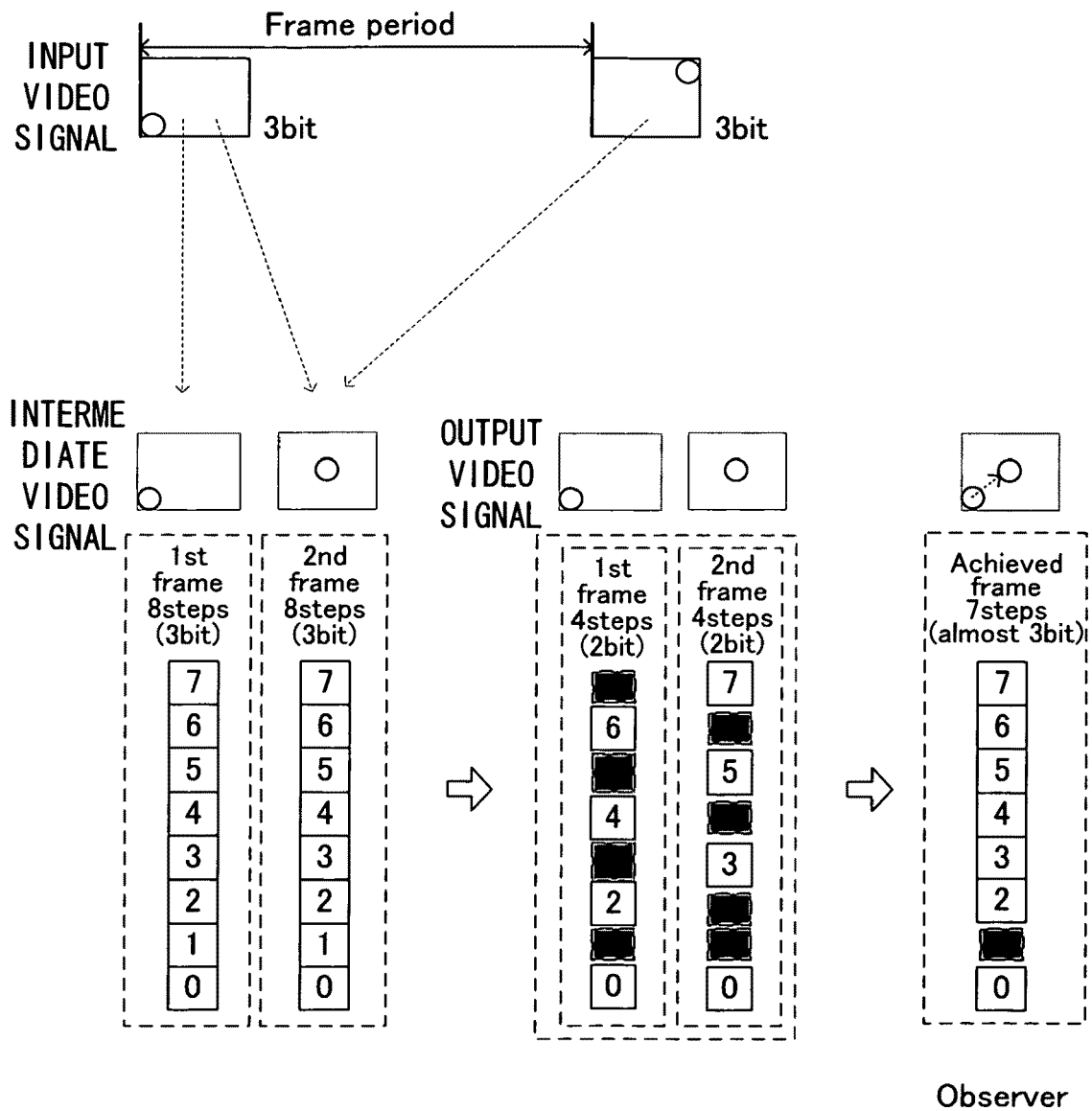
FIG. 17 is a diagram showing, a specific example of the exemplary operation of the image processing unit described with reference to FIG. 16.

FIG. 17 is a diagram showing, further specifically, the exemplary operation of the image processing unit 1017, SLM controller 1018, and spatial light modulator (SLM) 1002, all of which are described with reference to FIG. 16. The example shown in FIG. 17, however, assumes for the sake of convenience, that the video signal of each input frame has 3-bit gray scale data for each pixel, that the frame rate of the output video signal is two times that of the input video signal, and that the output video signal of each frame has 2-bit gray scale data for each pixel.

As shown in FIG. 17, first, the video signals of two frames, intermediate video signals, are generated within the period of one frame of the input video image. Here, the video signal of the first frame is the same as the frame signal of the input video signal, and the video signal of the second frame is a video signal generated from the input video signals of two adjacent frames by means of a motion image interpolation. Note that, at this point, the gray scale data of each frame signal of the intermediate video signal for each pixel remains as 3-bit data.

Then, each of the video signals of the first and second frames, with 3-bit gray scale data (i.e., the number of gray scales=8) for each pixel, is converted into an output video signal having 2-bit gray scale data (i.e., the number of gray scales=4) for each pixel.

In this conversion, one-half (½) of the amount of change of brightness per gray scale level, expressible with the video signal of the post-conversion first frame, is designated as an offset amount. The values, obtained by adding the offset amount to each of the gray scale levels of brightness (excluding "0") of the post-conversion first frame, are defined as the gray scale levels (excluding "0") of brightness expressible with the video signal of the post-conversion second frame. With this calculation, the conversion is carried out so that the gray scale of brightness of a video image perceived by an observer viewing and integrating two video images, obtained by the SLM 1002 modulating the illumination light 1008 in accordance with the video signals of the post-conversion first and second frames, is approximately equal to the gray scale of brightness perceived by the observer viewing a video image obtained by the SLM 1002 modulating the illumination light in accordance with the frame signal of the input video image corresponding to the aforementioned post-conversion frames.

In this example, the video signal of the first frame of the intermediate video signal is converted from a signal in which eight gray scale level values (i.e., 0, 1, and 2 through 7) can be expressed with 3-bit gray scale data for each pixel into an output video signal in which the four gray scale level values (i.e., 0, 2, 4 and 6) can be expressed with 2-bit gray scale data for each pixel. The video signal of the second frame of the intermediate video signal is converted from a signal in which eight gray scale level values (i.e., 0, 1, and 2 through 7) can be expressed with 3-bit gray scale data for each pixel into an output video signal in which the four gray scale level values (i.e., 0, 3, 5 and 7) can be expressed with 2-bit gray scale data for each pixel. More specifically, the gray scale levels expressible with the first frame signal of the output video signal are 0, 2, 4 and 6, and therefore, the offset value is "1". Therefore, the gray scale levels expressible with the second frame signal of the output video signal are 0, 3 (=2+1), 5 (=4+1) and 7 (=6+1). As such, the video signal of each frame, after the conversion from an intermediate video signal into an output video signal, is a result of thinning out a part of the gray scale level values of brightness expressible with units of pixels of the pre-conversion video signal. Also, the video signals of the first and second frames of the output video signal differ in the expressible gray scale levels of brightness (excluding "0").

With this operation, the expressible number of gray scales, projected in accordance with the output video signals of the generated first and second frames, is "4" (=2 bits). The number of gray scales of brightness perceived by the observer viewing and integrating the video images of the two frames is "7" (i.e., 0, 2, 3, 4, 5, 6 and 7) approximately equal to "8" (=3 bits), which is the number of gray scales expressible with a video image projected onto the screen 1012 in accordance with the input video signal. Therefore, the gray scale perceived by the observer when continuous video images are projected onto the screen 1012, in accordance with the video signals of frames continuously outputted, is approximately the same as the gray scale of the video image of the input video signal.

More specifically, the present embodiment has been described by exemplifying the case of generating an intermediate video signal from the input video signal and providing a processing stage so as to generate an output video signal from the intermediate video signal. It is also possible to generate an output video signal directly from the input video signal so as to obtain a similar output video signal.

Figure 18:
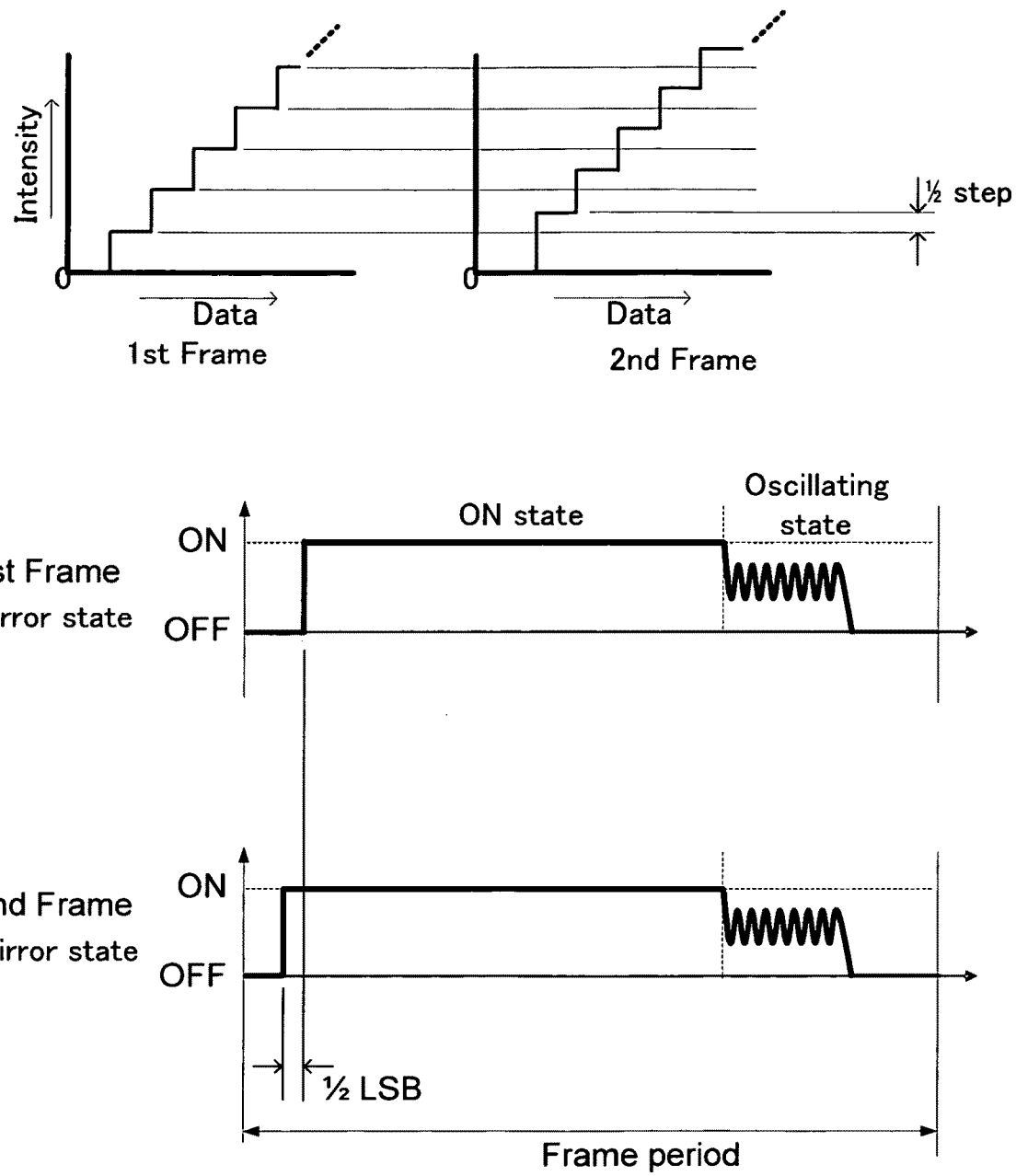
FIG. 18 is a diagram showing an exemplary control for an SLM performed in accordance with the frame signal of an output video signal generated in the exemplary operation described with reference to FIG. 16.
Figure 19:
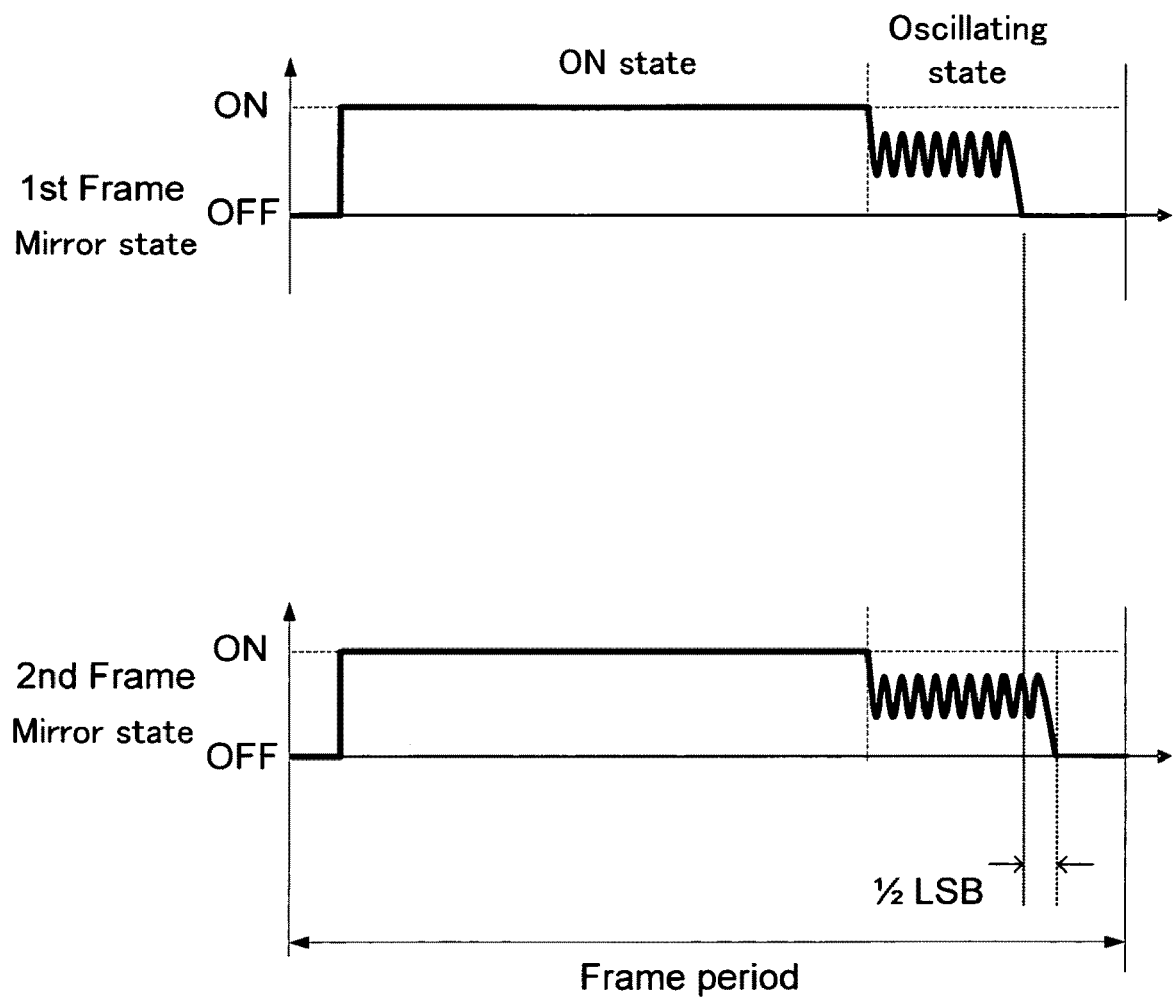
FIG. 19 is a second diagram showing an exemplary control for an SLM performed in accordance with the frame signal of an output video signal generated in the exemplary operation described with reference to FIG. 16.

FIGS. 18 and 19 are diagrams showing the exemplary controls for the SLM 1002 performed in accordance with the output video signal generated in the exemplary operation described with reference to FIG. 16.

Referring to FIGS. 18 and 19, "first frame" and "second frame" represent the video signals of two continuous frames in an output video signal generated within the period of one frame of the input video signal.

As described above, the exemplary operation described with reference to FIG. 16 establishes a rule, in each of the two frames of output video signals, that one-half (½) of the amount of change of brightness, for each gray scale level expressible with the first frame signal, is designated as the offset amount, and that the values produced by adding the offset amount to each of the gray scale levels (excluding "0") of the first frame signal are defined as the gray scale levels (excluding "0") expressible with the second frame signal. Therefore, even if the values of 9-bit gray scale data of a specific pixel corresponding to the video signals of the two frames are the same, the second frame signal will be brighter than the first frame by the above described offset amount, for the specific pixel. Specifically, the light intensity obtained from the second frame signal is higher, by the offset amount, than the light intensity obtained from the first frame signal, for the specific pixel.

The offset amount is designated as one-half (½) of the amount of change of brightness for each gray scale level expressible with the first frame signal, and the gray scale data for each pixel of the output video signal is designated as 9-bit data. Therefore, the light intensity corresponding to the offset amount is a light intensity which can be obtained by the control on the basis of the gray scale data of ½ LSB of the 9-bit.

FIG. 18 exemplifies the case of obtaining a light intensity corresponding to the offset amount by controlling the mirror 1053 under the ON state (refer to "½ LSB" of "second frame Mirror state" shown in FIG. 18).

FIG. 19 exemplifies the case of obtaining a light intensity corresponding to the offset amount by controlling the mirror 1053 under the oscillation state (refer to "½ LSB" of "second frame Mirror state" shown in FIG. 19).

More specifically, both FIGS. 18 and 19 show exemplary controls for the mirror 1053 on the basis of the video signal of the first frame and the second frame when the values of gray scale data of a specific pixel corresponding to the two frames for the period of one frame are same.

Further, in FIGS. 18 and 19, the light intensities are controlled in accordance with the gray scale data of each pixel for the period of one frame of an output video signal by combining the ON control, OFF control, and oscillation control of the mirror 1053.

Figure 20:
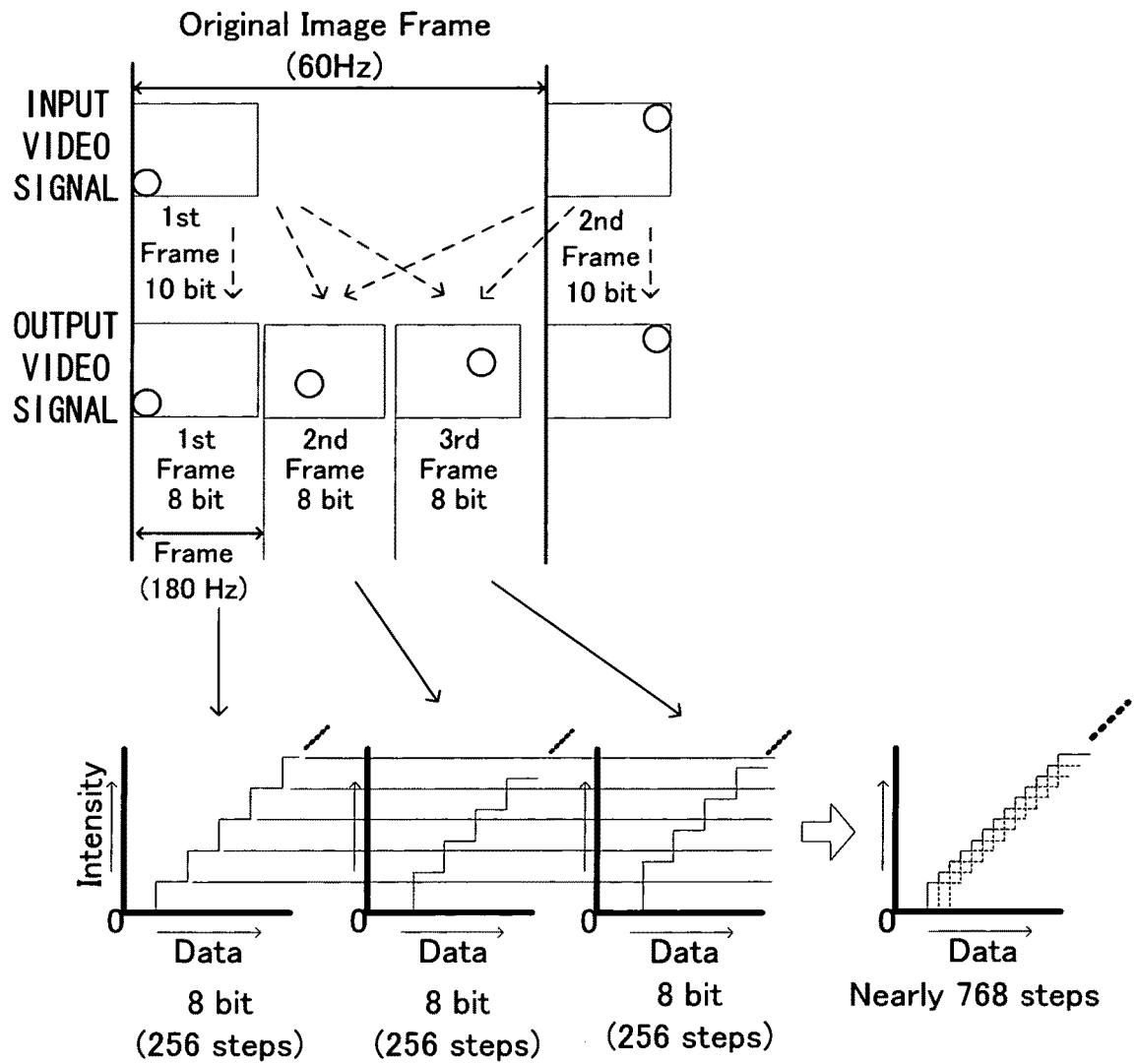
FIG. 20 is a diagram showing another exemplary operation of an image processing unit according to a second preferred embodiment.

FIG. 20 is a diagram showing another exemplary operation of the image processing unit 1017, SLM controller 1018, and spatial light modulator (SLM) 1002.

FIG. 20 exemplifies the case of generating, from an input video signal which has a 60 Hz frame rate and in which each frame signal has 10-bit gray scale data for each pixel, an output video signal which has a 120 Hz frame rate and in which the video signal of each frame has 8-bit gray scale data for each pixel.

In the present example, an output video signal, generated within the period of one frame of an input video signal, consists of signals of three frames, i.e., the video signal of the first frame generated by converting the gray scale data of the first frame of the input video signal for each pixel, that is, 10-bit data, into 8-bit data, and the second and third frames, which are generated from the first and second frames of the input video signals by means of a motion image interpolation, and which have 8-bit gray scale data for each pixel.

For the three frames of output video signals, a pre-established rule determines the level of brightness of display video images on the basis of the value of gray scale data (excluding "0"), which differ among the three frames of video signals. According to the present example, the rule is pre-established so that one-third (⅓) of the amount of change of brightness for each gray scale level expressible with the video signal of the first frame is designated as an offset amount. The values obtained by adding the offset amount to each of the gray scale levels of brightness (excluding "0") expressible with the video signal of the first frame is designated as the gray scale levels of brightness (excluding "0") expressible with the second frame signal. Similarly, the values obtained by adding the offset amount to each of the gray scale levels of brightness (excluding "0") expressible with the video signal of the second frame is designated as the gray scale levels of brightness (excluding "0") expressible with the third frame signal. For example, designating the change of brightness for each gray scale level of the first frame as "1", the gray scale levels of brightness (excluding "0") of the second frame signal are the values obtained by adding ⅓ to each of the gray scale levels of brightness (excluding "0") of the first frame, and the gray scale levels of brightness (excluding "0") of the third frame signal are the values obtained by adding ⅓ to each of the gray scale levels of brightness (excluding "0") of the second frame. In this case, since the next higher gray scale value after "0" of the video signal of the first frame is "1", the next higher gray scale value after "0" of the video signal of the second frame is "1+⅓", and the next higher gray scale value after "0" of the video signal of the third frame is "1+⅓+⅓". Likewise, since the next higher gray scale value after "1" of the video signal of the first frame is "2", the next higher gray scale value after "1+⅓" of the video signal of the second frame is "2+⅓", and the next higher gray scale value after "1+⅓+⅓" of the video signal of the third frame is "2+⅓+⅓".

By applying the calculations described above three continuous frames of output video signals are generated such that the gray scale level of brightness of a video image perceived by an observer viewing and integrating three continuous video images (generated by the SLM 1002 modulating the illumination light 1008 in accordance with of the three frames of the output video signal) is approximately equal to the perceived gray scale level of brightness generated in accordance with the frame signal of the input video signal.

With this operation, the expressible number of gray scales, in accordance with the output video signals having the three continuous frames, is "256" (=8 bits). The number of gray scales of a video image, perceived by the observer viewing and integrating the video images of the three continuous frames, is approximately "768", which is close to "1024" (=10 bits), the expressible number of gray scales s projected in accordance with the input video signal. Therefore, the gray scale of a video image perceived by the observer, when output video images are projected in accordance with the output video signals, is close to the gray scale of the input video signal.

Figure 21:
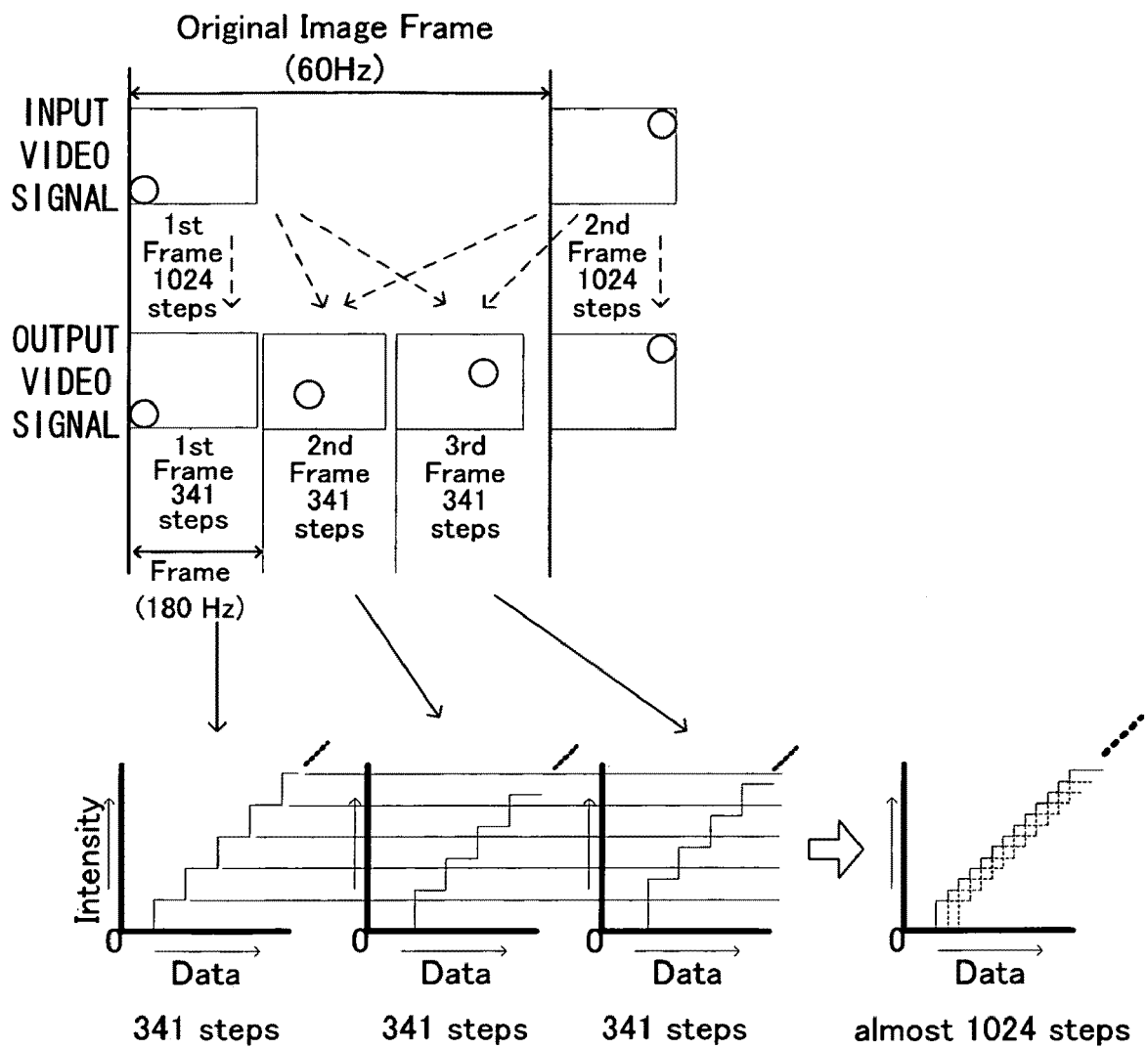
FIG. 21 is a diagram showing yet another exemplary operation of an image processing unit according to a second preferred embodiment.

FIG. 21 is a diagram showing yet another exemplary operation of the image processing unit 1017, SLM controller 1018, and spatial light modulator (SLM) 1002.

FIG. 21 exemplifies the case of generating, from an input video signal which has a 60 Hz frame rate and in which the video signal of each frame is capable of expressing gray scales of 1024 for each pixel, an output video signal which has a 120 Hz frame rate and in which the video signal of each frame is capable of expressing gray scales of 341 for each pixel.

In the present example, an output video signal generated within the period of one frame of an input video signal consists of signals of three frames, i.e., the video signal of the first frame, which is generated by converting the expressible number of gray scales from 1024 into 341 for each pixel of the first frame of an input video image, and the video signals of the second and third frames, which are generated from the video signals of the first frame and second frame of the input video signal by means of a motion image interpolation and which have an expressible gray scale data of 341 for each pixel.

However, as with the exemplary operation described with reference to FIG. 20, for the three frames of output video signals, a pre-established rule determines the level of brightness of display video images on the basis of the value of gray scale data (excluding "0"), which differ among the three frames of video signals. Also, according to this example, the rule is pre-established so that one-third (⅓) of the amount of change of brightness for each gray scale level expressible with the video signal of the first frame is designated as an offset amount. The values obtained by adding the offset amount to each of the gray scale levels of brightness (excluding "0") expressible with the video signal of the first frame is designated as the gray scale levels of brightness (excluding "0") expressible with the second frame signal. Similarly, the values obtained by adding the offset amount to each of the gray scale levels of brightness (excluding "0") expressible with the video signal of the second frame is designated as the gray scale levels of brightness (excluding "0") expressible with the third frame signal.

By applying the calculations described above three continuous frames of output video signals are generated such that the gray scale level of brightness of a video image perceived by an observer viewing and integrating three continuous video images (generated by the SLM 1002 modulating the illumination light 1008 in accordance with of the three frames of the output video signal) is approximately equal to the perceived gray scale level of brightness generated in accordance with the frame signal of the input video signal.

With this operation, the expressible number of gray scales of the three continuous video images projected in accordance with the three frames of output video signals is "341", whereas the expressible number of gray scales perceived by the observer viewing and integrating the video images of the three continuously outputted frames is approximately "1024", which is the expressible number of gray scales of the video image projected in accordance with the input video signal. Therefore, the perceived gray scale of output video images, projected in accordance with the output video signals having a plurality of continuous frames, is approximately equal to the gray scale of the video image of the input video signal.

Figure 22:
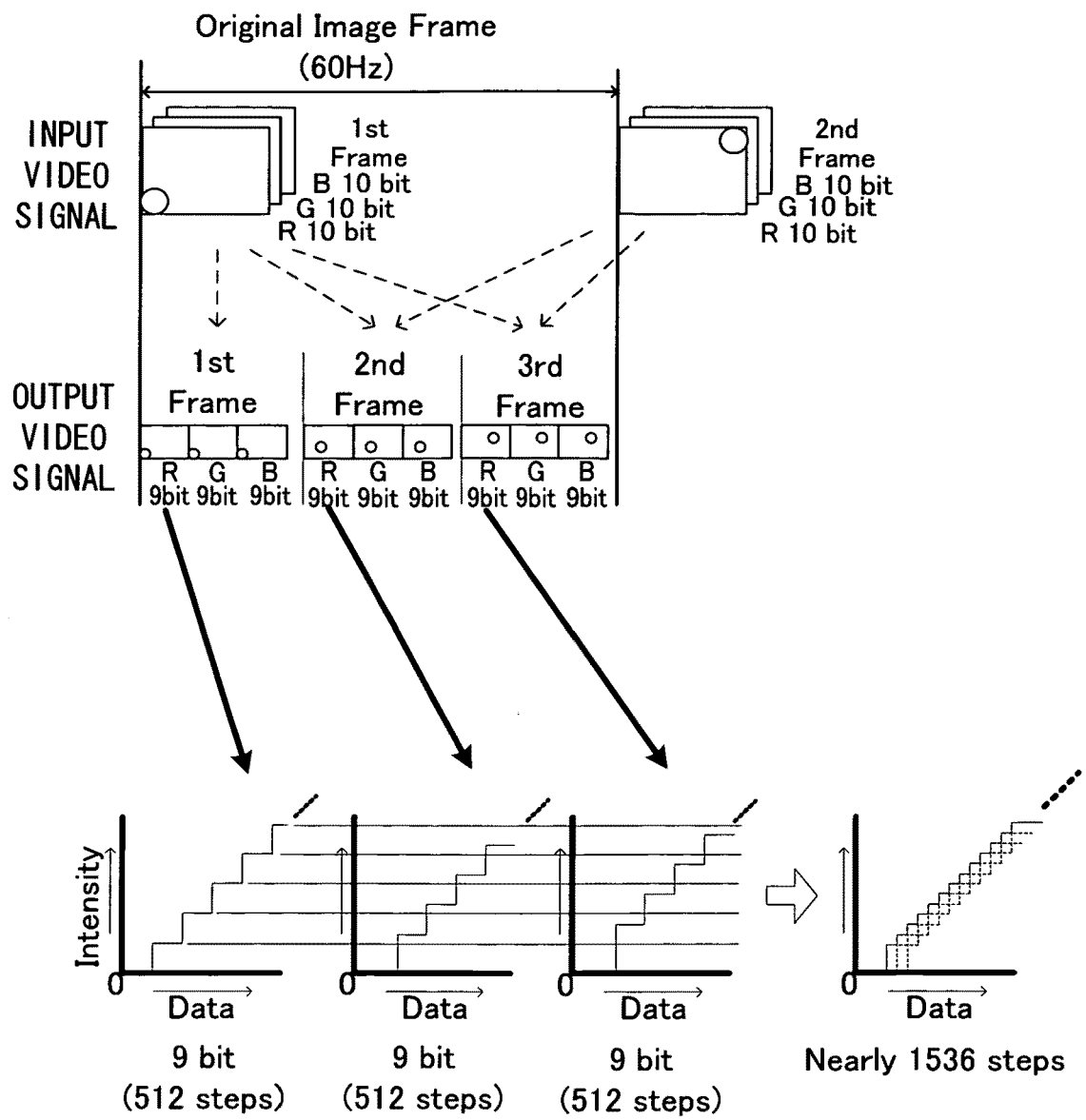
FIG. 22 is a diagram showing yet another exemplary operation of an image processing unit according to a second preferred embodiment.

FIG. 22 is a diagram showing an exemplary operation when a color video image is displayed using the image processing unit 1017, SLM controller 1018, and spatial light modulator (SLM) 1002.

FIG. 22 exemplifies the case of generating, from an input video signal which has a 60 Hz frame rate and in which each frame signal has 10-bit gray scale data for each of the colors R, G and B for each pixel, an output video signal which has a 120 Hz frame rate and in which each frame signal has 9-bit gray scale data for each of the colors R, G and B for each pixel.

In this example, an output video signal generated within the period of one frame of an input video signal consists of signals of three frames, i.e., the video signal of the first frame, generated by converting the gray scale data, 10-bit data into 9-bit data, of the first frame of an input video signal for each color and each pixel, and the video signals of the second frame and third frame, generated from the video signals of the first frame and second frame of the input video signal by means of a motion image interpolation and which has 9-bit gray scale data for each color and each pixel.

More specifically, the video signal of each frame of the output video signal has 9-bit gray scale data for each of the colors R, G and B and for each pixel. Therefore the frame signal of the output video signal has the video signal of an R sub-frame with R color data, a G sub-frame with G color data, and a B sub-frame with B color data.

For the three frames of output video signals, a pre-established rule determines the level of brightness of display video images on the basis of the value of gray scale data (excluding "0"), which differ among the three frames of video signals. Additionally, the level of brightness determined on the basis of the same value of gray scale data for each color on the video signal of the same frame is pre-set to be the same Also, according to this example, the rule is pre-established so that one-third (⅓) of the amount of change of brightness for each gray scale level expressible with the video signal of the first frame is designated as an offset amount. The values obtained by adding the offset amount to each of the gray scale levels of brightness (excluding "0") expressible with the video signal of the first frame is designated as the gray scale levels of brightness (excluding "0") expressible with the second frame signal. Similarly, the values obtained by adding the offset amount to each of the gray scale levels of brightness (excluding "0") expressible with the video signal of the second frame is designated as the gray scale levels of brightness (excluding "0") expressible with the third frame signal.

By applying the calculations described above three continuous frames of output video signals are generated such that the gray scale level of brightness of a video image perceived by an observer viewing and integrating three continuous video images (generated by the SLM 1002 modulating the illumination light 1008 in accordance with of the three frames of the output video signal) is approximately equal to the perceived gray scale level of brightness generated in accordance with the frame signal of the input video signal.

With this operation, the expressible number of gray scales for one color which is projected in accordance with the three frames of output video signals is "512" (=9 bits), whereas the number of gray scales, perceived by the observer viewing and sequentially integrating the video images of the three continuous output frames, is approximately "1536". This number exceeds "1024" (=10 bits), which is the expressible number of gray scales for each color projected in accordance with the input video signal. Therefore, the gray scale of the video image perceived by the observer when continuous video images are projected in accordance with continuous frames of the output video signal exceeds the gray scale of the video image of the input video signal.

Figure 23:
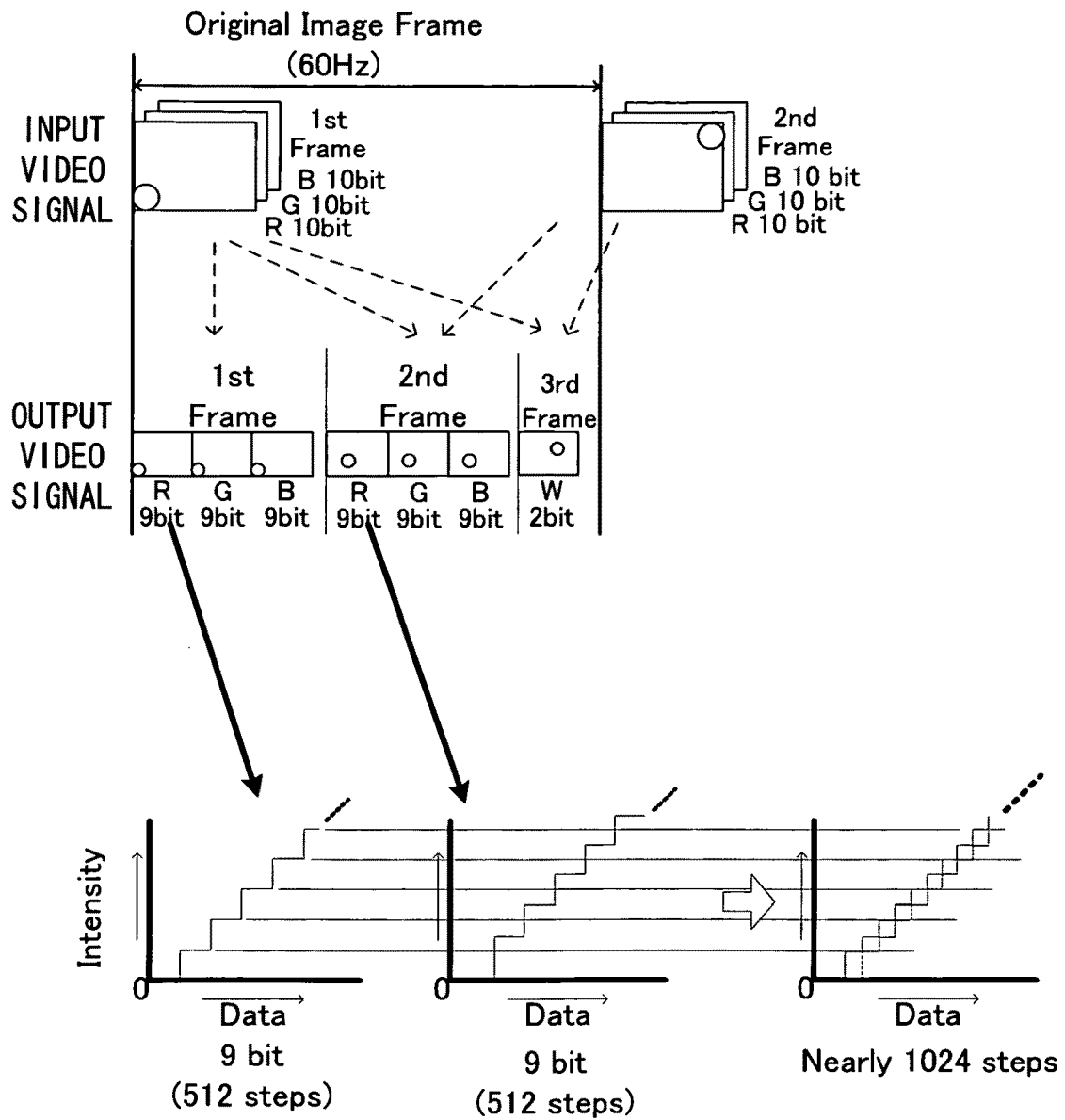
FIG. 23 is a diagram showing yet another exemplary operation of an image processing unit according to a second preferred embodiment.

FIG. 23 is a diagram showing yet another exemplary operation when a color video image is displayed using the image processing unit 1017, SLM controller 1018 and spatial light modulator (SLM) 1002.

FIG. 23 exemplifies the case of generating an output video signal which has a higher frame rate than the input video signal, which has a 60 Hz frame rate, and in which each frame signal has 10-bit gray scale data for each of the colors R, G and B for each pixel.

In the present example, an output video signal generated within the period of one frame of an input video signal consists of signals of three frames, i.e., the video signal of the first frame, which is generated by converting the gray scale data, 10-bit data into 9-bit data, of the video signal of the first frame of the input video signal for each color and each pixel, and the video signals of the second and third frames, which are generated from the video signals of the first and second frames of the input video signal by means of a motion image interpolation. The video signal of the second frame of the output signal has 9-bit gray scale data for each color and each pixel, and the video signal of the third frame of the output video signal has 2-bit gray scale data for each pixel.

Note that since the first and second frames of the output video signals has 9-bit gray scale data for each of the colors R, G and B and for each pixel, the frame signal of each of the video signal has the video signal of an R sub-frame with R color data, a G sub-frame with G color data, and a B sub-frame with B color data. Meanwhile, since the video signal of the third frame has 2-bit gray scale data for each pixel, it is also the frame with the black, white, or gray color data for each pixel. The present example is configured to equip the third frame in order to add a pseudo-gray scale and brightness.

In this case, however, the brightness of the three frames of output video signals is determined in accordance with the value of gray scale data (excluding "0") and is designated differently for the video signal of the first frame than for the second frame. In this example, it is predetermined that one-half ("½") of the amount of change of brightness per expressible gray scale level of the first frame is designated as an offset amount, and that the values obtained by adding the offset amount to each of the expressible gray scale levels (excluding "0") of the first frame is designated as the gray scale levels (excluding "0") of brightness expressible with the video signal of the second frame.

By applying the rule described above, the two continuous frame signals of the output video signals are generated so that the gray scale of brightness of a video image perceived by the observer viewing and integrating the continuous video images (projected by the SLM 1002 modulating the illumination light 1008 in accordance with the two continuous video signals of the output video signal) is approximately equal to the perceived gray scale of brightness of a video image projected by the SLM 1002 modulating the illumination light 1008 in accordance with the input video signal.

With this operation, the expressible number of gray scales of each of the two continuous video images, projected in accordance with the output video signals of the two continuous frames, is "512" (=9 bits), whereas the number of gray scales, perceived by the observer viewing and sequentially integrating the two continuous video images, is "1024". Thus the perceived number of gray scales, i.e., "1024" (=10 bits), is equal to the expressible number of gray scales for each color projected in accordance with the input video signal. Therefore, the perceived gray scale of a video image, when a plurality of continuous video images is projected onto a screen 1012 in accordance with the output video signals having a plurality of continuous frames, is approximately equal to the gray scale of the video image of the input video signal.

As described above, the present embodiment is configured to generate the video signals of a plurality of frames with different gray scale representation and also to set the expressible number of gray scales of each of the video signals of the plurality of frames to be smaller than that of the frame signal of an input video signal, when an output video signal with a higher frame rate than that of the input video signal is generated from the continuously inputted video signal. Thereby, it is possible to process the video signals of the plurality of frames of the output video signal, constituting the video image of one frame of the input video signal, within the period of one frame. It is further configured to perform a high speed display of a plurality of continuous frame output video images in accordance with the video signals of a plurality of continuous frames of an output video signal, and therefore a video image can be perceived by an observer as a smooth video image, maintaining the gray scale representation of the input video signal.

Third Preferred Embodiment

The following is a description of an exemplary operation of the image processing unit 1017 included in the display processing unit 1006 as an exemplary operation according to the present embodiment of the video display system 1001.

The present embodiment is configured to generate, from a continuously inputted video signal, an output video signal having a higher frame rate than that of the input video signal. The input video signal has color video image information, and each frame of the input video signal has video data for each color of the color video image. In this case, the output video signal is configured so as to transmit the video signals of the sub-frames of the individual colors in sequence, and the output video signal is configured so that the number of gray scales of brightness of each pixel of the video image of the sub-frame of each color is smaller, or smaller in a portion of the output video signal, than the number of gray scales of the video data of each color in the input video signal.

Then the sub-frame video images of the individual colors are formed by the SLM controller 1018 and spatial light modulator (SLM) 1002 on the basis of the output video signal and are sequentially displayed on the screen 1012.

Although such an operation sets the number of gray scales of the sub-frame of each color in the output video signal to be smaller, or smaller in a portion of the output video signal, than the number of gray scales of the video signal of each color in the input video signal, the frame rate of the output video signal is higher than that of the input video signal. Therefore, a smoother motion image representation can be attained and the color breakup phenomena can be reduced while reducing the load of the video signal processing and display processing performed in the later-stage circuit(s). Furthermore, a color video image with little degradation in the gray scale of a display video image can be projected.

Figure 24:
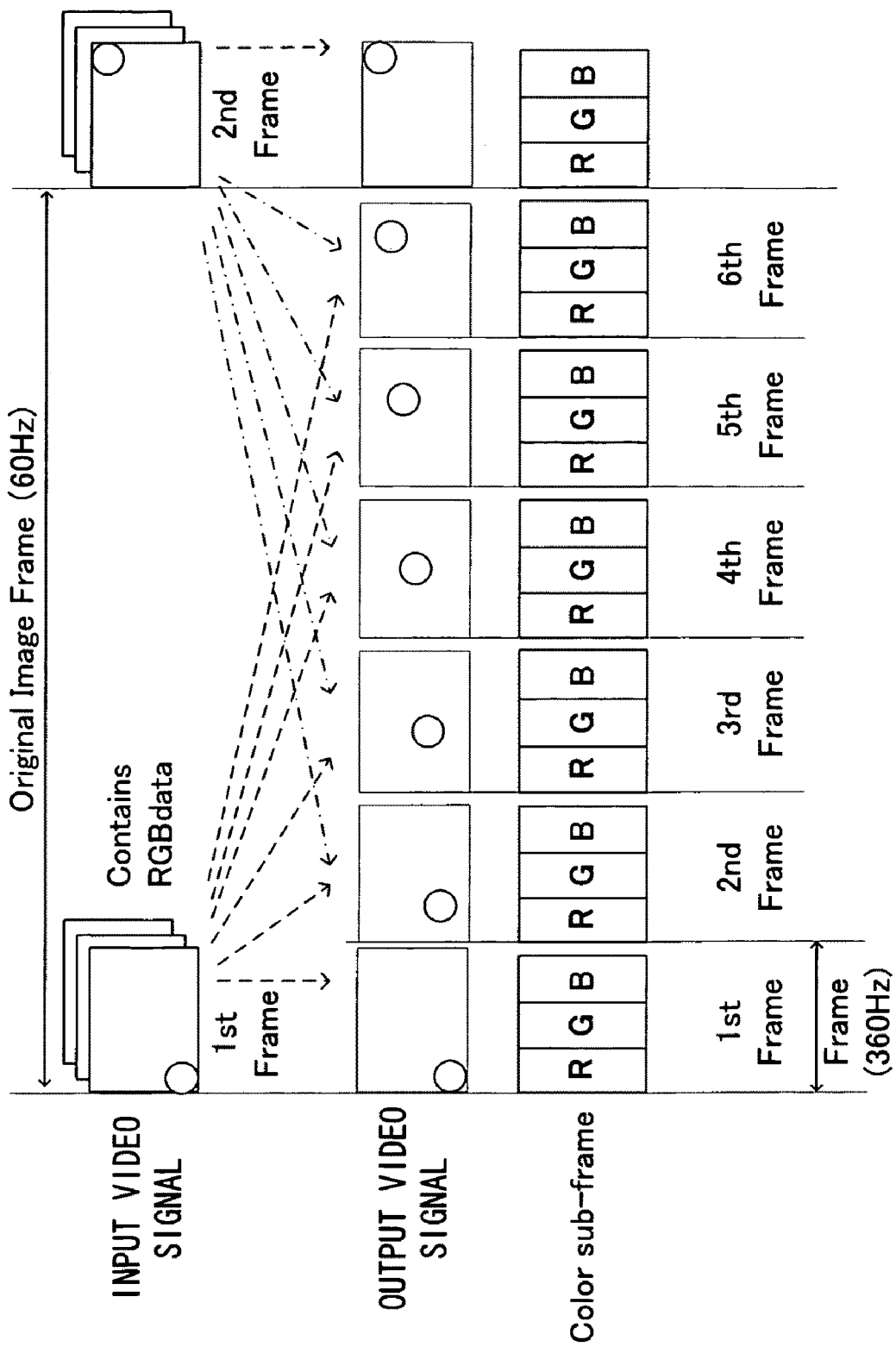
FIG. 24 is a diagram showing an exemplary operation of an image processing unit according to a third preferred embodiment.

FIG. 24 is a diagram showing an exemplary operation of such an image processing unit 1017.

Referring to FIG. 24, "input video signal" represents a video signal input into the frame interpolation unit 1033, and "output video signal" represents a video signal output from the signal conversion unit 1034 (this is the same for FIGS. 25 through 35, which are described later). Assuming that a video signal 1020 continuously inputted into the image processing unit 1017 is a digital signal and that the resolution of the input signal is the same as that of the video display system 1001, the "input video signal" constitutes a video signal 1020. Further, in FIG. 24, the video image of the "input video signal" is an image of a ball moving from the bottom left to the top right (this is the same for FIGS. 25 through 35).

FIG. 24 exemplifies the case of generating an output video signal having a 360 Hz frame rate from an input video signal having a 60 Hz frame rate.

In the present example, an output video signal generated within the period of one frame of an input video signal consists of signals of six frames, i.e., the video signal of the first frame which is generated by converting the video signal of the first frame of the input video signal, and the video signals of the second through sixth frames of the output video signal, which are generated from the video signals of the first frame and second frame of the input video signal by means of a motion image interpolation.

Here, the input video signal has gray scale data for each of the colors R, G and B and for each pixel of each frame. The generated output video signal has gray scale data for each of the colors R, G and B and for each pixel of each frame and allows for a sequential display of the sub-frame images of the respective colors R, G and B. The output video signal, however, is generated in a manner such that the number of gray scales of the sub-frame image for each of the colors R, G and B is smaller than the number of gray scales of the video data of each of the colors included in the input video signal.

Figure 25:
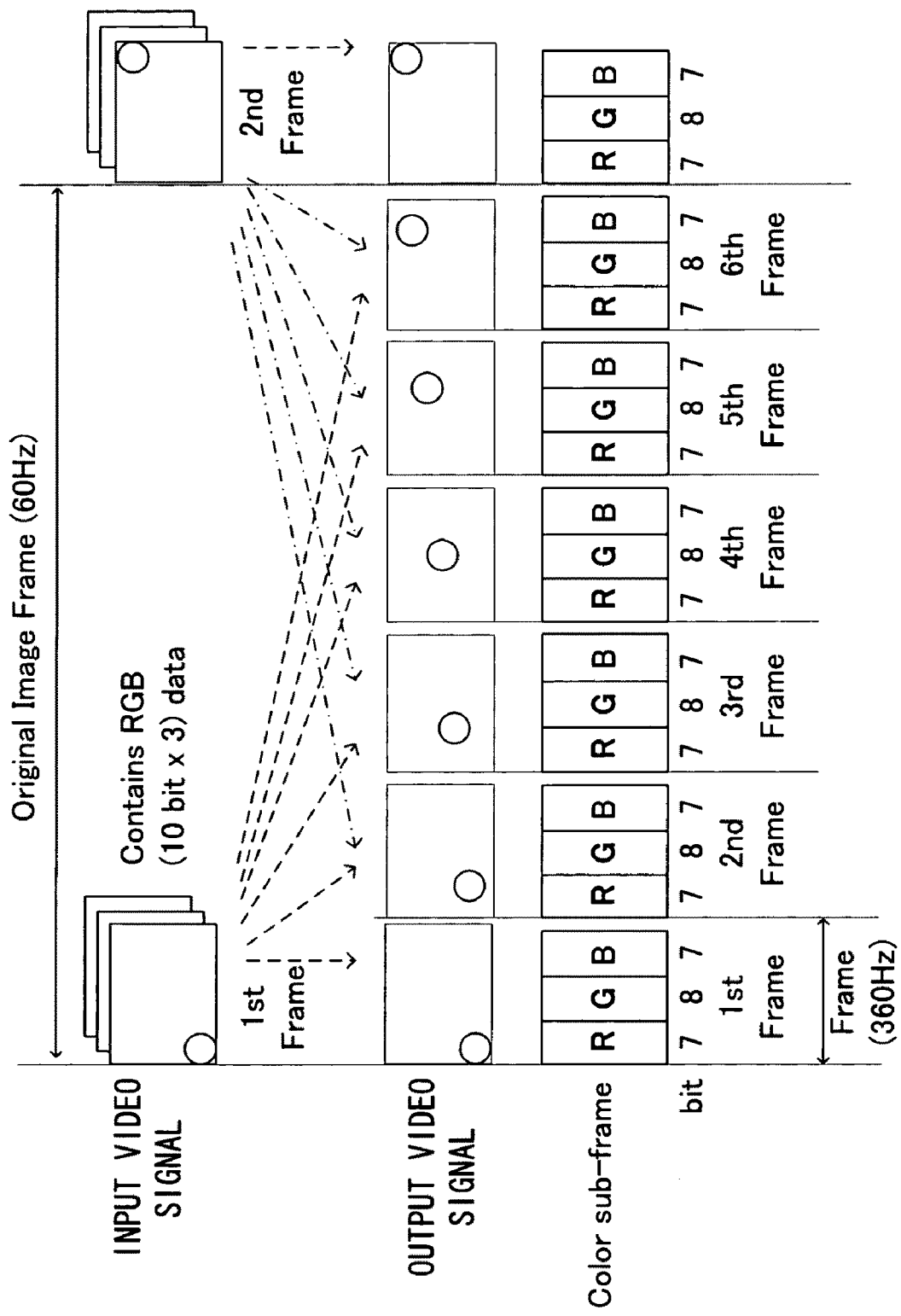
FIG. 25 is a diagram showing a specific example of the exemplary operation shown in FIG. 24.

As an example, if number of gray scales of the video data of each of the colors R, G and B in the input video signal is 1024 (=10 bits), the numbers of gray scales sequentially displayable with the generated output video signal are 128 (=7 bits) for the sub-frame image of the color R, 256 (=8 bits) for that of the color G, and 128 (=7 bits) for that of the color B, as shown in FIG. 25. More specifically, the present example is configured to designate the number of gray scales (=256) for the sub-frame image of G to be larger than the numbers of gray scales (=128) for those of R and B because the human eye is most sensitive to green (G), and thereby the number of gray scales in the entire video image perceived by the human eye is increased.

Here, the total of the number of gray scales (the gray scale data) of the video images of each color included in the period of one frame of the input video signal is 3072, as represented by the following expression (1):

[Number of gray scales of $R$]+[number of gray scales of $G$]+[number of gray scales of $B$]=1024+1024+ 1024=3072   Expression (1)

Further, the total number of the gray scales (the gray scale data) included in six frames of the output video signals generated in the period of one frame of the input video signal is also 3072, as given by the following expression (2):

{[Number of gray scales of $R$ sub-frame]+[number of gray scales of $G$ sub-frame]+[number of gray scales of $B$ sub-frame]}*6=(128+256+128) *6=3072   Expression (2)

With this operation, even though the numbers of gray scales of the sub-frame images for the colors R, G and B in the output video signal (that is, 128, 256, and 128) are smaller than the numbers of gray scales of the sub-frame images for the colors R, G and B in the input video signal (that is, 1024, 1024, and 1024), the frame rate of the output video signal is six times that of the input video signal, making it possible to project a smoother display of a motion image and to alleviate the color breakup phenomena, without a need to increase the load of the video signal processing and display processing performed in a later-stage circuit(s), and enabling the projection of a color video image with little degradation in gray scale of the video image as a whole.

More specifically, the example shown in FIG. 25 is enabled to sequentially display the sub-frame images of each color R, G and B per period of one frame of the output video signal in the same time width, and therefore the sub-frame image of each color has a 1080 Hz sub-frame rate.

Figure 26:
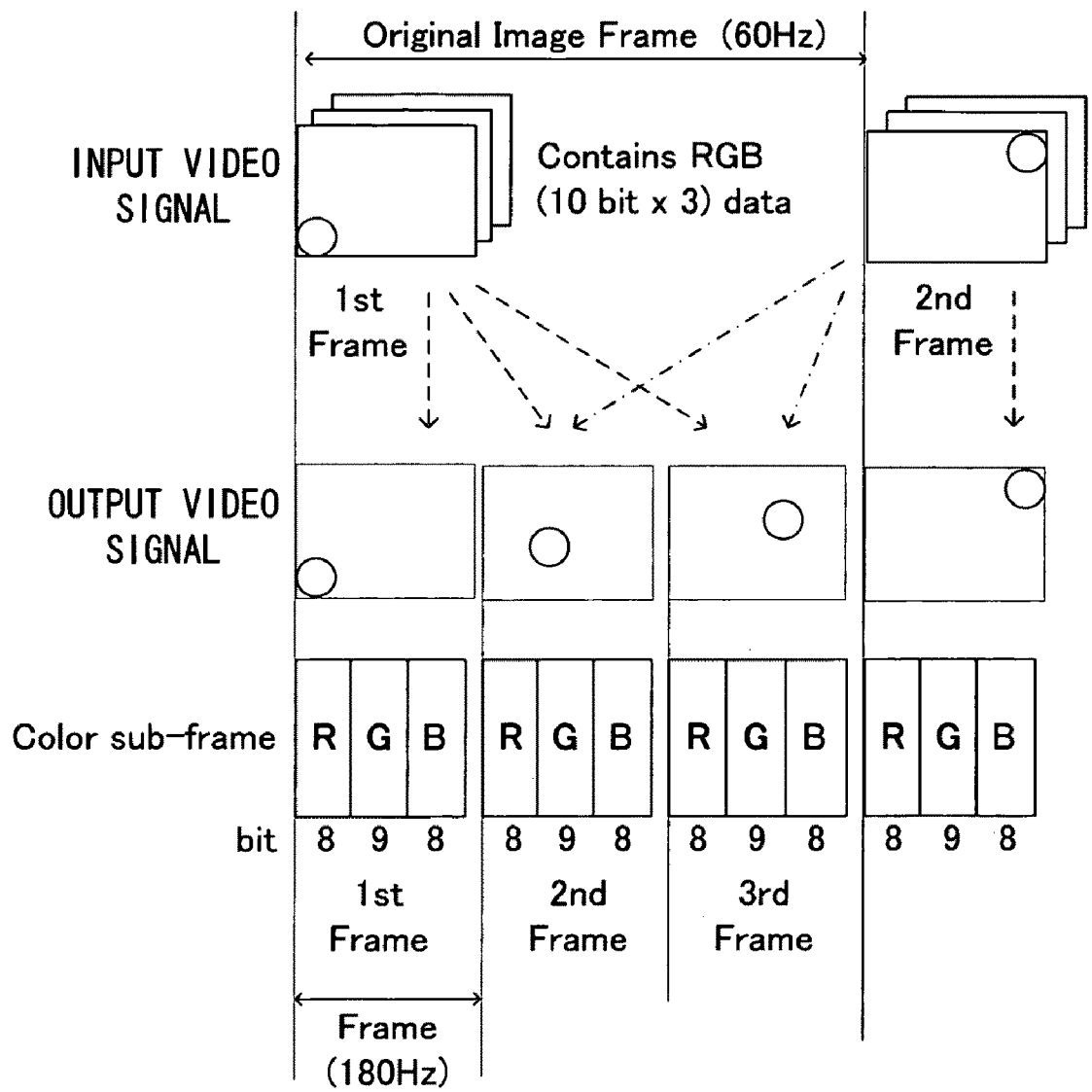
FIG. 26 is a diagram showing another exemplary operation of an image processing unit according to a third preferred embodiment.

FIG. 26 is a diagram showing another exemplary operation of the image processing unit 1017.

FIG. 26 exemplifies the case of generating an output video signal having a 180 Hz frame rate from an input video signal having a 60 Hz frame rate.

In this example, an output video signal generated within the period of one frame of an input video signal consists of signals of three frames, i.e., the video signal of the first frame, which is generated by converting the video signal of the first frame of the input video signal, and the video signals of the second frame and third frame of the output video signal, which are generated from the video signals of the first frame and second frame of the input video signal by means of a motion image interpolation.

Here, the input video signal has 10-bit gray scale data for each of the colors R, G and B for each pixel of each frame. Each of the generated output video signals is a frame signal having 8-bit gray scale data of R, 9-bit gray scale data of G, and 8-bit gray scale data of B, for each pixel of each frame. Also since the human eye is most sensitive to the color green, the number of gray scales of the sub-frame image of the color G, that is, 512 (=9 bits) is larger than the numbers of gray scales of the sub-frame images of the other colors, R and B, both 256 (=8 bits). As such, the output video signals are generated in a manner such that the numbers of gray scales of the sub-frame image of each of the colors R, G and B, respectively 256, 512 and 256, which are sequentially expressible with the generated output video signal, are smaller than the number of gray scales in the video data of the colors R, G and B, that is, 1024 (=10 bits), in the input video signal.

Here, the total number of the gray scales in the video images of the colors included in the period of one frame of the input video image is 3072, which is the value obtained by the above described expression (1).

Further, the total number of gray scales included in three frames of the output video signals generated in the period of one frame of the input video signal is also 3072, as given by the following expression (3):

{[Number of gray scales of $R$ sub-frame]+[number of gray scales of $G$ sub-frame]+[number of gray scales of $B$ sub-frame]}*3=(256+512+256) *3=3072   Expression (3)

With this operation, even though the numbers of gray scales (256, 512, 256) of the sub-frame images of the respective colors R, G and B in the output video signal are smaller than the numbers of gray scales (1024, 1024, 1024) of the respective colors R, G and B in the input video signal, the frame rate of the output video signal is three times that of the input video signal, making it possible to project a smoother display of a motion image and to alleviate the color breakup phenomena without increasing the load of the video signal processing and display processing performed in a later-stage circuit(s), enabling the projection of a color video image with little degradation in the gray scale of the video image as a whole.

Note that, in the example shown in FIG. 26, the sub-frame images of the colors R, G and B for the period of one frame of the output video signals can be sequentially displayed in the same time width, and therefore the sub-frame image of each color has a 540 Hz sub-frame rate.

Figure 27:
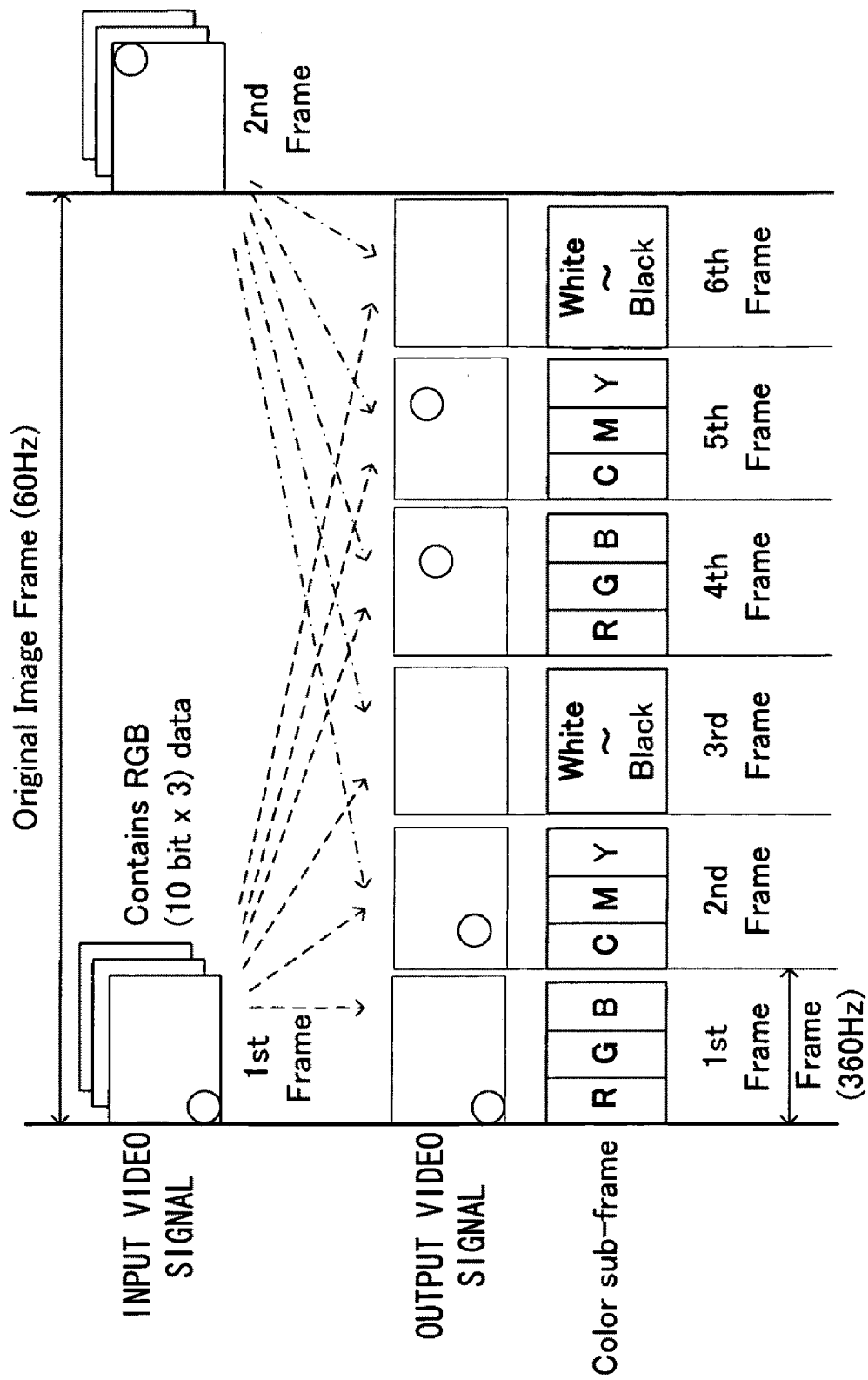
FIG. 27 is a diagram showing yet another exemplary operation of an image processing unit according to a third preferred embodiment.

FIG. 27 is a diagram showing yet another exemplary operation of the image processing unit 1017.

FIG. 27 exemplifies the case of generating an output video signal having a 360 Hz frame rate from an input video signal having a 60 Hz frame rate.

In this example, an output video signal generated within the period of one frame of an input video signal consists of signals of six frames, i.e., the video signal of the first frame, which is generated by converting the video signal of the first frame of the input video signal, the video signals of the second, fourth and fifth frames, generated from the video signals of the first and second frames of the input video signals by means of a motion image interpolation, and the video signals of the third frame and sixth frame which is generated on the basis of the video signals of the first frame and second frame of the input video signal.

Here, the input video signal has 10-bit gray scale data for each of the colors R, G and B and for each pixel of each frame.

Further, the first frame and fourth frame of the output video signals have gray scale data for each of the colors R, G and B and for each pixel, while the second frame and fifth frame have gray scale data for each of the colors Cyan (C), magenta (M) and yellow (Y). The third frame and sixth frame have gray scale data for setting all pixels to be an achromatic color, such as white (W), gray (Gy) or black (K) and is also a frame capable of displaying all pixels in an achromatic color.

More specifically, the output video signal is generated in a manner such that the number of gray scales of the sub-frame of each of the colors R, G and B, sequentially expressible with the first and forth frame; the number of gray scales of the sub-frame of each of the colors C, M and Y, sequentially expressible with the second and fifth frame; and the number of gray scales of the sub-frame of one of the colors W, Gy and K, expressible with the third and sixth frame, are respectively smaller than the number of gray scales in the video data of each of the colors R, G and B in the input video signal.

With this operation, even though the number of gray scales of the sub-frame of each of the colors and the number of gray scales of the frame image expressible with the output video signal are smaller than the number of gray scales in the video data of each of the colors R, G and B in the frame signal of the input video signal, the frame rate of the output video signal is six times that of the input video signal. This makes it possible to project a smoother display of a motion image and to alleviate the color breakup phenomena without increasing the load of the video signal processing and display processing performed in a later-stage circuit(s), enabling the projection of a color video image with little degradation in the gray scale of the video image as a whole.

Incidentally, the illumination light 1008 of the respective colors C, M, Y, W and Gy can be projected by controlling at least two of the three laser light sources R, G and B of the variable light sources 1013 to emit light simultaneously.

Figure 28:
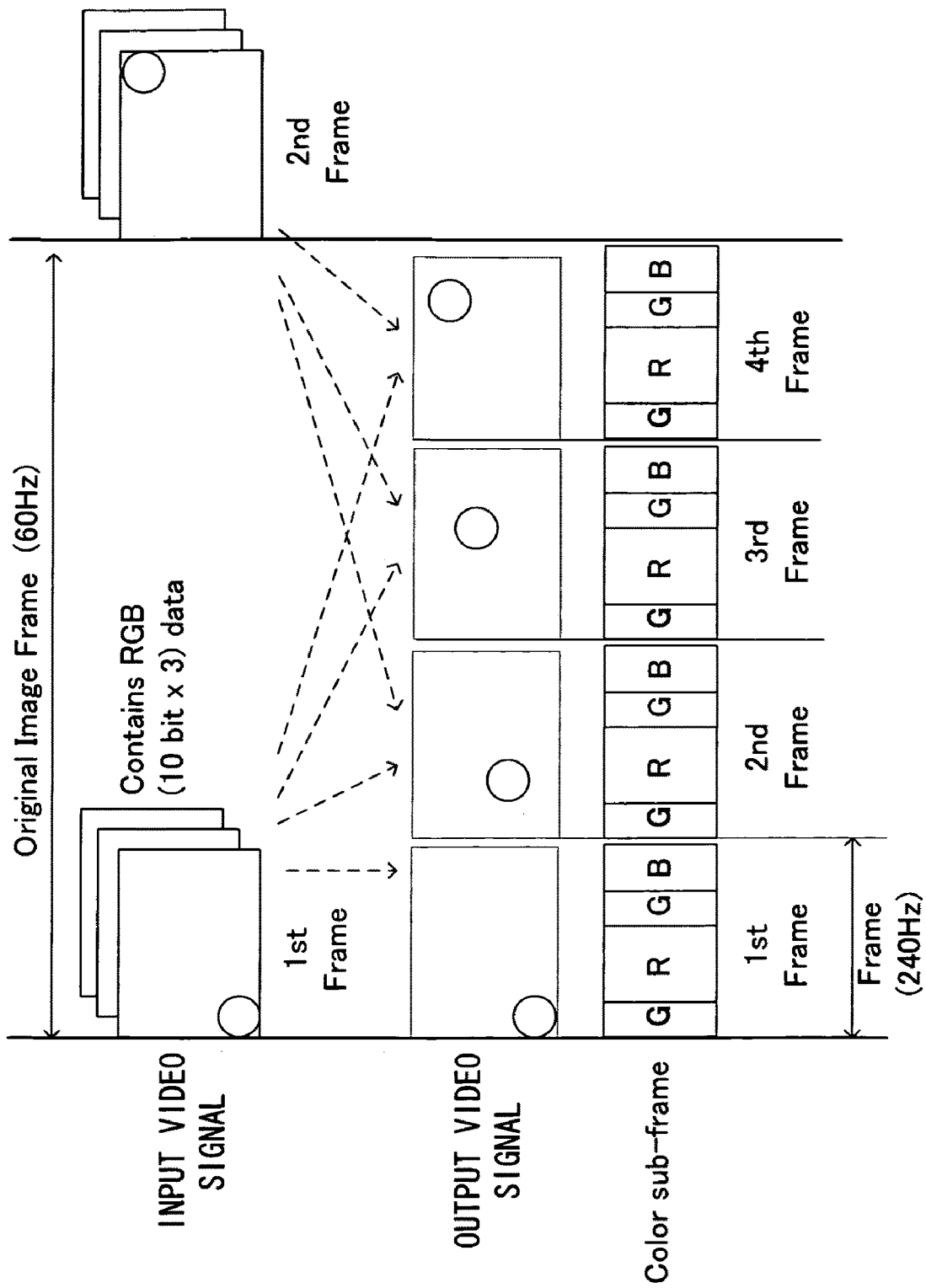
FIG. 28 is a diagram showing yet another exemplary operation of an image processing unit according to a third preferred embodiment.

FIG. 28 is a diagram showing yet another exemplary operation of the image processing unit 1017.

FIG. 28 exemplifies the case of generating an output video signal having a 240 Hz frame rate from an input video signal having a 60 Hz frame rate.

In this example, an output video signal generated within the period of one frame of an input video signal consists of signals of four frames, i.e., the video signal of the first frame, generated by converting the video signal of the first frame of the input video signal, and the video signals of the second, third, and fourth frames, which are generated from the video signals of the first frame and second frame of the input video signals by means of a motion image interpolation.

Here, the input video signal has 10-bit gray scale data for each of the colors R, G and B and for each pixel of each frame.

Further, the generated output video signals are video signals having gray scale data for each of the colors R, G and B for each pixel of each frame and are also sequentially displayable frame signals with the sub-frame images of the colors R, G and B in different time widths. Further, the generated output video signals are frame signals enabled to display the sub-frame image of R one time, the sub-frame image of G two times, and the sub-frame image of B one time in each period of one frame of the output video signal.

However, the output video image is generated in a manner such that the number of gray scales of the sub-frame image of each of the colors R, G and B, are smaller than the number of gray scales in the video data of each of the colors R, G and B in the input video signal, 1024 (=10 bits).

With this operation, even though the number of gray scales of the sub-frame image of each of the colors in the output video signal is smaller than the number of gray scales in the video data of each of the colors R, G and B in the input video signal, the frame rate of the output video signal is four times that of the input video signal. This makes it possible to project a smoother display of a motion image and to alleviate the color breakup phenomena without increasing the load of the video signal processing and display processing performed in a later-stage circuit(s), enabling the projection of a color video image with little degradation in the gray scale of the video image as a whole.

Further, this configuration makes it possible to set the number of times the sub-frame image of G, to which the human eye has the highest sensitivity, is displayed to be greater than the number of times the sub-frames of other colors, for each period of one frame of the output video signal, are displayed, thereby enabling a further reduction in the occurrence of the color breakup phenomena.

Figure 29:
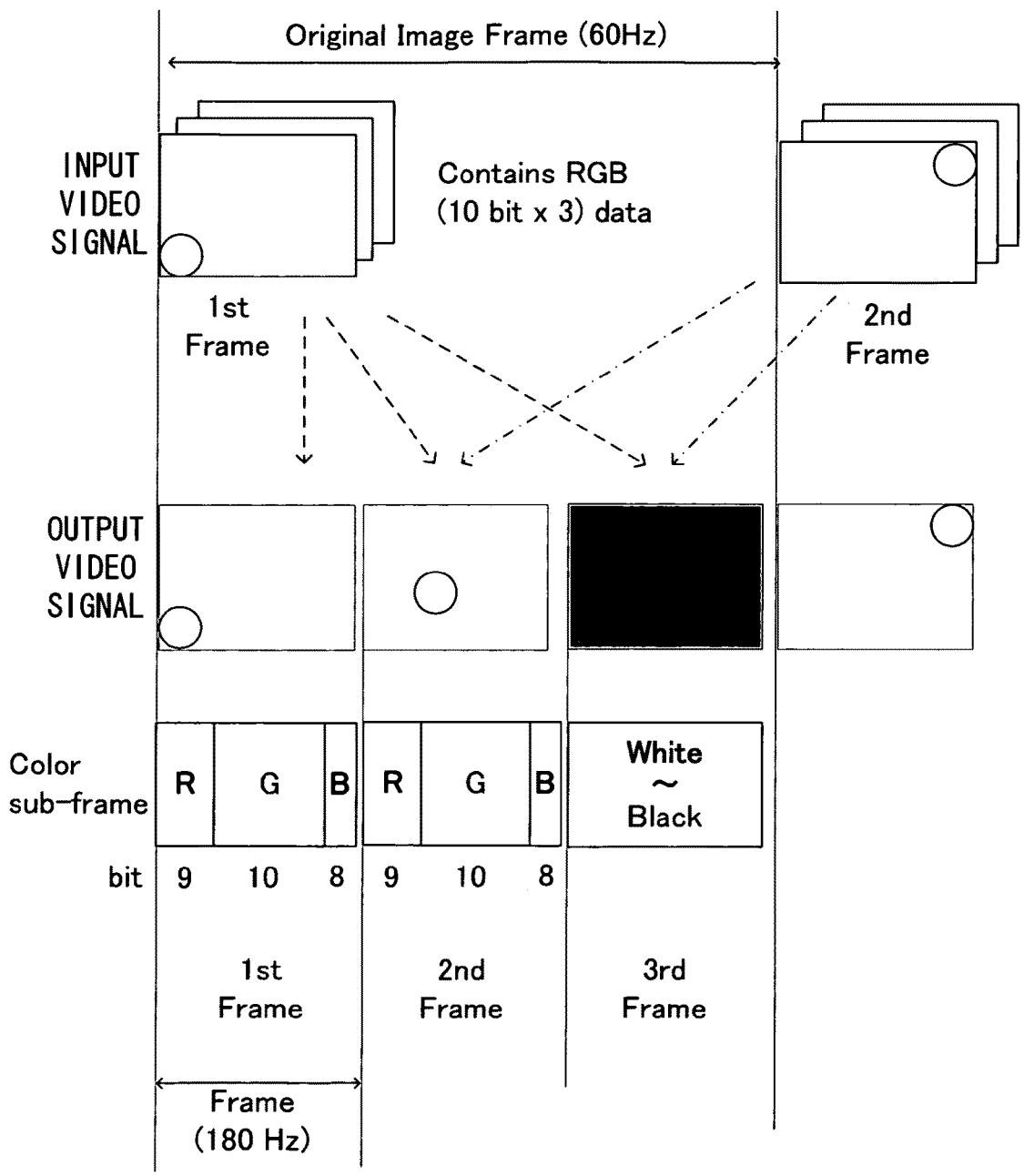
FIG. 29 is a diagram showing yet another exemplary operation of an image processing unit according to a third preferred embodiment.

FIG. 29 is a diagram showing yet another exemplary operation of the image processing unit 1017.

FIG. 29 exemplifies the case of generating an output video signal having a 180 Hz frame rate from an input video signal having a 60 Hz frame rate.

In this example, an output video signal generated within the period of one frame of an input video signal consists of signals of three frames, i.e., the video signal of the first frame generated by converting the video signal of the first frame of the input video signal, the video signal of second frame generated from the video signals of the first and second frames of the input video signals by means of a motion image interpolation, and the video signal of the third frame generated on the basis of the video signals of the first and second frames of the input video signal.

Here, the input video signal is a frame signal having 10-bit gray scale data for each of the colors R, G and B and for each pixel.

Further, the first and second frames of the generated output video signals have 9-bit gray scale data of R, 10-bit gray scale data of G, and 8-bit gray scale data of B for each pixel. They are also frame signals enabled to sequentially display the sub-frame images of the colors R, G and B for different lengths of time, and are further enabled to extend the display time of the sub-frame image of G to be longer than the display time of the sub-frames of R and B within the period of one frame of the output video signal. The display time of the sub-frame image of B may also be controlled to be shorter than the display time of the sub-frames of R and G within the period of one frame of the output video signal. The third frame signal is a frame having gray scale data for setting all pixels to be an achromatic color such as white (W), gray (Gy) or black (K) and is also capable of displaying all pixels in an achromatic color.

As described above, in the sub-frame images of the colors R, G and B, the first and second frames of the output video image are generated in a manner such that the numbers of gray scales (512 and 256, respectively) of the sub-frame image of the respective colors R and B are smaller than the number of gray scales (1024) in the video data of each of the colors R and B in the input video signal. Further, the number of gray scales (1024) of the sub-frame image of G is equal to the number of gray scales (1024) of the sub-frame image of G in the input video signal. Meanwhile, for the third frame signal, the output video signal is generated in a manner such that the number of gray scales in an achromatic frame image is smaller than the number of gray scales (1024) in any of the video data of the colors R, G and B in the input video signal.

With this operation, even though the numbers of gray scales (512, 1024 and 256) of the sub-frame images of the respective colors R, G and B, sequentially displayable with the output video signal, are smaller for some colors than the number of gray scales (1024) in the video data in the input video signal, the frame rate of the output video signal is three times that of the input video signal, making it possible to project a smoother display of a motion image and to alleviate the color breakup phenomena without increasing the load of the video signal processing and display processing performed in a later-stage circuit(s), thus enabling the projection of a color video image with little degradation in the gray scale of the video image as a whole.

In particular, the present example is configured to decrease, by a greater number than that for the sub-frame image of R, the number of gray scales of the sub-frame image of B, to which the human eye has low sensitivity, without decreasing the number of gray scales of the sub-frame image of Q to which the human eye has high sensitivity, and also to set the length of display time of the sub-frame image of G to be the longest while setting the length of display time of the sub-frame image of B to be the shortest. Therefore it is possible to achieve the projection benefits described above.

Figure 30:
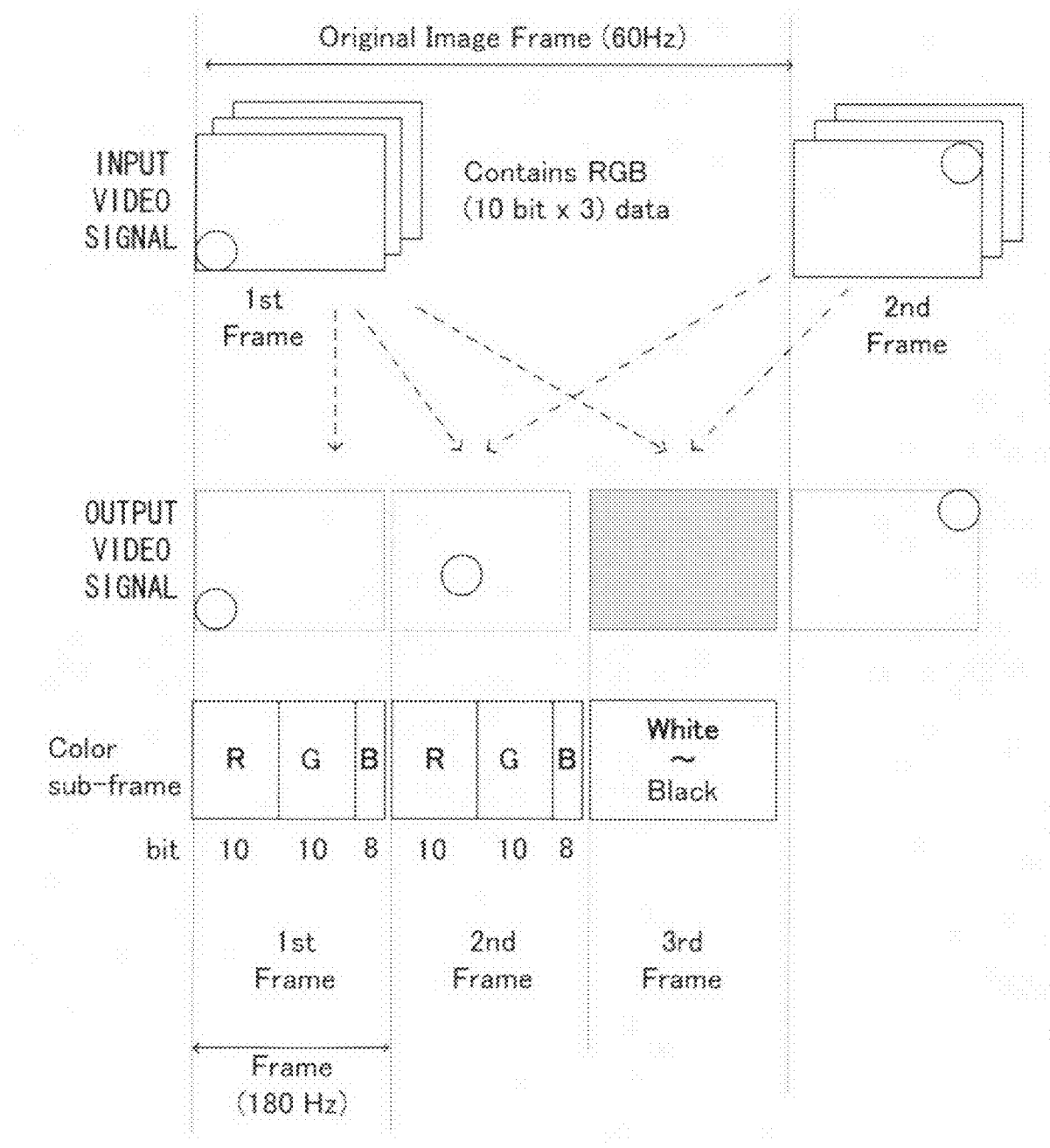
FIG. 30 is a diagram showing an exemplary modification of the exemplary operation shown in FIG. 29.

FIG. 30 is a diagram showing an exemplary modification of the exemplary operation shown in FIG. 29.

In the example shown in FIG. 30, the first and second frames of the generated output video signal have 10-bit gray scale data of R, 10-bit gray scale data of G, and 8-bit gray scale data of B for each pixel. It is possible to set the length of display time of the sub-frame image of B to be shorter than the display time of the other colors and also to set the display time of the sub-frame image of R and that of the sub-frame image of G to be approximately the same. Incidentally, the third frame is controlled in the same manner as the example shown in FIG. 29.

As described above, in the sub-frame images of the colors R, G and B, which can be sequentially displayed with the output video signal, the first and second frames of the output video image are generated in a manner such that the number of gray scales (1024) of the sub-frame image of each of the colors R and G is equal to the number of gray scales (1024) of the sub-frame image of each of the colors R and G in the input video signal, and the number of gray scales (256) of the sub-frame image of B is smaller than the number of gray scales (1024) of the sub-frame image of B in the input video signal.

Such an operation also makes it possible to project a smoother display of a motion image and to reduce the occurrence of the color breakup phenomena, while suppressing an extreme increase in the load of the video signal processing and display processing, enabling the projection of a color video image with little degradation in the gray scale of the video image as a whole, as with the example shown in FIG. 29.

In particular, the present example is configured to decrease only the number of gray scales of the sub-frame image of B, to which the human eye has low sensitivity, without decreasing the numbers of gray scales of the sub-frame images of G, to which the human eye has high sensitivity, and also to set the length of display time of the sub-frame image of B to be the shortest.

Figure 31:
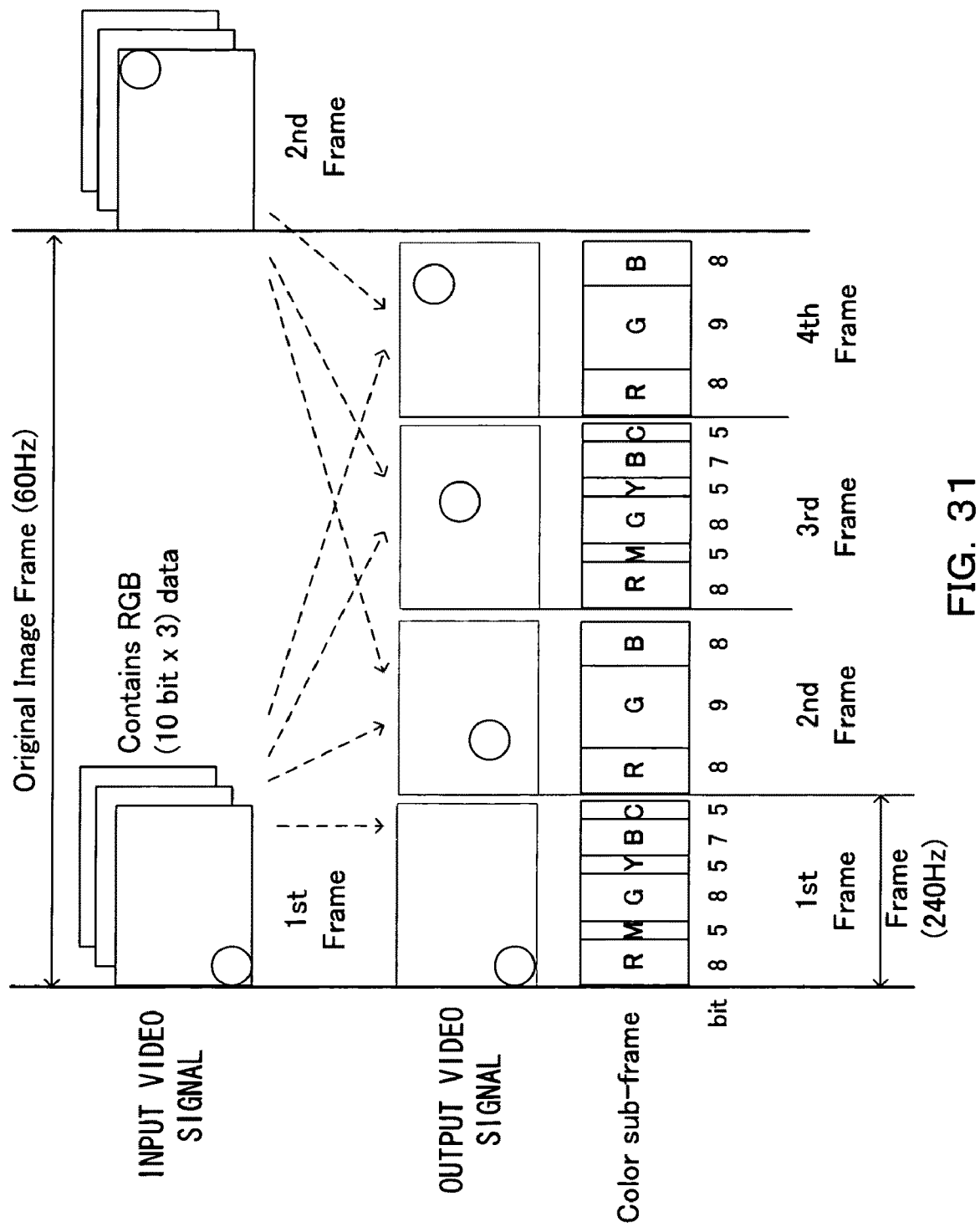
FIG. 31 is a diagram showing yet another exemplary operation of an image processing unit according to a third preferred embodiment.

FIG. 31 is a diagram showing yet another exemplary operation of the image processing unit 1017.

FIG. 31 exemplifies the case of generating an output video signal having a 240 Hz frame rate from an input video signal having a 60 Hz frame rate.

In this example, an output video signal generated within the period of one frame of an input video signal consists of signals of four frames, the video signal of the first frame generated by converting the video signal of the first frame of the input video signal, and the video signals of the second, third, and fourth frames generated from the video signals of the first frame and second frame of the input video signals by means of a motion image interpolation.

Here, the input video signal has 10-bit gray scale data for each of the colors R, G and B and for each pixel of each frame.

Further, the first and third frames of the output video signal have 8-bit gray scale data of R, 5-bit gray scale data of M, 8-bit gray scale data of G, 5-bit gray scale data of Y, 7-bit gray scale data of B, and 5-bit gray scale data of C, for each pixel. Further, each of the two frames has video signals sequentially displayable with the sub-frame images of the colors R, M, G, Y, B and C. Specifically, each of the two frames is enabled to insert, between the sub-frame images of two adjacent primary colors R, G or B, the sub-frame image of one complementary color M, Y or C. In particular, this example is configured to enable the display of the sub-frame image of a complementary color (e.g., M) containing a primary color (e.g., R) next to the sub-frame image of the primary color and to display, following the sub-frame image of the aforementioned complementary color, the display of the sub-frame image of a primary color (e.g., G), which is not contained in the complementary color.

Furthermore, each of the two frames can be configured such that the length of display time of the sub-frame image of each of the colors R, G and B is longer than that of the colors M, Y and C. The length of display time of the sub-frame images of the colors R and G are the same as each other and shorter than that of displaying the sub-frame of B. The length of display time of the sub-frames of M, Y and C are the same.

Further, the second frame and forth frame of the generated output video signal have 8-bit gray scale data of R, 9-bit gray scale data of G, and 8-bit gray scale data of B for each pixel. Each of the two frames has video signals sequentially displayable with the sub-frame images of the colors R, G and B. Furthermore, each of the two frames is also a frame signal which is enabled to set the length of display time of the sub-frame image of G to be longer than each of the sub-frames of R and B, and also to set the length of display time of the sub-frame images of R and B to be the same.

As such, a frame signal is generated such that the numbers of gray scales (256, 32, 256, 32, 128, and 32) of the sub-frame images of each of the respective colors R, M, G, Y, B and C, which are sequentially displayable with each of two frame signals (the first and third frame), and the numbers of gray scales (256, 512, and 256) of the sub-frame images of each of the respective colors R, G and B, which are sequentially displayable with each of two frame signals (the second and forth frame), are smaller than the number of gray scales (1024) of the sub-frame image of each of the colors R, G and B, which are sequentially displayable with the frame signals of the input video signal.

With this operation, even though the numbers of gray scales (256, 32, 256, 32, 128 and 32) of the sub-frame image of each of the respective colors R, M, G, Y, B and C and the numbers of gray scales (256, 512, and 256) of the sub-frame image of each of the respective colors R, G and B, all of which are sequentially displayable with the output video signal, are smaller than the number of gray scales (1024) in the video data of each of the colors R, G and B in the input video signal, the frame rate of the output video signal is four times that of the input video signal. This makes it possible to project a smoother display of a motion image and to alleviate the occurrence of the color breakup phenomena without increasing the load of the video signal processing and display processing, thus enabling the projection of a color video image with little degradation in the gray scale of the whole video image.

In particular, in this example, in the first and third frames of the output video signals it is possible to display, next to the sub-frame image of a primary color, the sub-frame image of a complementary color containing the aforementioned primary color and, in the next sub-frame, a primary color which is not contained in the aforementioned complementary color, thereby enabling a further reduction in the occurrence of the color breakup phenomena.

Further, this example designates the length of display time of the sub-frame image of G, to which the human eye has a high sensitivity, to be longer than that of other colors and also designates the number of gray scales of the color G to be larger than those of other colors, making it possible to provide a video image with less degradation in the gray scale.

Figure 32:
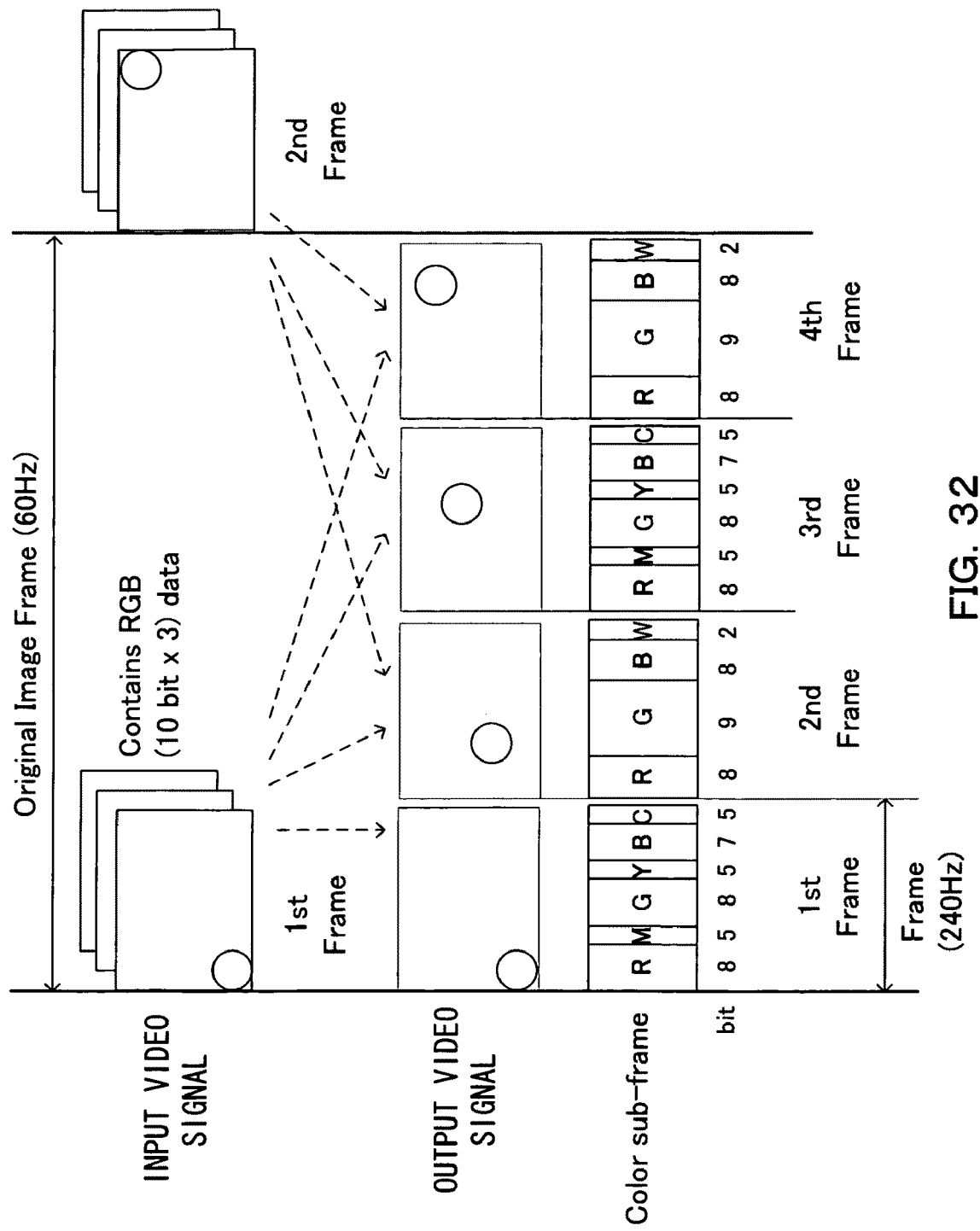
FIG. 32 is a diagram showing an exemplary modification of the exemplary operation shown in FIG. 31.

FIG. 32 is a diagram showing an exemplary modification of the exemplary operation shown in FIG. 31.

In FIG. 32, the second and fourth frames, among four frames of the output video signal generated within the period of one frame of the input video signal, are frame signals further having 2-bit gray scale data of W for each pixel. That is, each of the two frame signals is a frame signal having 8-bit gray scale data of R, 9-bit gray scale data of G, 8-bit gray scale data of B, and 2-bit gray scale data of W for each pixel. Further, each of the two frames has a video signal capable of sequentially displaying the sub-frame images of the colors R, G, B and W. Each of the two frames is enabled to set the length of display time of the sub-frame image of G to be the longest, to set that of the sub-frame image of W to be the shortest, and to set the that of the sub-frames of R and B to be equal to each other, with the length of display time for R and B being shorter than G and longer W. Incidentally, the first and third frames are controlled in the same manner as the example shown in FIG. 31.

As such, the output video signal is generated so that the numbers of gray scales (256, 512, 256, and 4) in the sub-frame images of the respective colors R, G, B and W, sequentially displayable with in the second and fourth frames, is smaller than the number of gray scales (1024) of the video data of each of the colors R, G and B in the input video signal.

Also, similar to the example shown in FIG. 31, such an operation makes it possible to alleviate the color breakup phenomena without increasing the load of the video signal processing and display processing performed in a later-stage circuit(s) and to project a color video image with little degradation in the gray scale of the video image as a whole.

In particular, the present example enables the second and fourth frames, from among four frames of the output video signal generated within the period of one frame of the input video signal, to further display the sub-frame of W, thereby making it possible to project a brighter color video image.

More specifically, the present example is configured such the second and fourth frames include 2-bit gray scale data of W. Alternately, the aforementioned frames may contain 1-bit or 3-bit gray scale data of W, in accordance with the processing capability of the image processing unit 1017.

When an output video signal is generated and outputted, as described in the exemplary operations of the image processing unit 1017, with reference to FIGS. 24 through 32, then the sub-frame images of the colors, in accordance with the output video signal, are sequentially projected onto the screen 1012 with the processing of the later-stage circuit(s). The variable light source 1013 emits laser lights of different colors in synch with the sub-frame images of the colors to be projected onto the screen 1012.

Figure 33:
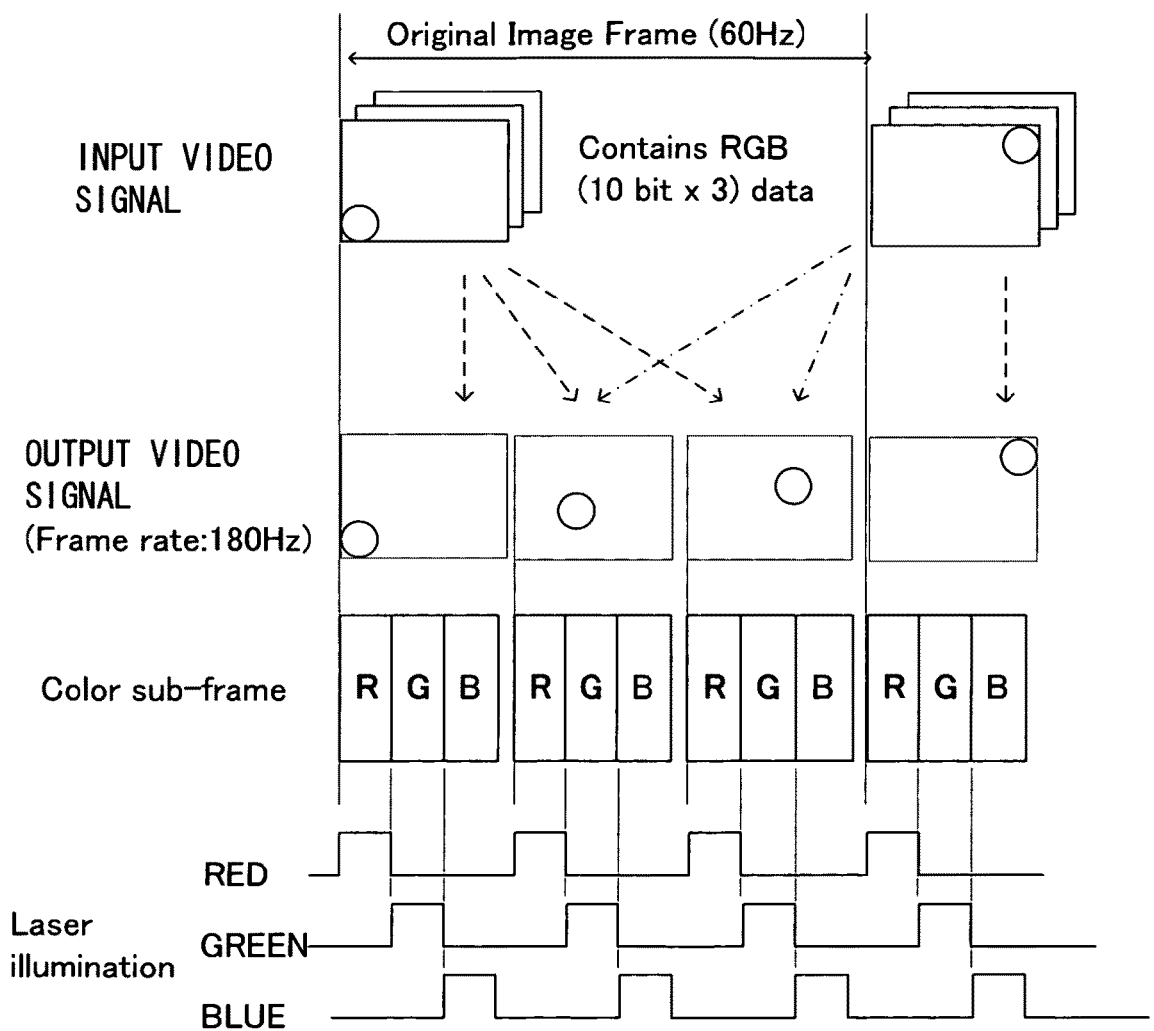
FIG. 33 is a diagram showing an exemplary emission of a variable light source according to a third preferred embodiment.

FIG. 33 is a diagram showing an exemplary emission of the variable light source 1013.

The exemplary emission shown in FIG. 33 shows the laser lights of different colors synchronously emitting light with the sub-frame images of the respective colors to be projected onto the screen 1012, in accordance with the output video signal generated by the exemplary operation described with reference to FIG. 26.

The present example is a case of sequentially displaying the sub-frame images of the colors R, G and B using color laser light sources and SLM 1002. Specifically, the red laser light is irradiated during the period for displaying the R sub-frame image, the green laser light is irradiated during the period for displaying the G sub-frame image, and the blue laser light is irradiated during the period for displaying the B sub-frame image so that the lights from the respective color light sources are sequentially irradiated onto the SLM 1002 so as to form the sub-frame images corresponding to the lights of the respective colors and are projected onto the screen 1012 and displayed.

Figure 34:
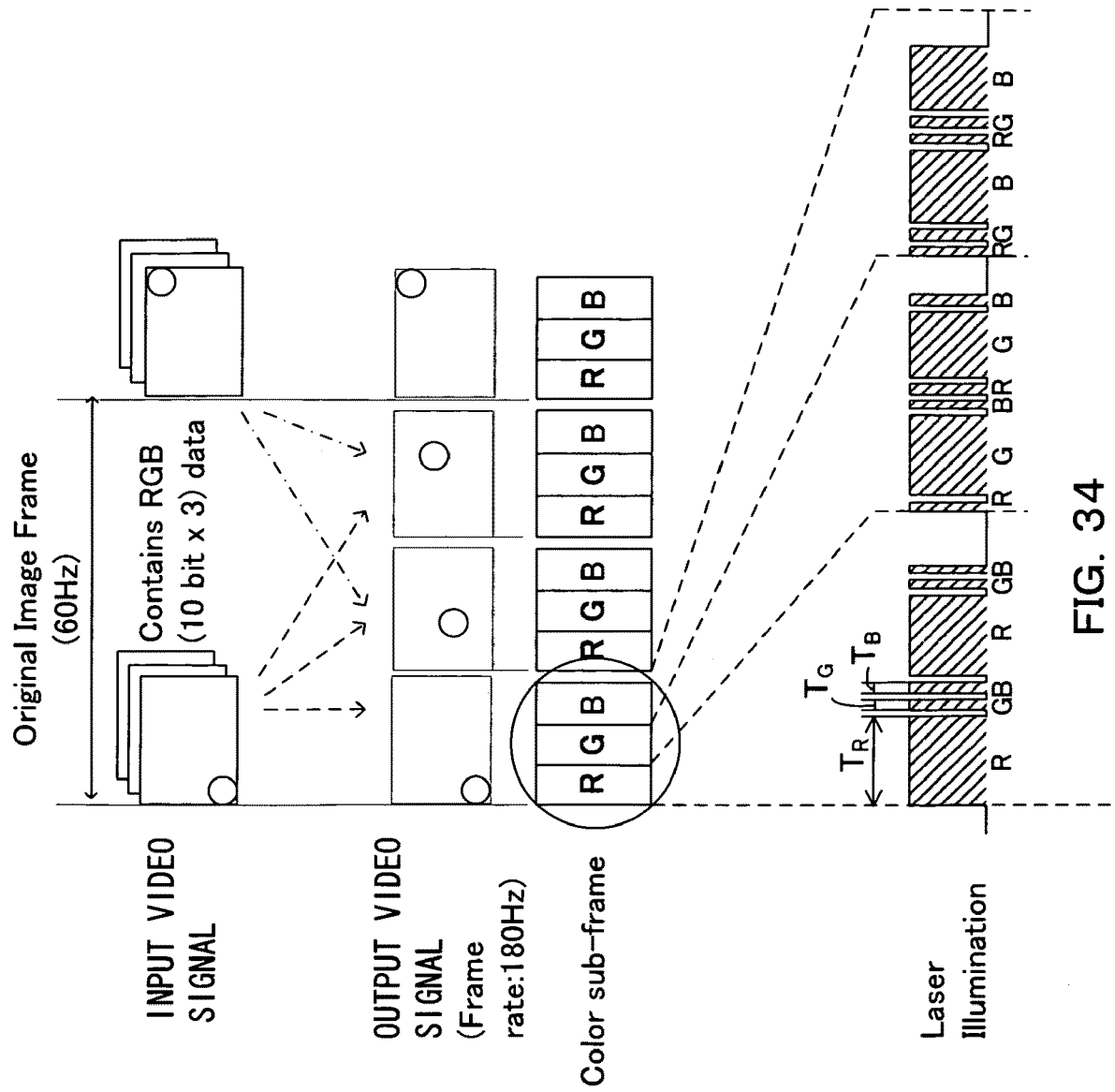
FIG. 34 is a diagram showing an exemplary modification of the exemplary emission shown in FIG. 33.

FIG. 34 shows an exemplary modification of the exemplary emission shown in FIG. 33.

In this example, the red, green and blue laser light sources sequentially emit laser lights during the projection period of the respective sub-frame images of R, G and B, and the emission patterns of the respective laser light sources of red, green and blue are changed in accordance with the projection period of the respective sub-frame images.

In the period for projecting the R sub-frame image, there are two periods ($T_R$) for emitting the red laser light source, two periods ($T_G$) for emitting the green laser light source, and two periods ($T_B$) for emitting the blue laser light source, in the order of R, G, B, R, G and B. However, the period $T_G$ and period $T_B$ are each much shorter than the period $T_R$.

Likewise, in the period for projecting the G sub-frame image, there are two periods each for emitting the red laser light source, the green laser light source, and the blue laser light source, in the order of R, G, B, R, G and B. However, the periods emitting the red laser light source and the blue laser light source are each much shorter than the periods emitting the green laser light source.

Further, in the period for projecting the B sub-frame image, there are two periods each for emitting the red laser light source, the green laser light source, and the blue laser light source, in the order of R, G, B, R, G and B. However, the periods emitting the red laser light source and the green laser light source are each much shorter than the periods emitting the blue laser light source.

As described above, by causing the laser light sources of the other colors to sequentially emit a minute amount of light during the projection period for the sub-frame image of each of the colors R, G and B, it is possible to further reduce the occurrence of the color breakup phenomena. Further, by adjusting the ratio of periods emitting lights of the respective colors in the period of each sub-frame it is possible to adjust color balance.

Figure 35:
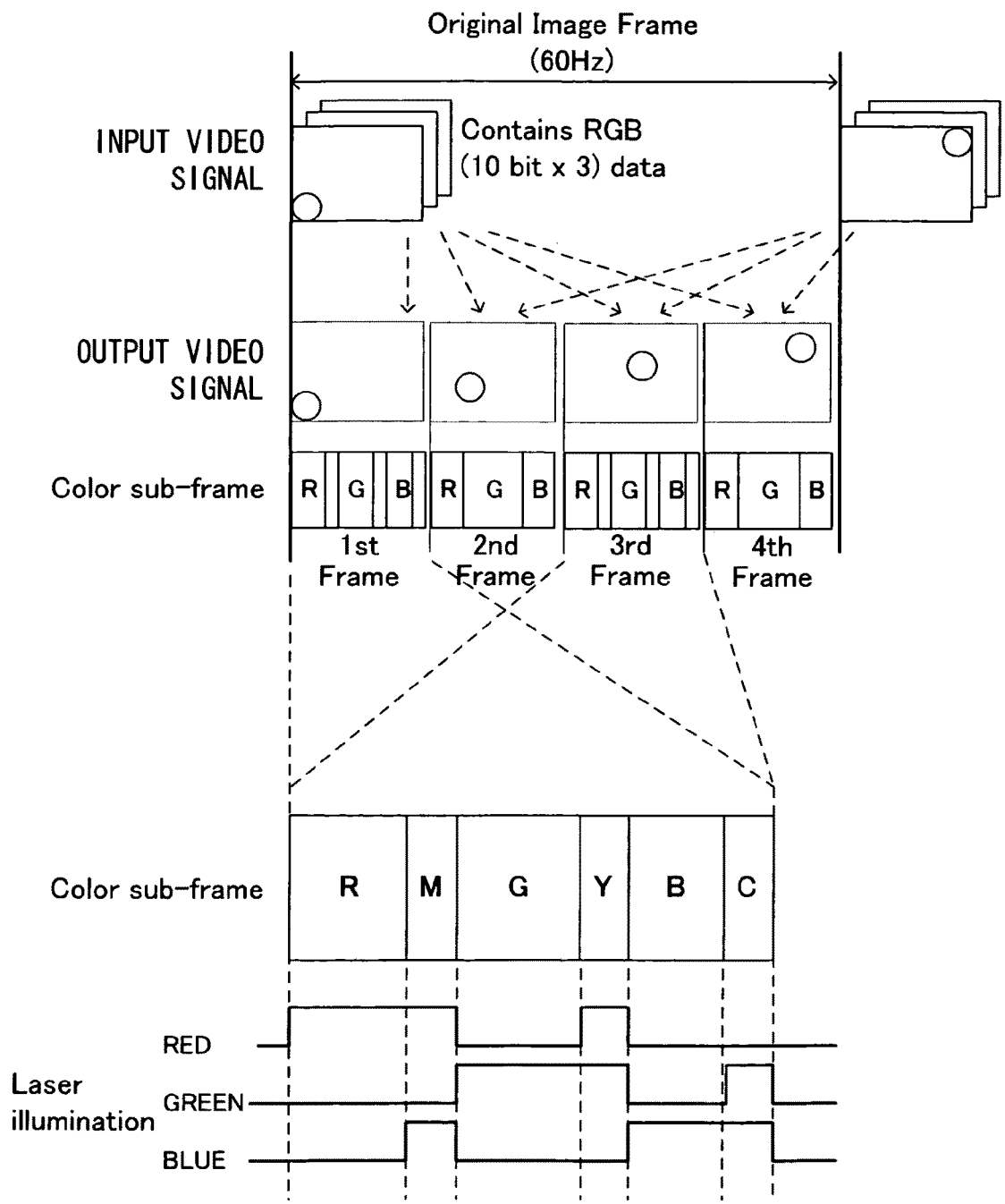
FIG. 35 is a diagram showing another exemplary emission of a variable light source according to a third preferred embodiment.

FIG. 35 is a diagram showing another exemplary emission of the variable light source 1013.

The exemplary emission shown in FIG. 35 is the case of controlling the laser light sources of the individual colors to emit light synchronously with the sub-frame images of the respective colors to be projected onto the screen 1012, in accordance with the output video signal generated, as the exemplary operation described with reference to FIG. 31.

In the example, the output video signals of the first and third frames have a video signal enabling a sequential display of the sub-frame images of the respective colors R, M, G, Y, B and C, while the signals of the second and fourth frames have a video signal enabling a sequential display of the sub-frame images of the respective colors R, G and B. Therefore, for example, when the sub-frame images of R, M, G, Y, B and C are projected onto the screen 1012, in accordance with the first frame and third frame, the red laser light source is irradiated during the period for projecting the R sub-frame image. Two laser light sources, the red and blue light sources, are irradiated simultaneously during the period for projecting the M sub-frame image. The green laser light source is irradiated during the period for projecting the G sub-frame image. Two laser light sources, the red and green laser light sources, are irradiated simultaneously during the period for projecting the Y sub-frame image. The blue laser light source is irradiated during the period for projecting the B sub-frame image. Two laser light sources, the green and blue laser light sources, are irradiated during the period for projecting the C sub-frame image.

More specifically, the configuring as described above, in which the sub-frame images of the respective colors are projected onto the screen 1012 in order of R, M, G, Y, B and C, controls the laser light sources to emit light two times during the period of one frame, making it possible to shorten the emission cycle of the laser light source of each color and further reduce the occurrence of the color breakup phenomena.

In the exemplary emissions shown in FIGS. 33 through 35, the emission cycles of the laser light sources of the colors R, G and B are shorter than the sub-frame rate cycles of the sub-frame images of the respective colors R, G and B, which are sequentially displayable with the frame signals of the input video signal.

As described above, the present embodiment is configured to generate an output video signal, such that the number of gray scales of the sub-frame image of each of the colors (or in a portion of the output video signal) is smaller than the number of gray scales of the video data of the sub-frame of each of the colors in an input video signal. The output video signal has a higher frame rate than that the input video signal from which it is generated. This makes it possible to project a smooth motion image and alleviate the color breakup phenomena, without increasing the load of the video signal processing and display processing performed in a later-stage circuit(s), and to project a color video image with little degradation in the gray scale of the image as a whole.

Fourth Preferred Embodiment

The following is a description of an exemplary operation according to the present embodiment of a video display system 1001.

The video display system 1001, according to the present embodiment, is a system generating an output video signal with a higher frame rate than that of an input video signal from a continuously inputted video signal and displaying a video image in accordance with the generated output video signal, as in the case of the above described embodiment.

The present embodiment, however, is configured to generate, as an output video signal for each period of one frame of an input video signal, the video signal of at least the first frame, having N-bit gray scale data for each pixel (where N<M), and the video signal of a second frame, having N'-bit gray scale data for each pixel (where N'<N) at the image processing unit 1017, and to output the generated video signals from the signal conversion unit 1034, when a video signal having M-bit gray scale data for each pixel (where N<M and N'<N) is continuously inputted into the frame interpolation unit 1033 as the input video signal. Further, the configuration is such that, when a display unit displays a video image in accordance with the output video signal, the weight of brightness per unit of the first control, used when a video image is displayed in accordance with the video signal of the first frame, is differentiated from the weight of brightness per unit of second control, used when a video image is displayed in accordance with the video signal of the second frame. Here, the "display unit" is a generic term for the comprisal including the light source optical system 1005 (which is also an illumination optical system), SLM 1002, SLM controller 1018, and light source controller 1019.

Figure 36:
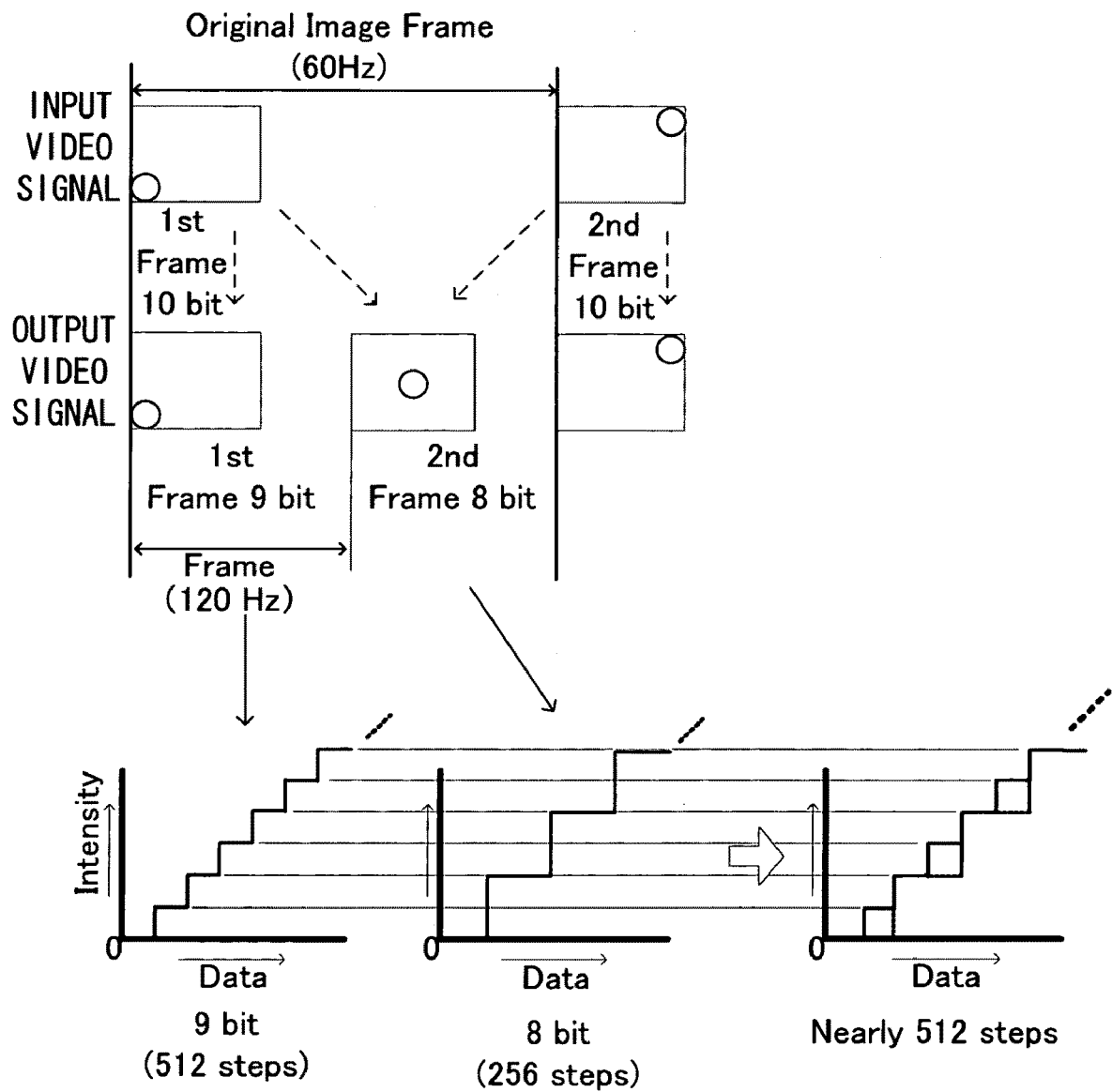
FIG. 36 is a diagram showing an exemplary operation of a video display system according to a fourth preferred embodiment.

FIG. 36 is a diagram showing an exemplary operation of such a video display system 1001.

Referring to FIG. 36, more specifically, "input video signal" represents a video signal inputted into the frame interpolation unit 1033, and "output video signal" represents a video signal outputted from the signal conversion unit 1034 (all of which are the same for FIGS. 37 and 38, which are described later). Assuming that a video signal 1020 continuously inputted into the image processing unit 1017 is a digital signal and also that the resolution of the video signal 1020 is the same as that of the video display system 1001, the "input video signal" constitutes the video signal 1020. The video image of "input video signal" is a video image of a ball moving from the bottom left to the top right (which is the same for FIGS. 37 and 38).

FIG. 36 exemplifies the case of generating an output video signal with a 120 Hz frame rate from an input video signal with a 60 Hz frame rate and in which each frame has 10-bit (i.e., an example of the M-bit described above) gray scale data for each pixel.

In this example, an output video signal generated within the period of one frame of an input video signal consists of signals of two frames, 1.) the video signal of the first frame generated by converting the gray scale data of the video signal of the first frame of an input video signal for each pixel, that is, 10-bit data into 9-bit data (i.e., an example of the N-bit described above), and 2.) the video signal of the second frame generated from the first and second frames of the input video signal by means of a motion image interpolation and which has 8-bit (i.e., an example of the N'-bit described above) gray scale data for each pixel.

Then, when the display unit displays a video image in accordance with the output video signal, the weight of brightness per unit of first control, used when a video image is displayed in accordance with the video signal of the frame having 9-bit gray scale data for each pixel, is differentiated from the weight of brightness per unit of second control, is used when a video image is displayed in accordance with the video signal of the frame having 8-bit gray scale data for each pixel. The present example is configured to carry out the processing by designating the weight of brightness per unit of second control to be two times that of the first control.

More specifically, in this example, the unit of the first control is the minimum unit of control used when a video image is displayed in accordance with the video signal of the frame having 9-bit gray scale data for each pixel, corresponding to the LSB of 9 bits. Similarly, the unit of the second control is the minimum unit of control used when a video image is displayed in accordance with the video signal of the frame having 8-bit gray scale data for each pixel, corresponding to the LSB of 8 bits.

With the control as described above, even though the number of gray scales (256) of the video image with 8-bit gray scale data for each pixel is smaller than the number of gray scales (512) of the video image with 9-bit gray scale data for each pixel, the number of gray scales in a synthesized video image, produced by a combination of the two video images, is approximately the same as the number of gray scales (512) of the video image with 9-bit gray scale data for each pixel. Therefore, according to this example, the gray scale data volume of one of the two output video signals, generated within the period of one frame of an input video signal, is smaller than the gray scale data volume of the other. Therefore, the load of the video signal processing and display processing can be reduced. Furthermore, a video image display capable of expressing approximately the same number of gray scales, as that of a video image displayed in accordance with the video signal of the frame with the larger number of gray scales, can be attained.

Figure 55:
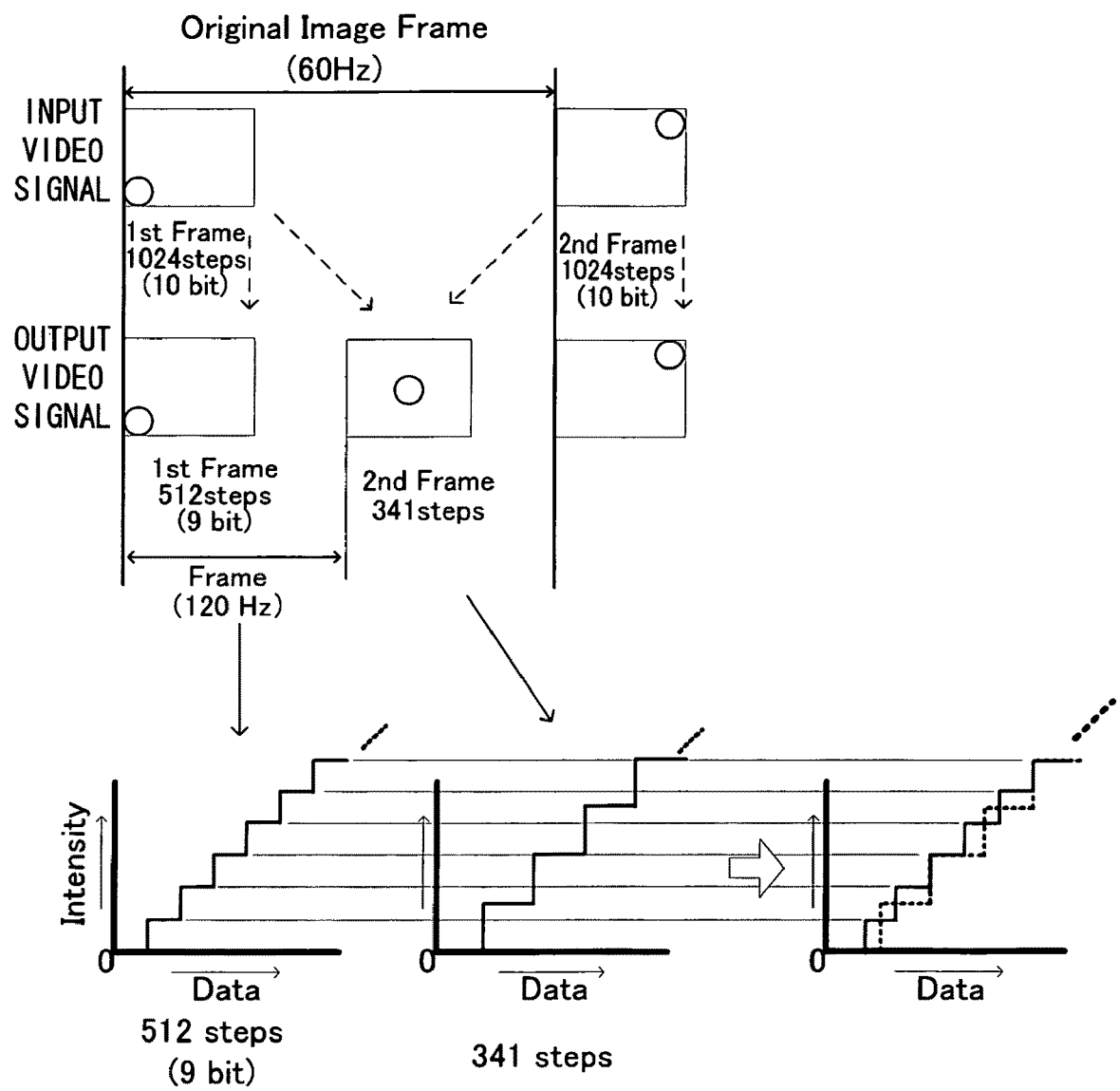
FIG. 55 is a diagram showing another exemplary operation of a video display system according to a fourth preferred embodiment.

FIG. 55 is an example of displaying the first frame at 512 gray scales (9 bits) and the second frame at 341 gray scales (a number between 8 bits and 9 bits), of two frames of the output video signals shown in FIG. 36. Here, the LSB period used in the video signal of the second frame is 1.5 times that of the first frame. Further, the brightness obtained by controlling the SLM 1002 under the ON state for the LSB period of the video signal of the second frame is 1.5 times the brightness obtained by controlling the SLM 1002 under the ON state for the LSB period of the video signal of the first frame.

In this event, one step of gray scale of brightness obtained in the second frame is 1.5 times that of the first frame. The levels of brightness for the time in two steps of the gray scale of brightness (e.g., 1.5, 4.5 and 7.5) is obtained in the second frame that have the levels of brightness which are not presented in the gray scale of brightness (e.g., 1, 2, 3, 4, 5, 6 and 7) that is obtained in the first frame. Specifically, by combining the first frame and second frame, with differing LSB periods, it is possible to display a video image using greater gray scale levels of brightness than when using only the first frame.

Figure 37:
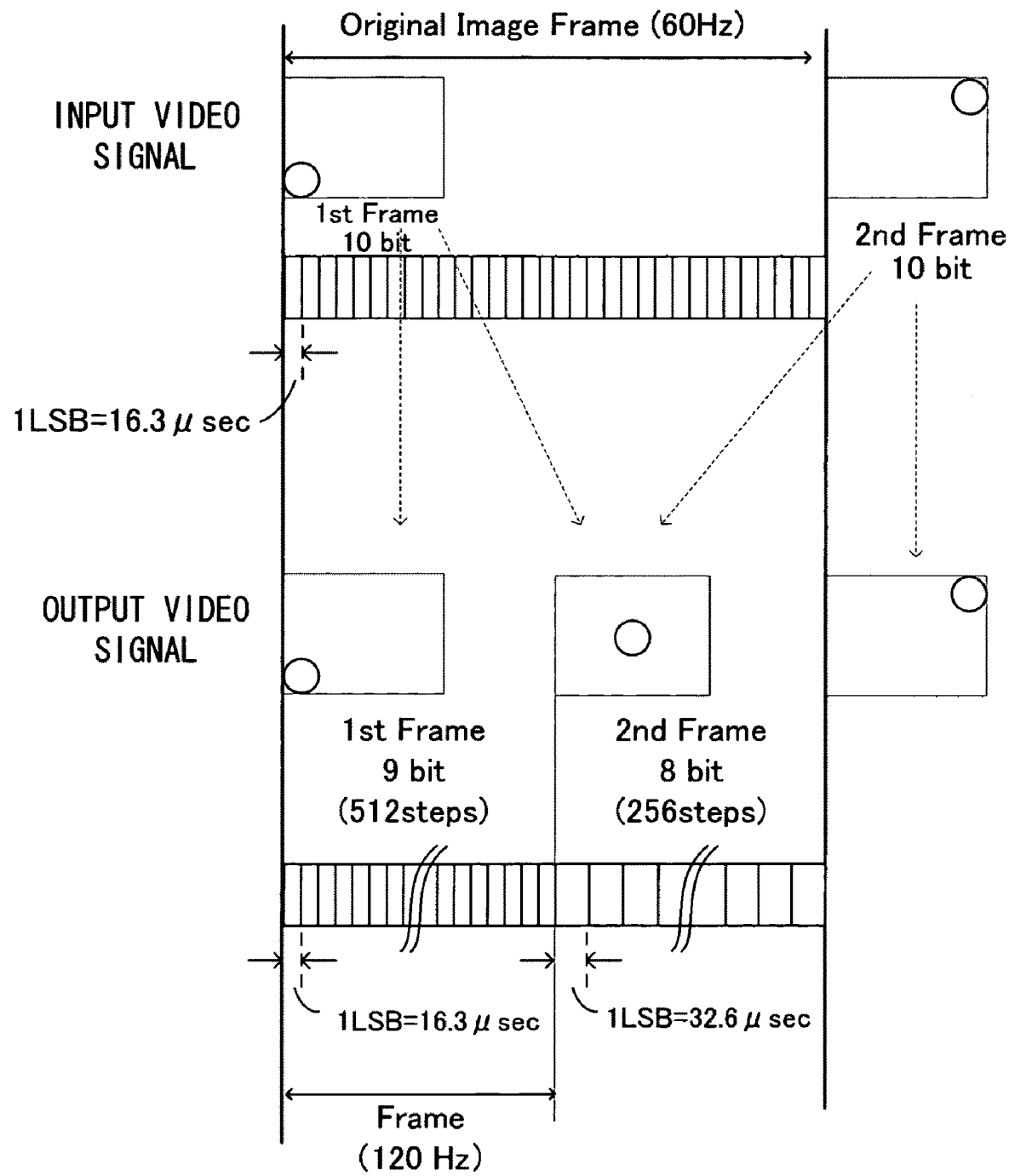
FIG. 37 is a diagram showing a specific example of a method of setting the weight of intensity per unit of the second control at two times the weight of the intensity per unit of the first control, in the example shown in FIG. 36.

FIG. 37 is a diagram showing a specific example of a method of setting the weight of brightness per unit of second control at two times the weight of brightness per unit of first control, in the example shown in FIG. 36.

FIG. 37 exemplifies the case of setting the weight of brightness per unit of the second control at two times that of the first control by designating the period of time per unit of the second control to be two times that of the first control, when the light intensity of the illumination light 1008 irradiated in the period of time per unit of the first and second controls are set to be constant and equal to each other.

According to this example, the first frame signal has 512 gray scales (i.e., 9-bit gray scale data) for each pixel, and therefore, the period of time per LSB of 9 bits, corresponding to the unit of the first control, is 16.3 (=1/120/512) microseconds (μsec). Further, the second frame signal has 256 gray scales (i.e., 8-bit gray scale data) for each pixel, and therefore, the period of time per LSB of 8 bits, corresponding to the unit of the first control, is 32.6 (=1/120/256) μsec. Therefore, the period of time per unit of the second control (32.6 μsec) is two times the period of time per unit of the first control (16.3 μsec). Meanwhile, the light intensity of the illumination light 1008 irradiated in each frame period of the output video signal is constant and equal, although this is not shown in the figure.

With this operation, it is possible to set the weight of brightness per unit of the second control at two times the weight of brightness per unit of the first control.

More specifically, in the example shown in FIG. 37, the input video signal has 1024 gray scales (i.e., 10-bit gray scale data) for each pixel of each frame. Therefore, the period of time per LSB of 10 bits, corresponding to the unit of control used when a video image is displayed in accordance with the input video signal, is 16.3 (=1/60/1024) μsec, which equals the difference (16.3 μsec) between the period of time per unit of the first control and that of the second control. Therefore, the difference between the weight of brightness per unit of the first control and that of the second control is equivalent to one LSB of 10 bits, which corresponds to the unit of control of the input video signal in this example.

Figure 38:
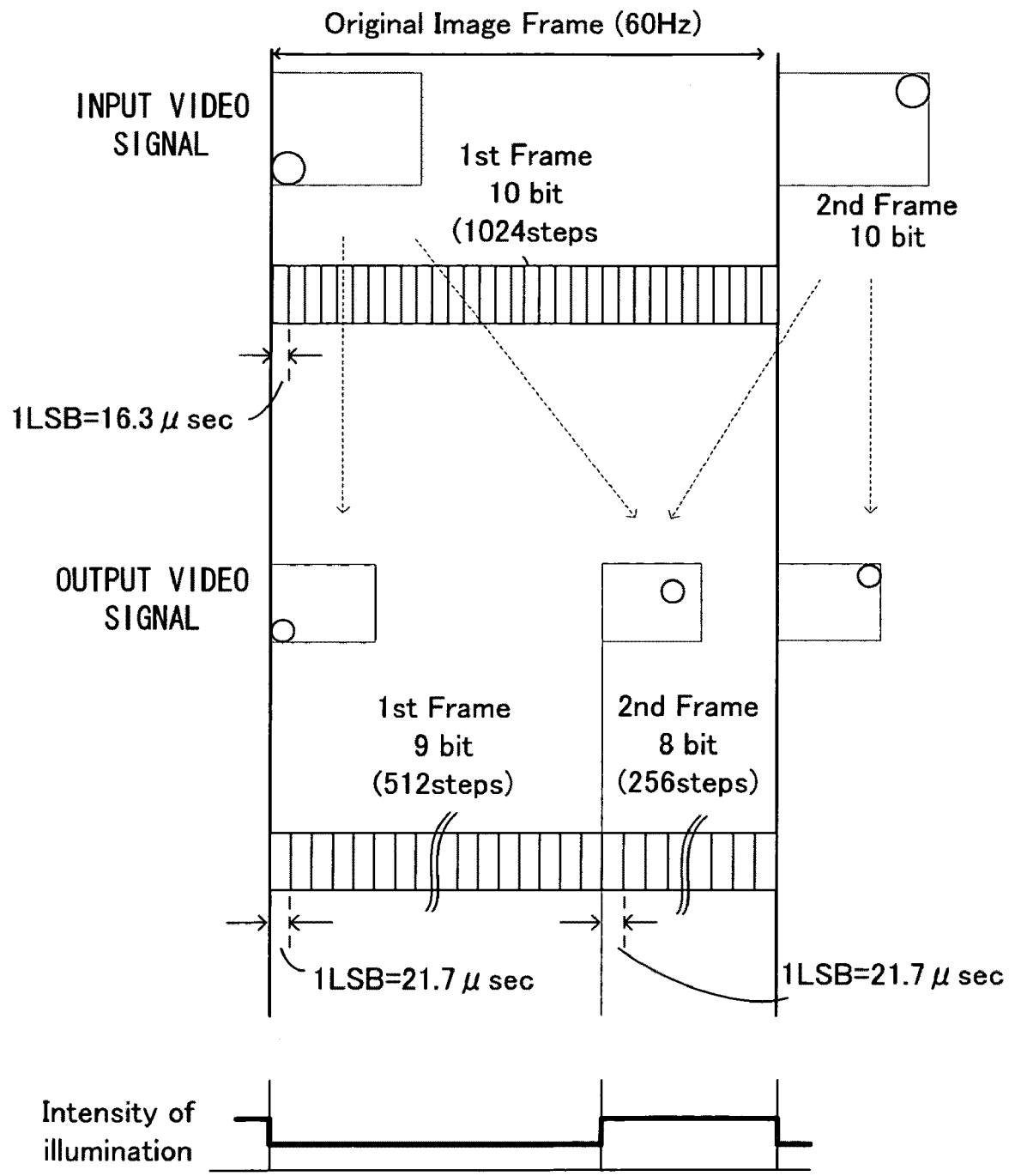
FIG. 38 is a diagram showing another specific example of a method of setting the weight of intensity per unit of the second control at two times the weight of the intensity per unit of the first control.

FIG. 38 is a diagram showing another specific example of a method of setting the weight of brightness per unit of second control at twice the weight of brightness per unit of first control.

FIG. 38 exemplifies the case of setting the period of time per unit of the second control to be the same as that of the first control, and also of setting the light intensity of the illumination light 1008 irradiated in the period of time per unit of the second control at two times that of the first control, thereby designating the weight of brightness per unit of the second control to be two times that of the first control.

More specifically, the example shown in FIG. 38 is similar to the examples shown in FIGS. 36 and 37, where the video signals of the two frames of the output video signal have 9-bit gray scale data and 8-bit gray scale data. However, the present example differs from the examples shown in FIGS. 36 and 37 in that the frame rate of the output video signal is 120 Hz.

In this example, the video signal of the first frame has 512 gray scales (i.e., 9-bit gray scale data) for each pixel and the video signal of the second frame has 256 gray scales (i.e., 8-bit gray scale data) for each pixel, with the period of time per unit of the first control equal to the period of time per unit of the second control. Therefore the period of time per each unit of the first control and second control is approximately 21.7 (=1/60/(512+256) μsec. Further, the light intensity of the illumination light 1008 irradiated during the frame period of the video signal of the second frame is two times that of the first frame.

With this operation, it is possible to set the weight of brightness per unit of the second control at two times the weight of brightness per unit of the first control.

Figure 56:
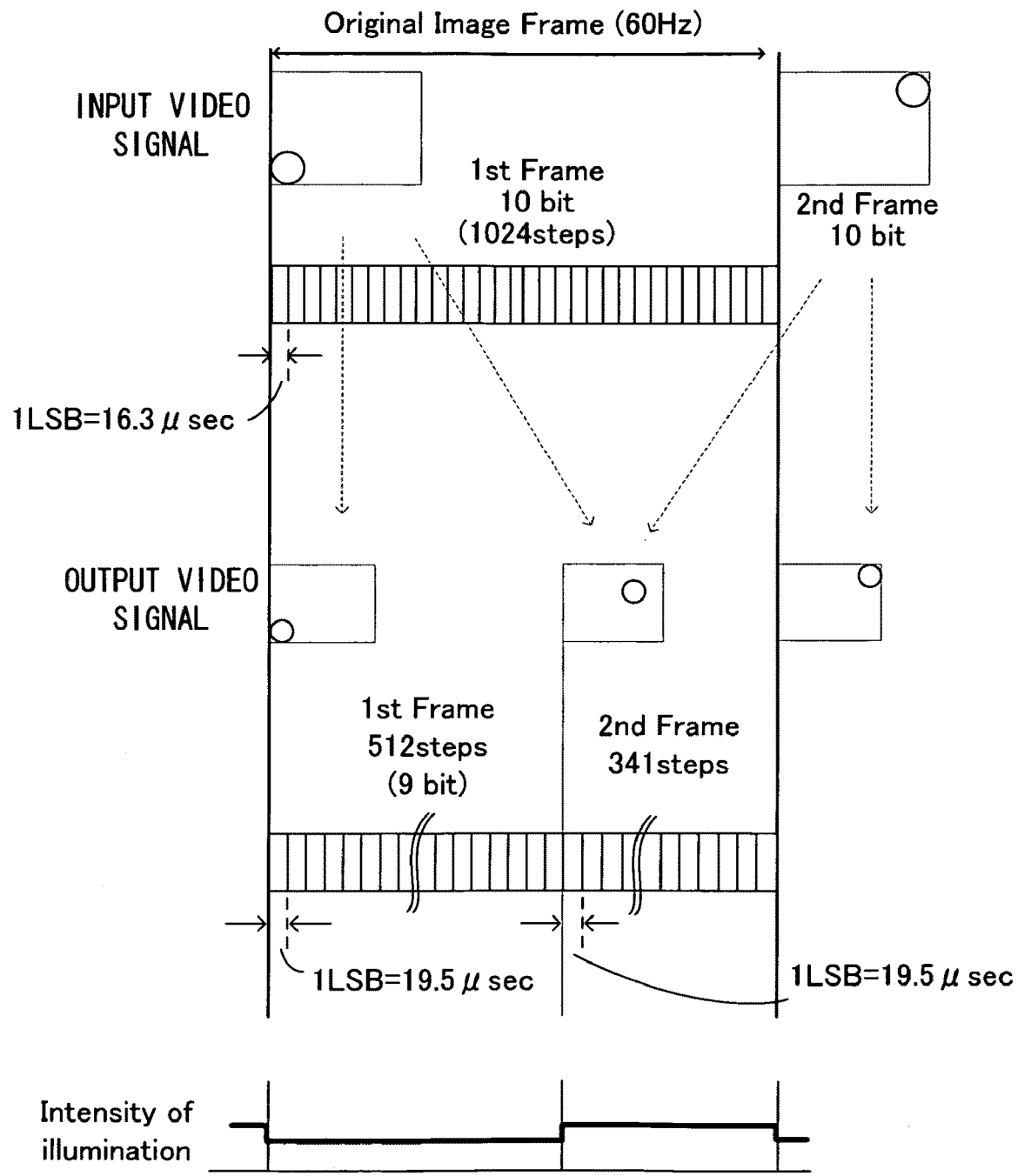
FIG. 56 is a diagram showing a specific example of a method for setting the weight of the intensity per unit of the second control at 1.5 times the weight of the intensity per unit of the first control, in the example shown in FIG. 55.

FIG. 56 is a diagram showing a specific example of a method which sets the weight of brightness per unit of second control at 1.5 times the weight of brightness per unit of first control.

FIG. 56 exemplifies the case of setting the period of time per unit of the second control to be the same as the period of time per unit of the first control, and also of setting the light intensity of the illumination light 1008 irradiated in the period of time per unit of the second control at one and a half (1.5) times that per unit of the first control, thereby designating the weight of brightness per unit of the second control to be 1.5 times that of the first control.

More specifically, the example shown in FIG. 56 is the same as the example shown in FIG. 55, in which the output video signal constitutes one frame having 512 (9-bit) gray scales and the other frame having 341 gray scales for each pixel. The example in FIG. 56 differs from that of FIG. 55 in that the frame rate of the output video signal is 120 Hz.

In FIG. 56, the first frame has 512 gray scales (i.e., 9-bit gray scale data) for each pixel, and the video signal of the second frame has 341 gray scales (i.e., between 9-bit gray scale data and 8-bit gray scale data) for each pixel, with the period of time per unit of the first control equal to the period of time per unit of the second control. The period of time per each unit of the first control and second control is approximately 19.5 (=1/60/(512+341) μsec. Further, the light intensity of the illumination light 1008 irradiated during the second frame period is 1.5 times that irradiated during the first frame period.

With this operation, it is possible to set the weight of brightness per unit of the second control at 1.5 times that of the first control.

As described above, the present embodiment is configured to generate, as the frame of an output video signal for each period of one frame of an input video signal, at least a first frame having N-bit gray scale data for each pixel (where N<M), and a second frame having N'-bit gray scale data for each pixel (where N'<N), when a frame having M-bit gray scale data for each pixel (where N<M and N'<N) is continuously inputted as the input video signal. Further, the configuration is such that, when a video image is displayed in accordance with the output video signal, the weight of brightness per unit of the first control, used when a video image is displayed in accordance with the first frame, is differentiated from that of the second control, used when a video image is displayed in accordance with the second frame. With this operation, the total gray scale data volume of at least two frames of the output video signal, generated within the period of one frame of the input video signal, is smaller than the gray scale data volume generated within the period of one frame of the input video signal. This makes it possible to reduce the load of the video processing and display processing. In addition, by combining the video images displayed in accordance with the aforementioned two frames, it is possible to project a video image display capable of expressing approximately the same number as, or a greater number of gray scales than, that of a video image displayed in accordance with the aforementioned frame with a larger number of gray scales. Therefore, it is possible to alleviate the load of the video image processing and display processing and to minimize degradation in the gray scale of a video image, as perceived by the human eye, while decreasing the information volume of an output video signal with a high frame rate.

Fifth Preferred Embodiment

The following is a description of an exemplary operation according to the present embodiment of a video display system 1001.

The video display system 1001 according to the present embodiment is a system projecting a color video image by means of a color sequential method, according to the third embodiment described above.

The present embodiment, however, is configured to provide a period for displaying the sub-frame image of each color of a plurality of primary colors and a plurality of complementary colors within the period of one frame of an output video signal, and to display the sub-frame images of the colors in sequence, thereby displaying a color video image. FIGS. 39 through 43 are diagrams each showing an example of providing such a period. More specifically, the period of one frame shown in each figure may be repeated in the all frame periods of an output video signal or may be repeated in one or more frame periods. Further, the frame rate of the output video signal is, for example, 360 Hz.

Figure 39:
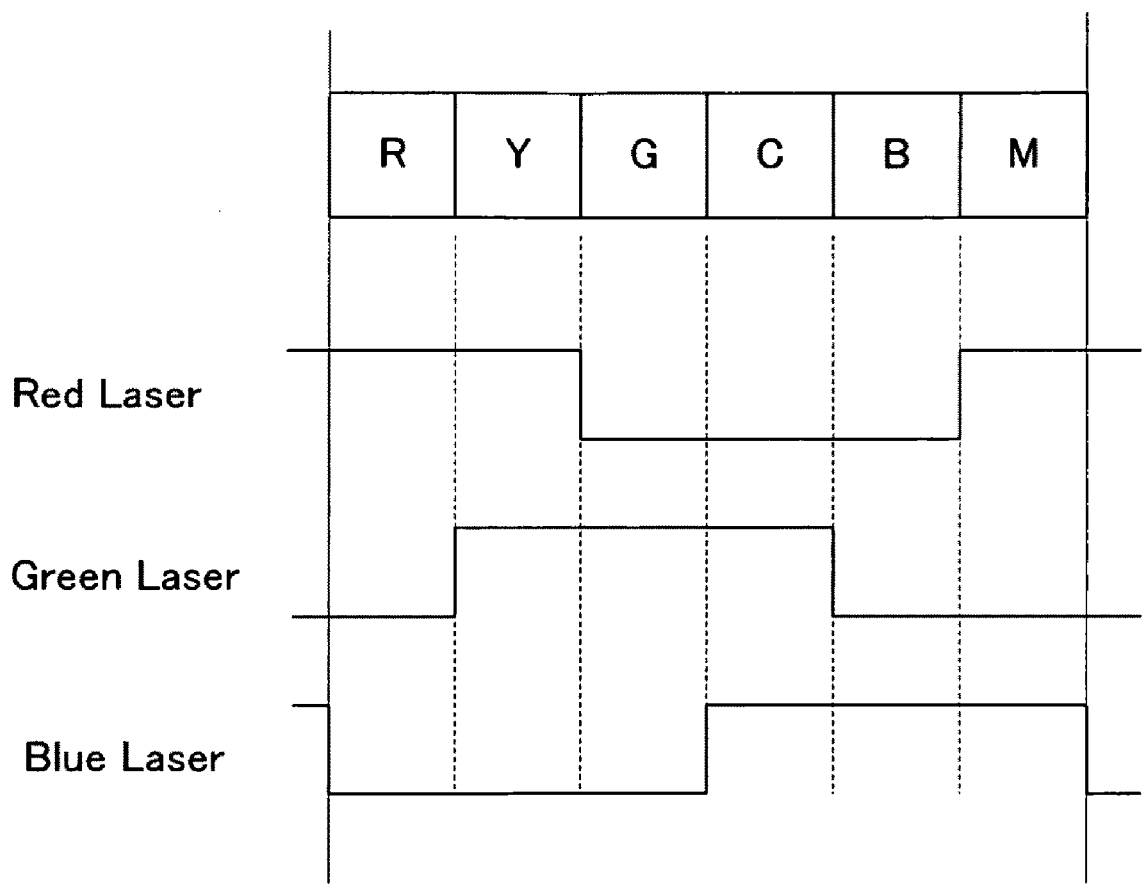
FIG. 39 is a diagram showing an example of providing a period for displaying the sub-frame video image of each color of a plurality of primary and complementary colors within the period of one frame of an output video signal.

FIG. 39 illustrates the process of providing a period for displaying the sub-frame of each of the primary colors R, G and B and of the complementary colors C, M and Y within the period of one frame of the output video signal so as to minimize the number of times each of three laser light sources (i.e., red-, green- and blue laser light sources) emit light, and of displaying the sub-frame images of the respective colors in sequence, thereby displaying a color video image.

The present example is configured with the periods for displaying the sub-frame images of the three primary colors and the three complementary colors in the order of R, Y, G, C, B and M, within the period of one frame. As such, the present embodiment is configured display, at least the sub-frame image of a first primary color, the sub-frame image of a first complementary color containing the first primary color, the sub-frame of a second primary color contained in the first complementary color, and the sub-frame image of a second complementary color containing the second primary color, in the aforementioned order, such as R, Y, G and C among the colors R, Y, G, C, B and M.

According to the present embodiment, since the sub-frame image of a primary color contained in a complementary color is displayed before and after the sub-frame image of the complementary color, it is possible to minimize the occurrence of the color breakup phenomena perceived by the human eye, when a color video image is displayed by sequentially displaying the sub-frame images of the respective colors.

Further, by displaying the sub-frame images of the respective colors in the order of R, Y, G, C, B and M within the period of one frame, it is possible for each laser light source in the variable light source 1013 to emit only once within the period of one frame. More specifically, in FIG. 39, the red laser light source (Red Laser) is emitted twice, and the green laser light source (Green Laser) and the blue laser light source (Blue Laser) are emitted once within the period of one frame. However, if the period shown in FIG. 39 is repeated, the red laser light source emits an average of one time per period, and therefore the number of times the red laser light source is emitted can be regarded as "1".

Figure 40:
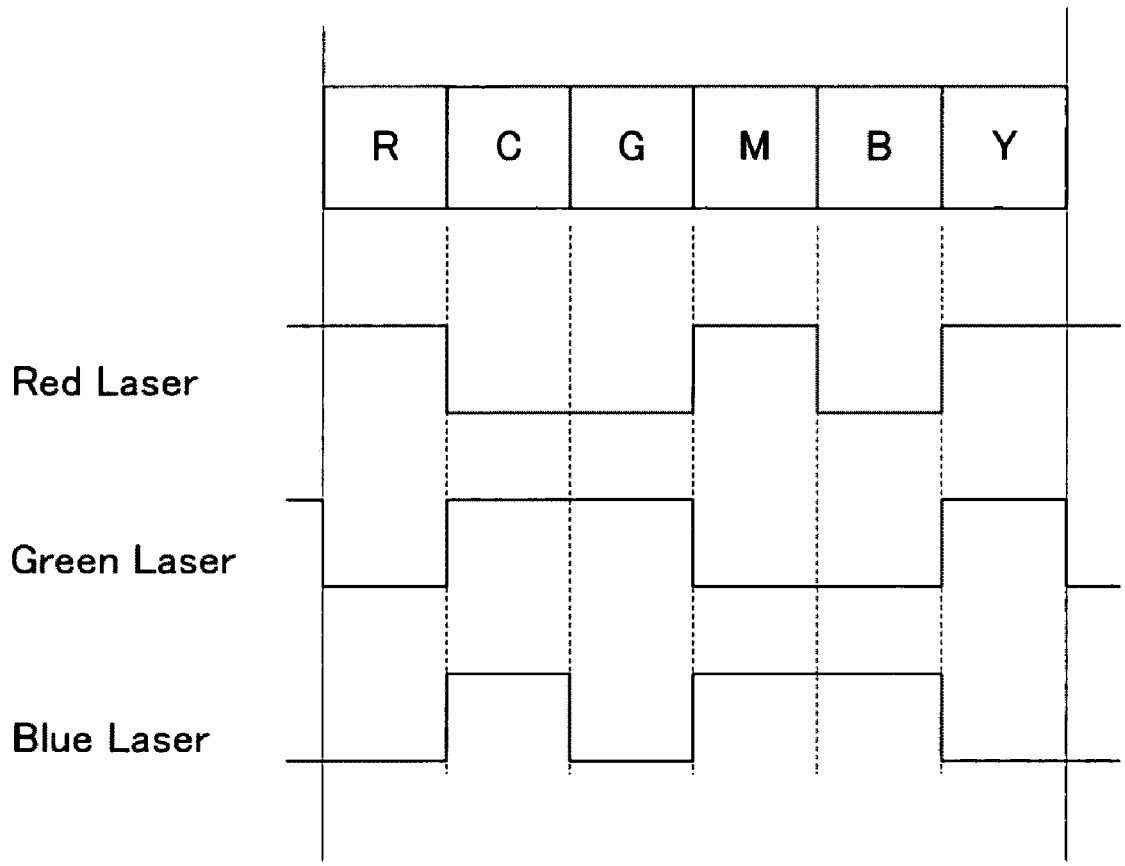
FIG. 40 is a second diagram showing an example of providing a period for displaying the sub-frame video image of each color of a plurality of primary and complementary colors within the period of one frame of an output video signal.
Figure 41:
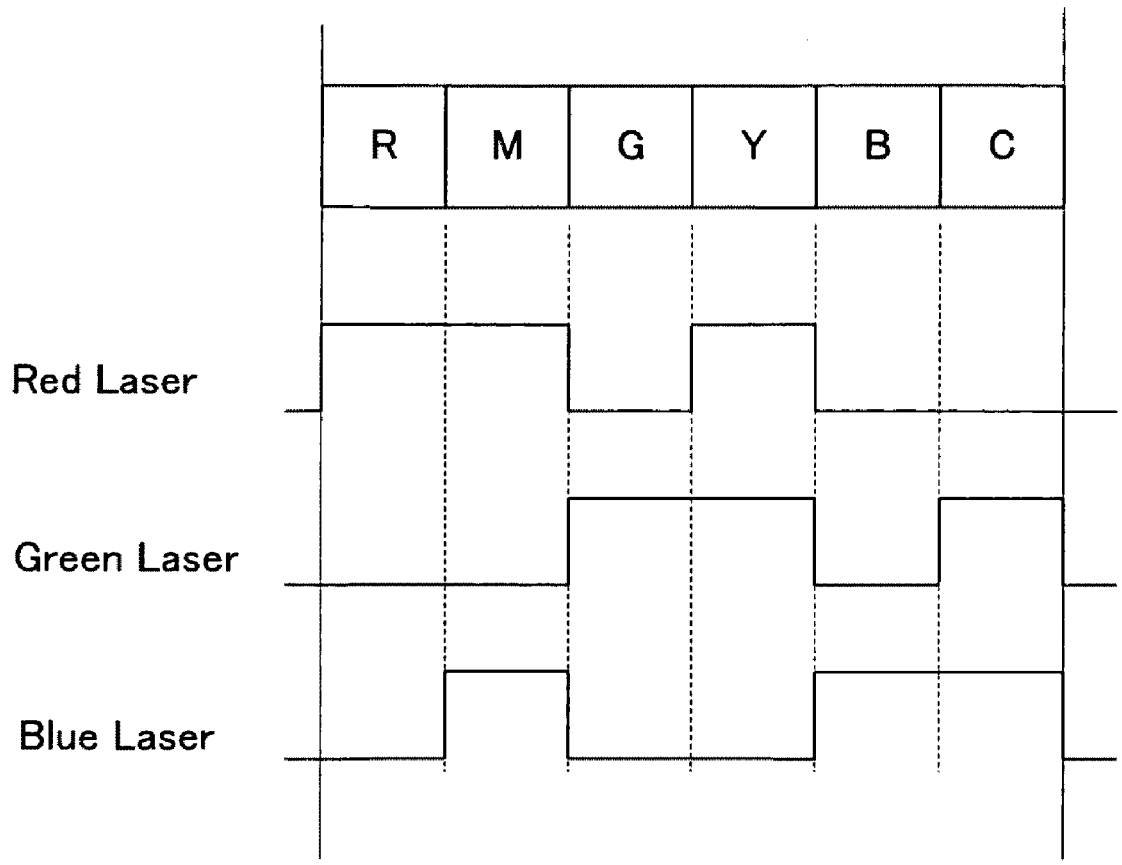
FIG. 41 is a third diagram showing an example of providing a period for displaying the sub-frame video image of each color of a plurality of primary and complementary colors within the period of one frame of an output video signal.

FIGS. 40 and 41 exemplify the case of providing a period for displaying the sub-frame image of each color of three primary colors R, G and B and of three complementary colors C, M and Y within the period of one frame of an output video signal so that the number of times each of three laser light sources, included in the variable light source 1013, is emitted is maximized.

FIG. 40 exemplifies the case of displaying sub-frame images of the respective colors of the three primary colors and three complementary colors in the order of R, C, G, M, B and Y within the period of one frame. As such, the present embodiment is configured to continuously display, within the period of one frame, at least the sub-frame image of a first primary color, the sub-frame image of a first complementary color composed in part of the first primary color, the sub-frame image of a second primary color which does not compose the first complementary color, and the sub-frame image of the second complementary color composed in part of the second primary color, in the aforementioned order, such as the order of R, C, G and M from among the colors R, C, G, M, B and Y.

According to the present embodiment, by displaying the sub-frame image of a primary color contained in a complementary color before or after the period for displaying the sub-frame image of the complementary color, it is possible to minimize the occurrence of the color breakup phenomena perceived by the human eye when the color video image is displayed by sequentially displaying the sub-frame images of the respective colors.

Further, by displaying the sub-frame images of the respective colors in the order of R, C, G, M, B and Y within the period of one frame, it is possible to limit the number of times each of three laser light sources is emitted to twice within the period of one frame. More specifically, the red laser light source (Red Laser) is emitted three times within the period of one frame shown in FIG. 39. However, if the period shown in FIG. 39 is repeated, the red laser light source emits an average of two times within one-frame period, and therefore the number of times the red laser light source is emitted can be regarded as "2". By increasing the number of times each of three laser light sources is emitted to "2" and by thus distributing the energy, it is possible to obtain a stable output of light sources by minimizing the heating of the laser light sources due to continuous emission.

FIG. 41 exemplifies the case of displaying the sub-frame images of the respective colors of the three primary colors and three complementary colors in the order of R, M, G, Y, B and C within the period of one frame. As such, the present embodiment is configured to display, within the period of one frame, the sub-frame image of a first primary color, the sub-frame image of a complementary color containing the first primary color, the sub-frame image of the second primary color which is in a complementary relationship with the first complementary color, and the sub-frame image of a second complementary color containing the second primary color, such as in the sequence of R, M, G and Y.

According to the present embodiment, the sub-frame image of a primary color contained in a complementary color is displayed before or after the sub-frame image of the complementary color, and therefore, it is possible to minimize the occurrence of color breakup phenomena perceived by the human eye when a color video image is displayed by sequentially displaying the sub-frame images of the respective colors.

Further, by displaying the sub-frame images of the respective colors in the order of R, M, G, Y, B and C within the period of one frame, it is possible to limit the number of times each of three laser light sources (Red Laser, Green Laser and Blue Laser) included in the variable light source 1013 is emitted to twice within the period of one frame. With this operation, it is possible to obtain a stable output of the light source by minimizing the heating of the laser light source due to continuous emission, as in the example shown in FIG. 40.

Figure 42:
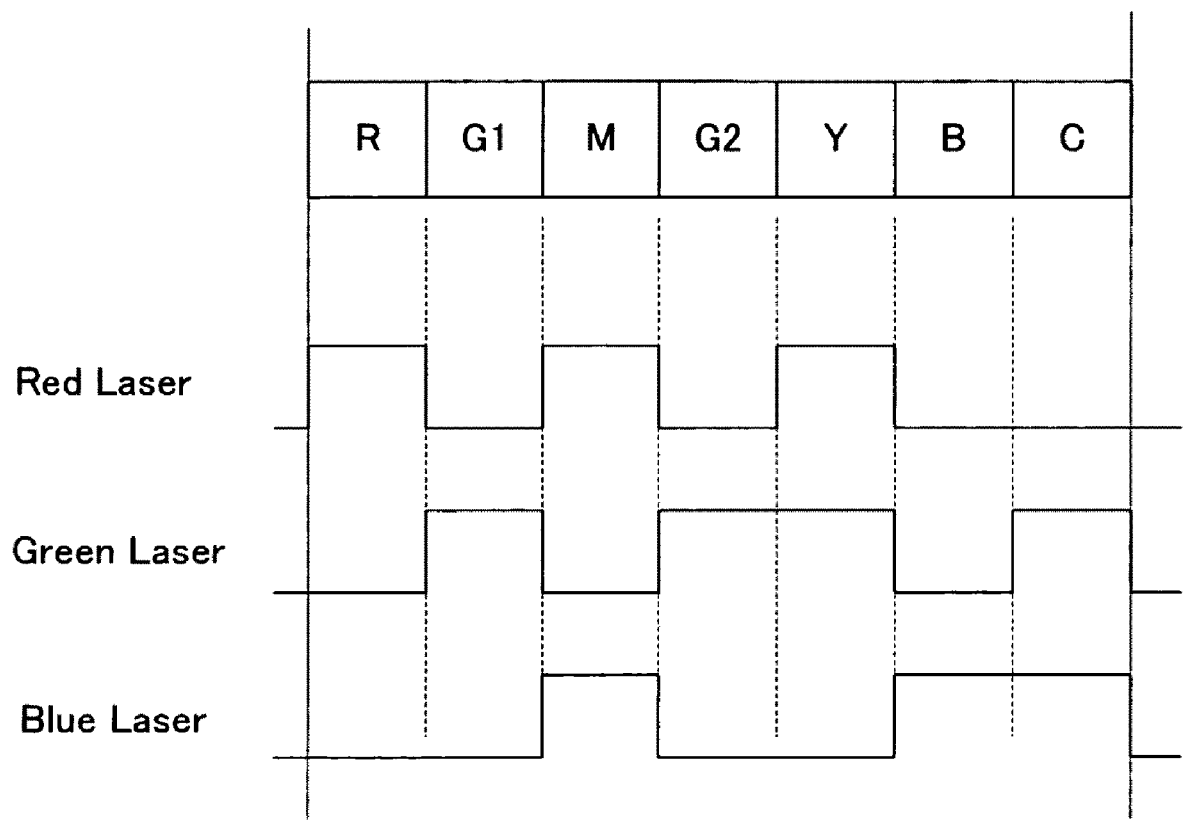
FIG. 42 is a fourth diagram showing an example of providing a period for displaying the sub-frame video image of each color of a plurality of primary and complementary colors within the period of one frame of an output video signal.

FIG. 42 exemplifies the case of displaying the sub-frame images of the three primary colors R, G and B and the three complementary colors C, M, and Y, and also of providing two periods for displaying the sub-frame image of only G to which the human eye has the highest sensitivity, within the period of one frame, so as to cause the three laser light sources in the variable light source 1013 to each emit light three times, within the period of one frame of an output video signal, thereby attaining the display of a color video image by sequentially displaying the sub-frame images of the aforementioned colors.

In the example shown in FIG. 42, the sub-frame images of the three primary colors and three complementary colors are displayed in the order of R, G1, M, G2, Y, B and C within the period of one frame. More specifically, the sub-frame of G is displayed twice, during the period G1 and G2.

As such, the present embodiment is configured to display, within the period of one frame, the first sub-frame image of a first primary color, the sub-frame image of a first complementary color in a complementary relationship with the first primary color, the second sub-frame image of the first primary color, the sub-frame image of a second complementary color containing the first primary color, the sub-frame image of a second primary color not contained in the second complementary color, the sub-frame image of the third complementary color, and the sub-frame image of the third primary color, in the aforementioned order, such as in the order of R, G1, M, G2, Y, B and C.

According to the present example, before or after the sub-frame image of a complementary color is displayed, the sub-frame image of the primary color contained in the complementary color is displayed, thereby making it possible to suppress the occurrence of color breakup phenomena, perceived by the human eye when a color video image is displayed by sequentially displaying the sub-frame images of the colors.

Further, this configuration makes it possible to set the number of times each of the red and green laser light sources (Red Laser and Green Laser) in the variable light source 1013 is emitted to three times. By increasing the number of times each of the red and green laser light sources is emitted, energy is distributed, and the heating of the laser light sources due to continuous emission (i.e., continuous turn-on) is significantly suppressed, thereby making it possible to obtain a stable output of the light source.

More specifically, the present example is configured to provide, within the period of one frame, two periods for displaying the sub-frame image of G, to which the human eye has the highest sensitivity. Alternately, it may be configured to provide two periods for displaying the sub-frames of a primary color, determined on the basis of the brightness of individual colors in the video image represented by the input video signal. The sub-frame image of R may be displayed twice if, for example, the video image represented by the input video signal is predominantly red, such as a sunset.

Figure 43:
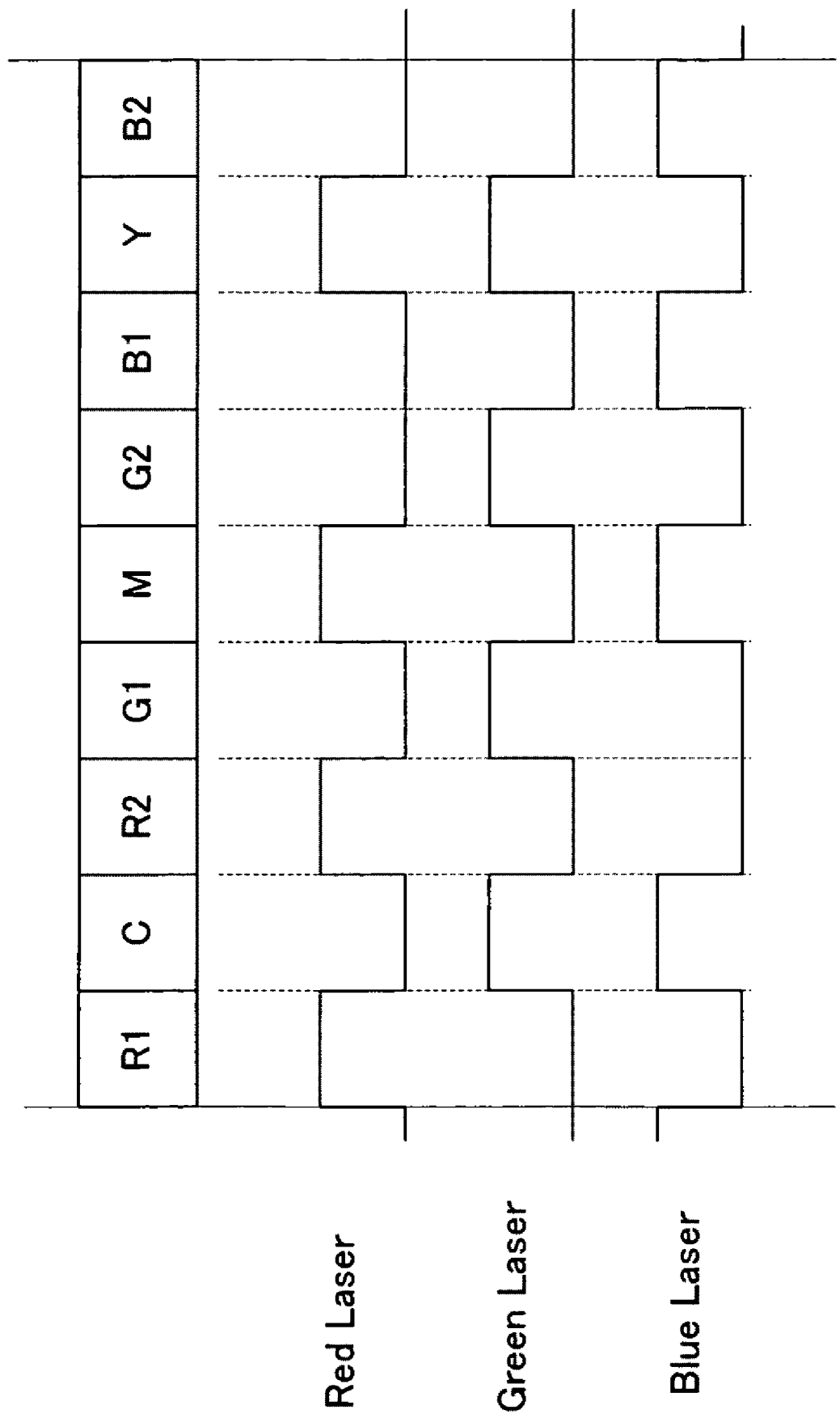
FIG. 43 is a fifth diagram showing an example of providing a period for displaying the sub-frame video image of each color of a plurality of primary and complementary colors within the period of one frame of an output video signal.

FIG. 43 exemplifies the case of providing periods for displaying the sun-frame images of the three primary colors R, G and B and the three complementary colors C, M, and Y, and also of providing two periods, for displaying the sub-frame of each color of the three primary colors, so as to cause the three laser light sources included in the variable light source 1013 to emit light four times, within the period of one frame of an output video signal, thereby projecting a color video image by sequentially displaying the sub-frame images of the aforementioned colors.

In the example shown in FIG. 43, the sub-frame images of the three primary colors and three complementary colors are displayed in the order of R1, C, R2, G1, M, G2, B1, Y and B2 within the period of one frame. More specifically, there are two periods for displaying the sub-frame image of R, R1 and R2. Similarly, there are the two periods for displaying the sub-frame image of G, G1 and G2, and two periods for displaying the sub-frame image of B, B1 and B2.

As such, the present example is configured to provide three periods: 1.) a period for displaying the sub-frame image of a first complementary color (C), between the first and second sub-frame image display periods of R1 and R2, to which color C has a complementary relationship, where the periods of R1 and R2 are obtained by dividing the video image display period for the first primary color (R) into two parts within the period of one frame; 2.) a period for displaying the sub-frame image of a second complementary color (M) between the first and second sub-frame image display periods of G1 and G2, to which color M has a complementary relationship, where the periods of G1 and G2 are obtained by dividing the video image display period for the second primary color (G) into two parts within the period of one frame; 3.) and a period for displaying the sub-frame image of a third complementary color (Y) between the first and second sub-frame image display periods of B1 and B2, to which color Y has a complementary relationship, where the periods of B1 and B2 are obtained by dividing the video image display period for the third primary color (B) into two parts within the period of one frame, in the order of R1, C, R2, G1, R2, G, M, G2, B1, Y and B2.

The present example is configured to set the number of times each of the three laser light sources (Red Laser, Green Laser and Blue Laser) in the variable light source 1013 is emitted at four times, within the period of one frame. By increasing the number of times each of three laser lights sources emits light, for the period of one frame, the heating of the laser light sources due to continuous emission (i.e., continuous turn-on) is further suppressed, thereby making it possible to obtain a stable output of the light sources.

Meanwhile, the present example shows an exemplary case of equipping two sub-frames for each primary color during the period of one frame. Alternately, it may be configured to equip a sub-frame by dividing the frame to units of LSBs, when a laser light source capable of repeating a high-speed turn-on and turn-off is used. Specifically, when green (G) is displayed with 8-bit data, the use of the above described non-binary data makes it possible to perform a display by dividing the display period of G into a maximum of 256 sub-frames.

As described above, the present embodiment is configured to specify the sequence for displaying the sub-frame images of the primary colors and the complementary colors, within the period of one frame of an output video signal. This makes it possible to suppress the occurrence of the color breakup phenomena, perceived by the human eye when the sub-frame images of the different colors are displayed. Further, distributing of energy by increasing the number of times the laser light sources of the colors R, G and B are emitted for each period of one frame makes it possible to obtain a stable output of the light source by limiting the heating of the laser light source due to continuous emission (i.e., continuous turn-on).

More specifically, the present embodiment has been described by exemplifying the case of displaying a color video image by displaying the sub-frame images of different colors in sequence in the video display system 1001, which generates the frame signals of the output video signal at a higher frame rate than that of the input video signal. Alternately, it is possible to display a color video image by displaying the sub-frame images of the respective colors in sequence by designating the sequence of the periods in a conventional video display system, which does not generate the frame signals of an output video signal at a higher frame rate than that of the input video signal.

The first through fifth preferred embodiments have so far been described.

Each of the embodiments has been described by exemplifying the video display system 1001 shown in FIG. 4 as the video display system. The embodiments, however, are not limited to the configuration shown in FIG. 4. It is also possible to utilize another configuration as a video display system. For example, the video display system 1001 may be configured display a color image by means of a color sequential method of individually controlling the emission of the red, green, and blue light sources in the variable light source 1013. Except for the case of the fifth embodiment, it is also possible to achieve the same results using a color wheel.

Figure 44:
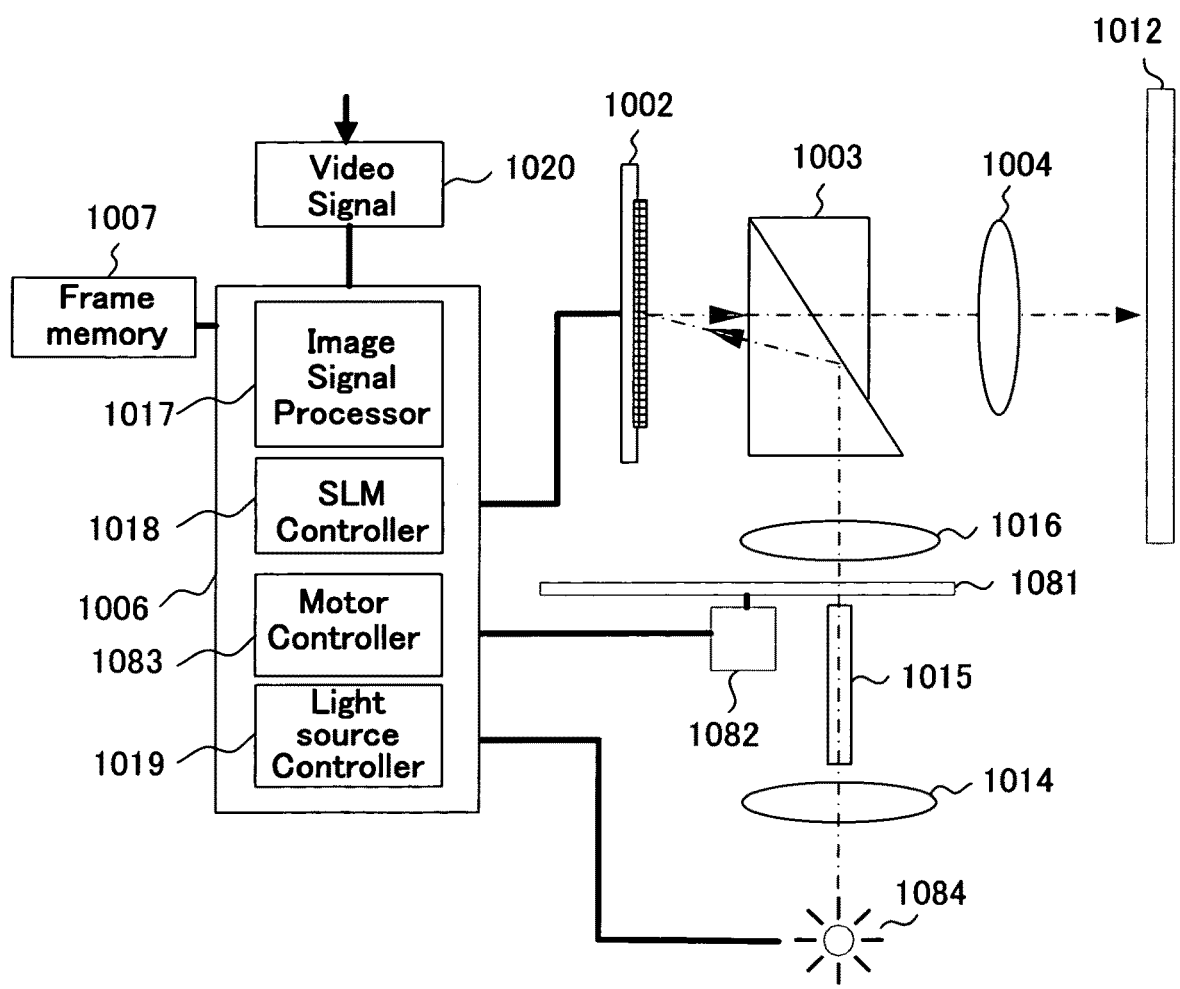
FIG. 44 is a functional block diagram showing an exemplary configuration of a video display system using a color wheel.

FIG. 44 is a diagram showing an exemplary configuration of a video display system attaining a color display using a color wheel.

The exemplary configuration shown in FIG. 44 is configured to equip the video display system 1001 (in FIG. 4) with a color wheel 1081, a motor 1082 for rotating the color wheel 1081, and a motor controller 1083 for controlling the rotation of the motor 1082. Additionally, instead of the variable light source 1013 in FIG. 4, a white light source 1084 is equipped in the configuration of FIG. 44.

The color wheel 1081 includes a filter for each of the colors (e.g., R, G and B), and is equipped between the rod type condenser body 1015 and second condenser lens 1016. Further, the configuration is such that a filter of an individual color is sequentially inserted into the light path of the light source optical system 1005 when the color wheel 1081 is rotated.

The display processing unit 1006 is equipped with the motor controller 1083, with the operational timing controlled by the sequencer 1035 (refer to FIG. 5).

Further, the white light source 1084 is controlled by the light source controller 1019.

While the white light source 1084 is controlled under an emission state with such a comprisal, the rotation of the color wheel 1081 is controlled to insert a corresponding color filter into the light path in synchronization with the sub-frame image of the colors to be sequentially projected onto the screen 1012, in accordance with the frame signals of the output video signal. Thereby, a color image is displayed by means of a color sequential display method.

The video display system 1001 described above is a single-panel system, with one SLM 1002. However, a video display system may also be configured with a two-panel system, which are equipped with two SLMs 1002.

Figure 45A:
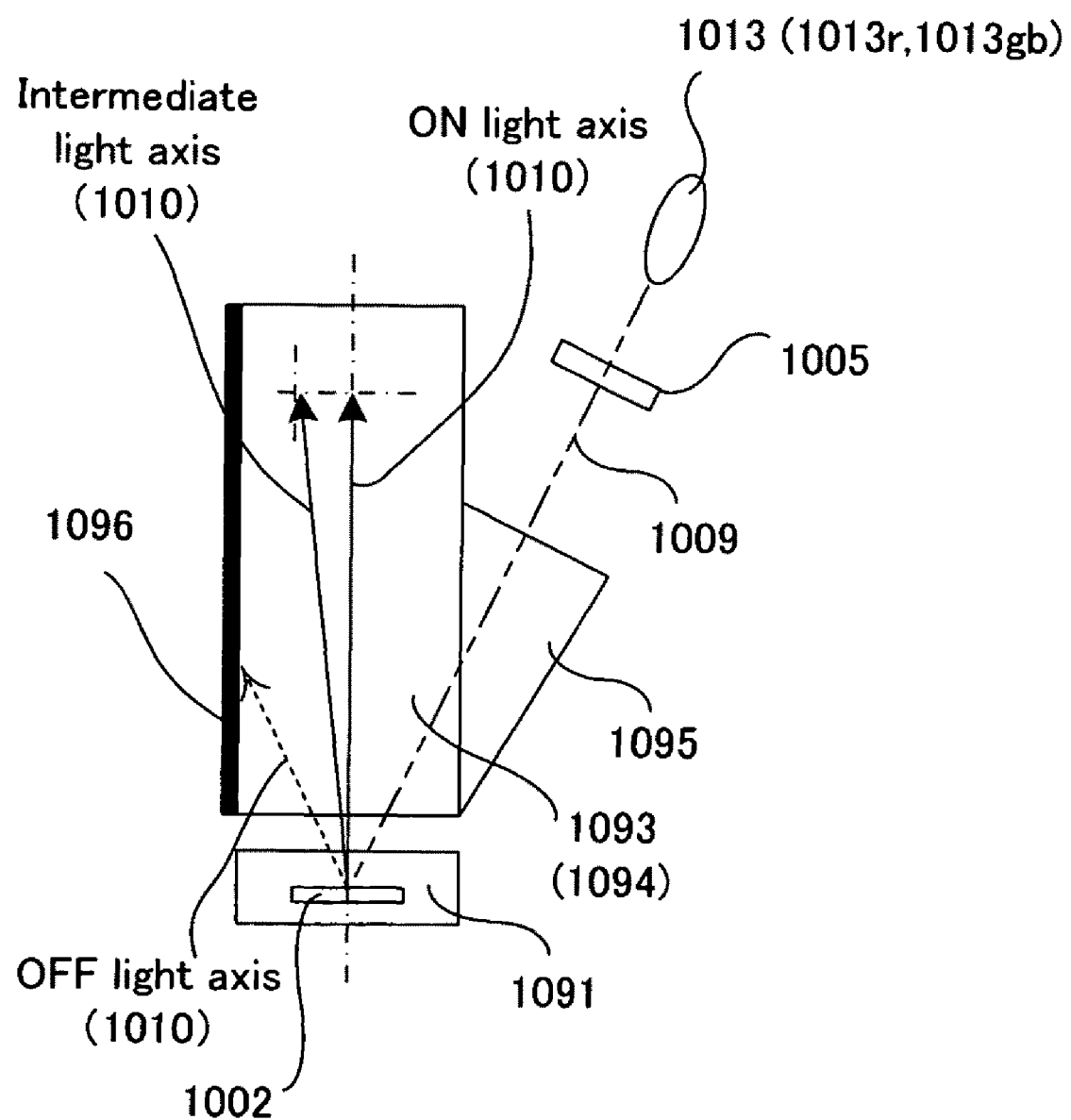
FIGS. 45A, 45B, 45C and 45D are diagrams showing different perspective views of an exemplary configuration of the optical comprisal of a two-panel video display system.
Figure 45B:
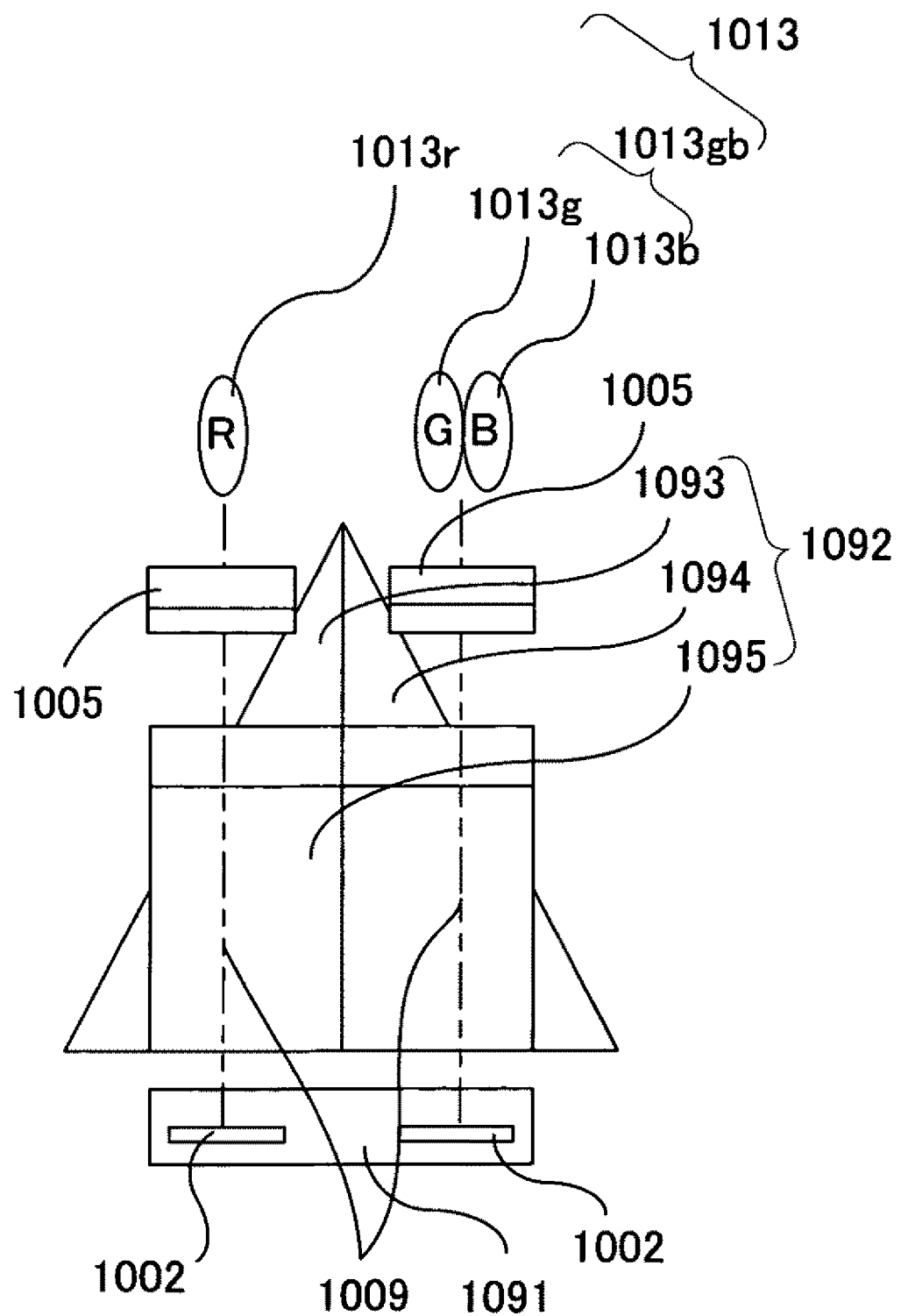
Figure 45C:
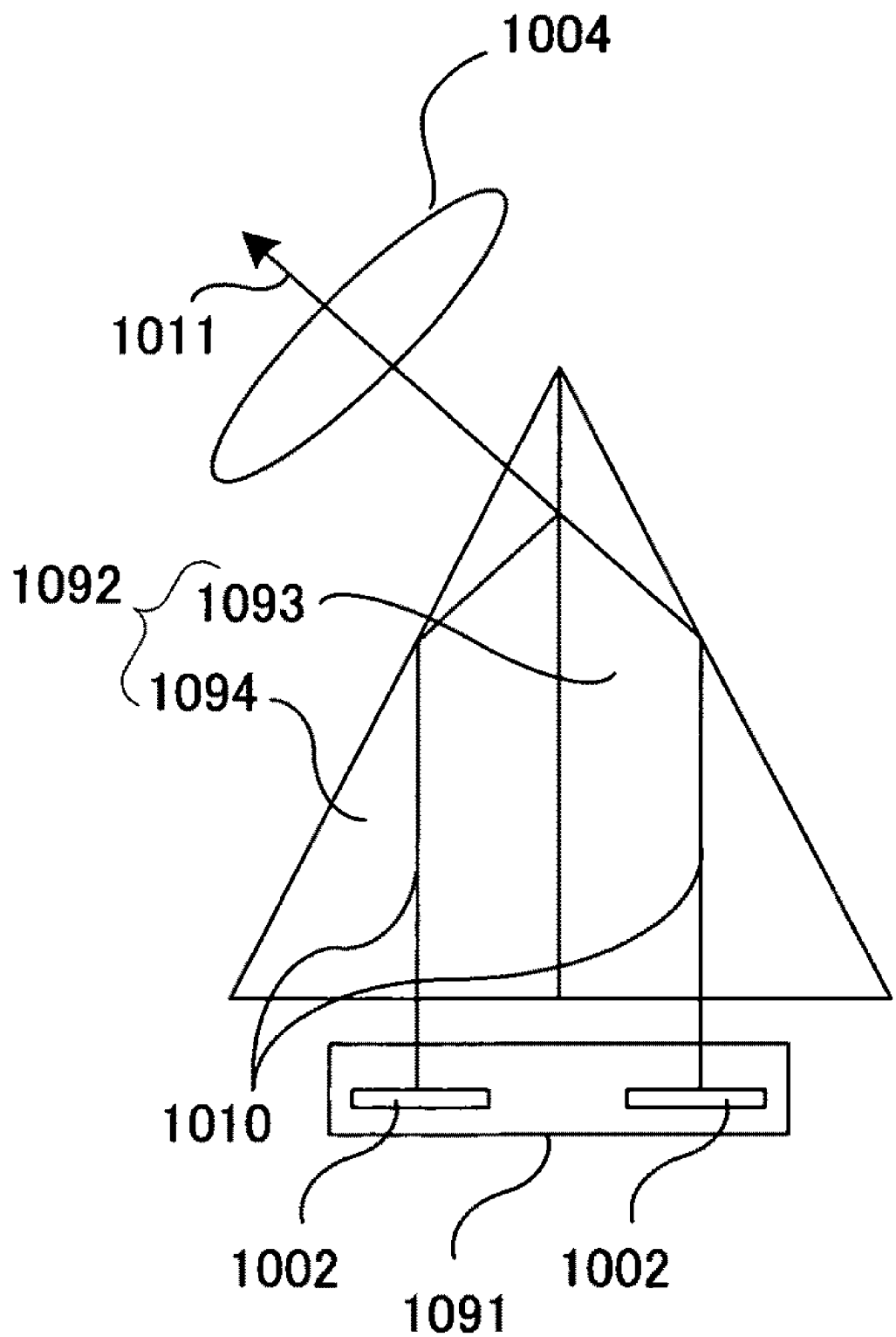
Figure 45D:
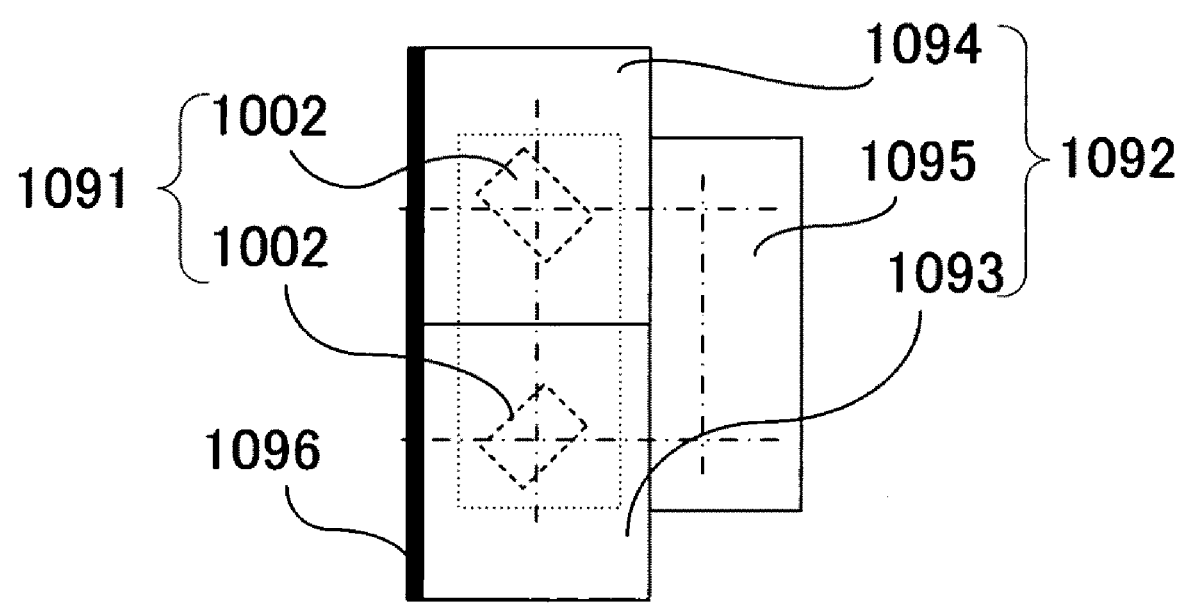

FIGS. 45A, 45B, 45C and 45D are diagrams showing an exemplary configuration of the optical comprisal of a two-panel video display system. Further, FIG. 45A is a side view of the synthesis optical system, which is the optical comprisal of the system; FIG. 45B is a front view thereof; FIG. 45C is a rear view thereof; and FIG. 45D is a top view thereof.

Referring to FIGS. 45A, 45B, 45C and 45D, the present synthesis optical system includes a device package 1091 in which two SLMs 1002 are accommodated, a color synthesis optical system 1092, a light source optical system 1005, and variable light sources 1013 (i.e., 1013r and 1013gb).

The two SLMs 1002 are accommodated in the device package 1091 such that the rectangular form of each SLM 1002 is inclined relative to each side of the rectangular device package 1091, at approximately 45 degrees in the horizontal plane.

The color synthesis optical system 1092 is placed on the device package 1091.

The color synthesis optical system 1092 is constituted by triangular columnar prisms 1093 and 1094, which are adhesively attached together along their lengths so as to form a right-angle triangular column, and by a right-angle triangular columnar light guide block 1095, which is adhesively attached to the side surface of the aforementioned prisms on the slope surface of the light guide block 1095, with the bottom surface thereof facing upward.

A light absorption body 1096 is equipped on the opposite of the prisms 1093 and 1094.

The light source optical system 1005 of the variable light source 1013r (i.e., the red laser light source 1013r) and the light source optical system 1005 of the variable light source 1013gb (i.e., the green laser light source 1013g and blue laser light source 1013b) are equipped on the bottom surface of the light guide block 1095, with the optical axes of the variable light sources 1013r and 1013gb vertically aligned.

The illumination light 1008 emitted from the red laser light source 1013r is incident to the SLM 1002, positioned immediately underneath the prism 1093, as incident light 1009 by way of the light guide block 1095 and the aforementioned prism 1093.

Meanwhile, the illumination lights 1008 emitted from the green laser light source 1013g and/or blue laser light source 1013b are incident to the SLM 1002 on the other side, positioned immediately underneath the prism 1094, as incident light 1009 by way of the light guide block 1095 and the aforementioned prism 1094.

In the ON state of the mirror 1053, the green and/or blue incident light 1009 incident to the SLM 1002 is reflected vertically upward as reflection light 1010 in the prism 1094, is further reflected by the external side surface and the joinder surface, in this order, of the aforementioned prism 1094, and is incident to the projection optical system 1004, thus constituting a projection light 1011.

Also in the ON state of the mirror 1053, the red incident light 1009 is reflected vertically upward as reflection light 1010 in the prism 1093, is further reflected by the external side surface of the aforementioned prism 1093, is directed through the same light path as the green and/or blue reflection light 1010, and is incident to the projection optical system 1004, thus constituting a projection light 1011.

As described above, two SLMs 1002 are accommodated in one device package 1091 according to the video display system. Only the incident light 1009 from the red laser light source 1013*r* is irradiated on one SLM 1002. The incident light 1009 from the green laser light source 1013*g* and/or blue laser light source 1013*b* is irradiated on the other SLM 1002. The modulation lights respectively modulated by the two SLMs 1002 are condensed in the color synthesis optical system 1092 as described above. The condensed light is enlarged by the projection optical system 1004 and is projected onto the screen 1012 as projection light 1011.

Figure 46:
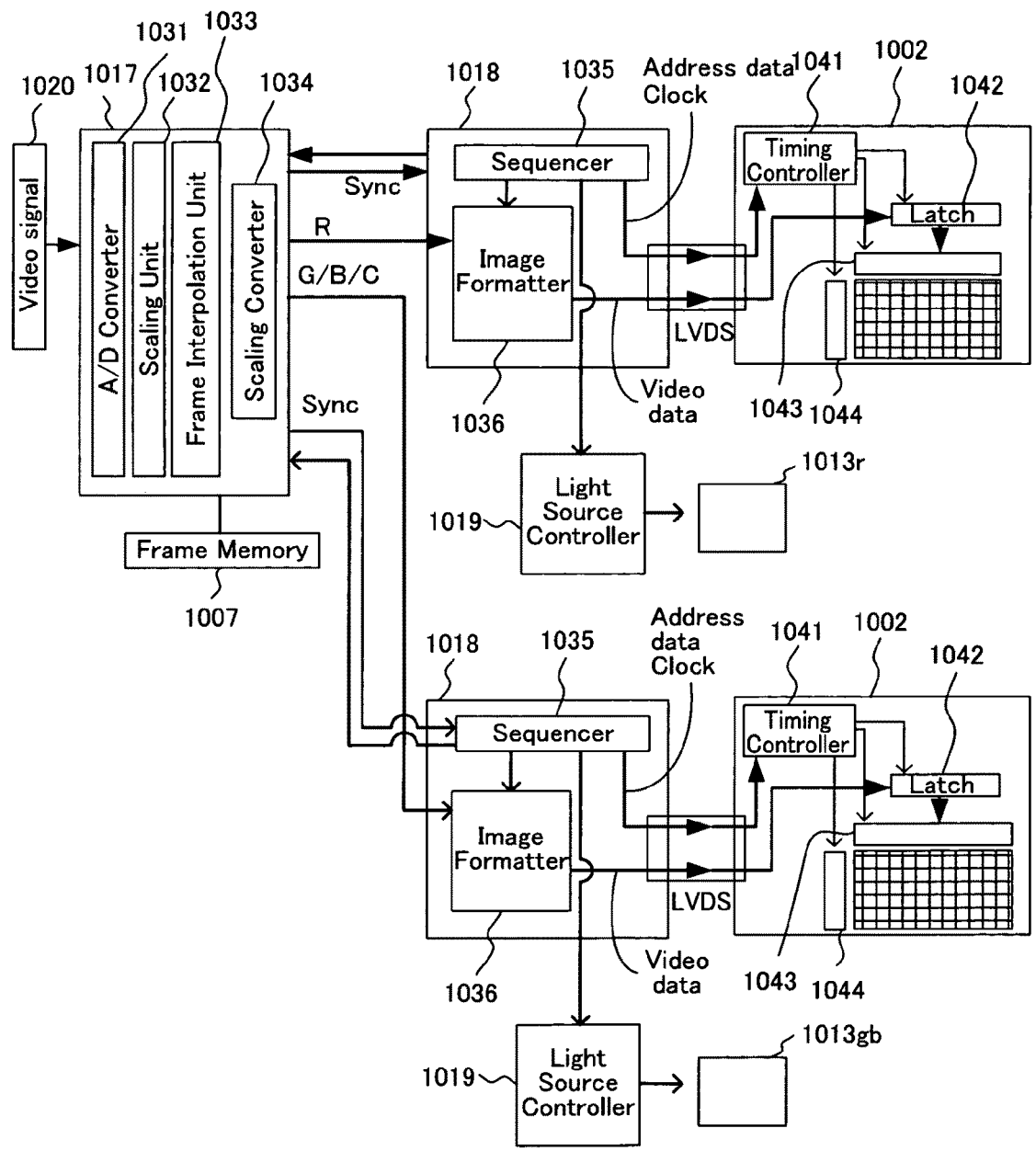
FIG. 46 is a functional block diagram showing an exemplary configuration of a circuit for a video display system including the optical comprisal shown in FIGS. 45A, 45B, 45C and 45D.

FIG. 46 is a diagram showing an exemplary configuration of a circuit for a video display system, including the optical comprisal shown in FIGS. 45A through 45D.

As shown in FIG. 46, the exemplary circuit configuration of the present video display system is different from that of the video display system 1001 shown in FIG. 5, in that the former comprises two systems, including the SLM controller 1018, SLM 1002, light source controller 1019, and variable light source 1013, as the later-stage circuits of the image processing unit 1017.

Of the two systems shown in FIG. 46, one system includes the variable light source 1013*r*, the light source controller 1019 used for controlling the variable light source 1013*r*, and the SLM controller 1018 used for controlling the light source controller 1019 and the SLM 1002 which modulates the red incident light 1009.

The other system includes the variable light source 1013*gb*, the light source controller 1019 used for controlling the variable light source 1013*gb*, and the SLM controller 1018 used for controlling the light source controller 1019 and the SLM 1002 which modulates the green and/or blue incident lights 1009.

Further, in the present video display system, the signal conversion unit 1034 converts the frame signal of a video signal output from the frame interpolation unit 1033 into a frame signal having the color information of R and a frame signal having the color information of at least one color of G, B and C. Then, the frame signal having the color information of R is inputted into the SLM controller 1018 used for controlling the SLM 1002 which modulates the red incident light 1009, while the frame signal having the color information of at least one color of G B and C is inputted into the SLM controller 1018 used for controlling the SLM 1002 which modulates the green and/or blue incident light 1009.

Further, the frame interpolation unit 1033 processes in accordance with a control signal outputted from the respective sequencers 1035 of the two SLM controllers 1018. The frame synchronous signals generated by the frame interpolation unit 1033 are inputted into the respective sequencers 1035 of the two SLM controllers 1018.

The configuration as described controls both the red laser light source 1013*r* and SLM 1002 used for modulating the red incident light 1009 and controls both the variable light source 1013*gb* and the SLM 1002 used for modulating the green and/or blue incident light 1009, in accordance with the frame signals of the output video signal, thereby making it possible to attain a color display.

Note that, except for in the case of the fifth embodiment, the two-panel video display system is also capable of attaining a color display using a color wheel.

Figure 47:
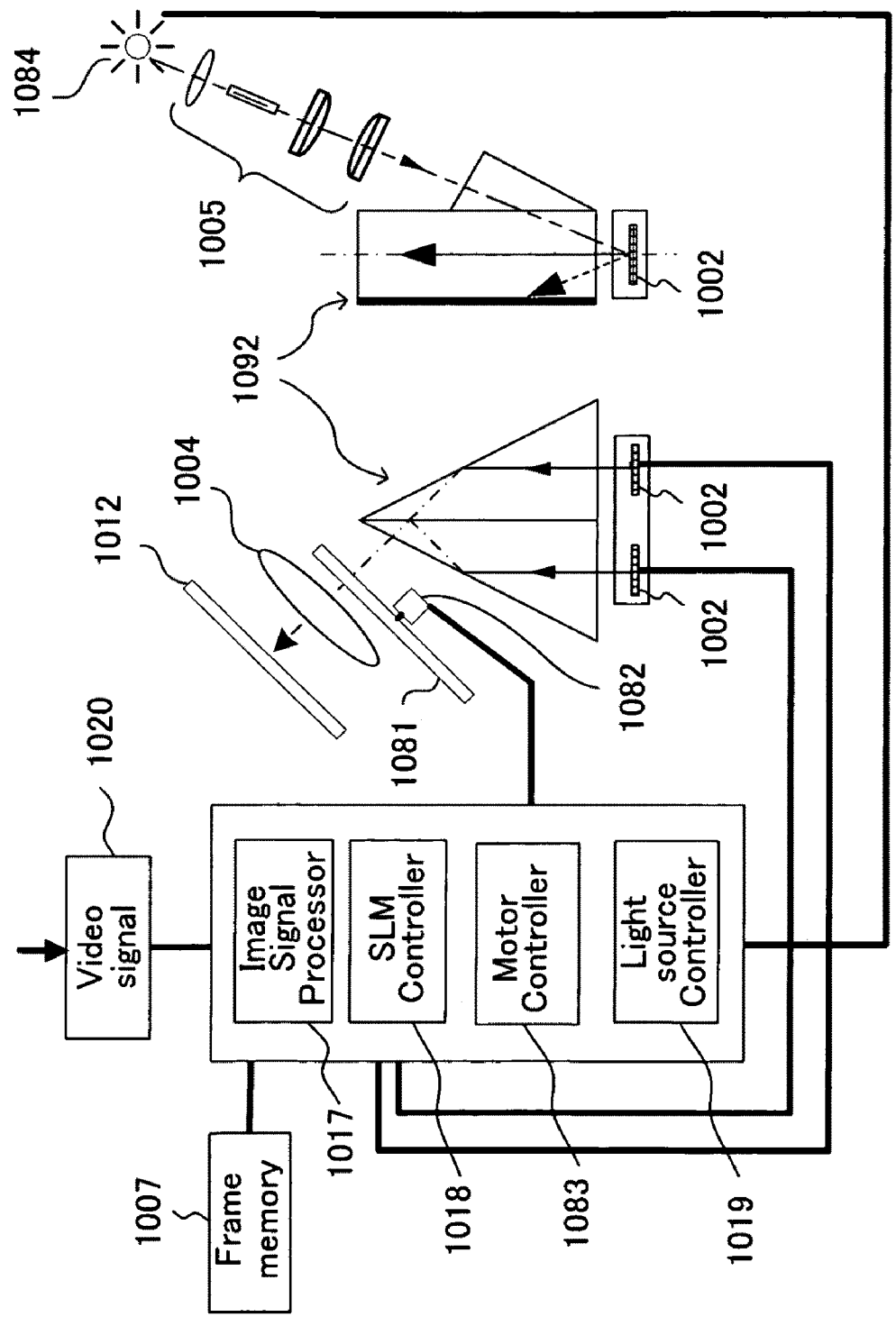
FIG. 47 is a diagram showing an exemplary configuration of a two-panel video display system using a color wheel.

FIG. 47 is an exemplary configuration of such a case.

In contrast to the above described video display system, the exemplary configuration shown in FIG. 47 is equipped with a color wheel 1081, a motor 1082 for rotating the color wheel 1081, and a motor controller 1083 for controlling the rotation of the motor 1082. In addition, the variable light source 1013 is replaced with a white light source 1084.

In the exemplary configuration shown in FIG. 47, the white light source 1084 is controlled by the light source controller 1019, and the light source controller 1019 and two SLMs 1002 are controlled by a single SLM controller 1018.

The color wheel 1081 has the filters of a plurality of colors (e.g., R, G and B), and is equipped between the color synthesis optical system 1092 and projection optical system 1004. The configuration is such that the filters of the respective colors are sequentially inserted into the light path of the projection optical system 1004 when the color wheel 1081 is rotated.

The motor controller 1083 is equipped in the display processing unit 1006 and the operational timing of the motor controller 1083 is controlled by the SLM controller 1018.

With such a comprisal, the two SLMs 1002 and the rotation of the color wheel 1081 are controlled in accordance with the frame signal of the output video signal, after controlling the white light source 1084 under an emission state, and thereby a color display by means of a color sequential method can be attained.

Whereas the present invention has been described in detail, the present invention may, of course, be improved or modified in various manners possible within the scope and spirit of the present invention and is not limited to the above described embodiments.

For example, it is possible to combine the configurations and/or operations put forth in the above described first through fifth embodiments.

As such, the present invention can reduce degradation in the gray scale of a video image, as perceived by the human eye, while decreasing the information volume of a high frame-rate frame signal to be generated, so as to not increase the load of the video image processing and display processing.

Although the present invention has been described in terms of the presently preferred embodiment, it is to be understood that such disclosure is not to be interpreted as limiting. Various alternations and modifications will no doubt become apparent to those skilled in the art after reading the above disclosure. Accordingly, it is intended that the appended claims be interpreted as covering all alternations and modifications as fall within the true spirit and scope of the invention.

What is claimed is:

1. A video display system, comprising:
   a plurality of primary color light sources;
   a spatial light modulator (SLM) for modulating an illumination light emitted from at least one of the plurality of primary light sources, wherein a display controller for controlling a process to display a sequence of video images within a period of one frame comprising each of a plurality of primary colors and each of a plurality of complementary colors to minimize a number of emissions of each of the plurality of primary color light sources and also displaying the video images of the colors of the plurality of primary colors and the plurality of complementary colors in sequence;
   the display controller controlling a display of the sequence of video images within the period of one frame according to a order of:
   (a) the video image of a first primary color,
   (b) the video image of a first complementary color containing the first primary color,
   (c) the video image of a second primary color contained in the first complementary color, and (d) the video image of a second complementary color containing, the second primary color.

2. The video display system according to claim 1, wherein:
the plurality of primary colors comprising three colors of a red (R) color, a green (G) color and a blue (B) color, and the plurality of complementary colors comprising three colors of cyan (C) color, a magenta (M) color and a yellow (Y) color.

3. A video display system, comprising:
a plurality of primary color light sources; and
a spatial light modulator (SLM) for modulating an illumination light emitted from at least one of the plurality of primary light sources, wherein a display controller for controlling a process to display a sequence of video images within a period of one frame comprising of each of a plurality of primary colors and each of a plurality of complementary colors to maximize a number of emissions of each of the plurality of primary color light sources and also displaying the video images of the colors of the plurality of primary Colors and the plurality of complementary colors in sequence; and
the display controller controlling a display of the sequence of video images within the period of one frame according to a order of:
(a) the video image of a first primary color,
(b) the video image of a first complementary color containing the first primary color,
(c) the video image of a second primary color contained in the first complementary color, and
(d) the video image of a second complementary color containing the second primary color.

4. The video display system according to claim 3, wherein:
the plurality of primary colors comprising three colors of a red (R) color, a green (G) color and a blue (B) color, and the plurality of complementary colors comprising, three colors of can t C) color, a magenta (M) color and a yellow (Y) color.

5. A video display system comprising:
a plurality of primary color light sources; and
a spatial light modulator (SLM) for modulating an illumination light emitted from at least one of the plurality of primary light sources, wherein a display controller for controlling a process to display a sequence of video images within a period of one frame comprising of each of a plurality of primary colors and each of a plurality of complementary colors to maximize a number of emissions of each of the plurality of primary color light sources and also displaying the video images of the colors of the plurality of primary colors and the plurality of complementary colors in sequence;
the display controller controlling a display of the sequence of video images within the period of one frame according to the order of:
(a) the video image of as first primary color,
(b) the video image of a first complementary color containing the first primary color,
(c) the video image of a second primary color that is in a complementary relationship with the first complementary color, and
(d) the video image of a second complementary color containing the second primary color.

6. A video display system comprising:
a plurality of primary color light sources; and
a spatial light modulator (SLM) for modulating an illumination light emitted from at least one of the of primary light sources, wherein a display controller for controlling a process to disease sequence of video images within a period of one frame comprising of each of a plurality of primary colors and each of a plurality of complementary colors to maximize a number of emissions of each of the plurality of primary color light sources and also displaying the video images of the colors of the plurality of primary colors and the plurality of complementary colors in sequence:
the display controller controlling a display of the sequence of video images within the period of one frame according to the order of:
(a) the first video image of a first primary color,
(b) the video image of a first complementary color that is in a complementary relationship with the first primary color,
(c) the second video image of the first primary color,
(d) the video image of a second complementary color containing the first primary color,
(e) the video image of a second primary color not contained in the second complementary color,
(f) the video image of a third complementary color
(g) the video image of a third primary color.

7. The video display system according to claim 6, wherein:
the display controlling the display of the video image of the first primary color based on a color visibility to the human eye.

8. The video display system according to claim 6, wherein:
the display controlling the display of the video image of the first primary color based on a brightness of each color in the video image represented by an input video signal.

9. A video display system comprising:
plurality of primary color light sources; and
a spatial light modulator (SLM) for modulating an illumination light emitted from at least one of the plurality of primary light sources, wherein a display controller for, controlling a process to display a sequence of video images within a period of one frame comprising of each of a plurality of primary colors and each of a plurality of complementary colors to maximize a number of emissions of each of the plurality of primary color light sources and also displaying the video images of the colors of the plurality of primary colors and the plurality of complementary colors in sequence;
the display controller controls a period for displaying the video image of a first complementary color complementary to the first primary color between a display period P1 for the first video image of the first primary color and a display period P2 for the second video image of the first primary color, where the display periods P1 and P2 are obtained by dividing a display period with the period of one frame for the video image of the first primary color into two periods;
the display controller controls a period for displaying the video image of a second complementary color complementary to the second primary color between a display period P3 for the first video image of the second primary color and a display period P4 for the second video image of the second primary color, where the display periods P3 and P4 are obtained by dividing the display period for the video image of the second primary color within the period of one frame into two periods, and the display controller controls a period for displaying the video image of a third complementary color complementary to the third primary color between a display period P5 for the first video image of the third primary color and a display period P6 for the second video image of the third primary color, where the display periods P5 and P6 are obtained, by dividing the display period for the video image of the third primary color within the period of one frame into two periods.

10. A video display system, comprising:
an image processing unit receives continuously an input video signal including input frame signals for generating an output video signal having a higher frame rate than the input video signal; and
a spatial light modulator (SLM) applies the output video signal for modulating an illumination light, wherein the image processing unit further receives an individual frame signal of the input video signal into a frame for sequentially displaying a plurality of sub-frame video images in different colors within a display frame, and the image processing unit further generates the output video signal includes a frame signal for sequentially displaying the sub-frame video images of different colors, wherein
a number of gray scale levels of a sub-frame video image of each color of the output video signal is smaller, or smaller in a part of sub-frame images, than a number of gray scale levels of a sub-frame video image of each color of the input video signal.

11. The video display system according to claim 10, wherein:
the image processing unit receives the input video signal comprising the sub-frame video images further comprise at: least three colors of a red (R) color, a green (G) color and a blue (B) color, and
the image processing unit generates the output video signal comprising the sub-frame video images for displaying images of at least three primary colors of red, green and blue colors and three complimentary colors of cyan (C), magenta (M) and yellow (Y) colors.

12. The video display system according to claim 10, wherein:
the image processing units receives the input video signals comprising sub-frame video images for displaying at least three colors of a red (R)color, a green (G) color and a blue (B) color, and the image processing unit generates the output video signal includes a frame signal to sequentially display the sub-frame video images of at least the red, green and blue colors, and a frame signal to display the sub-frame video image of one color among a white (W) color, a gray (Gy) color and a black (K) color.

13. The video display system according to claim 10, wherein:
the image processing unit receives the video input signal including a frame signal to sequentially display sub-frame video images of a plurality of colors comprising sub-frame signals for at least three primary colors of a red (R) color, a green (G) color and a blue (B) color, and the image processing unit generates the output video signal includes a frame signal including sub-frame signals to sequentially display the sub-frame video images of at least the three primary colors and at least one complementary color, wherein the sub-frame video image of the at least one complementary color is sandwiched between the sub-frame video images of two adjacent primary colors for sequentially displaying a frame signal of the output video signal.

14. The video display system according to claim 13, wherein:
the image processing units generates the output video signals including the sub-frame signals of a first complementary color containing a first primary color subsequent to the sub-frame signal of the first primary color, and the sub-frame signal of a second primary color without the first complementary color subsequent to the sub-frame signal of the first complementary color.

15. The video display system according to claim 10, wherein:
the image processing unit generates the output video signal including at least a sub-frame signal for displaying a video image of one color having a fewer number of gray scale levels than the sub-frame signals for displaying video images of other colors.

16. The video display system according to claim 10, wherein:
the image processing unit generates the output video signal including at least a sub-frame signal for displaying a video image of one color having it larger number of times of displaying per frame period than the sub-frame signals for displaying video images of other colors.

17. The video display system according to claim 10, wherein;
the image processing unit generates the output video signal including at least a sub-frame signal for displaying a video image of one color having two-bit, or less, gray scale data per pixel.

18. The video display system according to claim 10, wherein:
the image processing unit generates the output video signal including one sub-frame signal for displaying video images of the plurality of colors sequentially having a sub-frame rate greater than or equal to 540 Hz.

19. The video display system according to claim 10, wherein:
the image processing unit generates the output video signal including o sub-frame signal for displaying video images of the plurality of colors sequentially having a sub-frame rate greater than or equal to 1080 Hz.

20. The video display system according to claim 10, wherein:
the SLM further comprising a mirror device implemented with a plurality of deflectable micromirrors.

21. A video display system comprising:
an image processing unit receives continuously an input video signal including input frame signals for generating an output video signal including output frame signals having a higher frame rate than the input frame signals; and
a spatial light modulator (SLM) applies the output frame signals for modulating an illumination light, wherein the input frame signal comprises signals to sequentially display sub-frame video images of a plurality of colors,
the image processing units generates the output video signal includes sub-frame signals of the plurality of colors applied to the SLM to carry out a modulation process to sequentially display the sub-frame video images of the plurality of colors; and
a number of gray scale levels of a sub-frame video image of each color of the output video signal is smaller, or smaller in a part of sub-frame images, than a number of gray scale levels of a sub-frame video image of each color of the input video signal.

22. The video display system according to claim 21 further comprising:
a plurality of semiconductor light sources emitting different color lights, wherein
each of the plurality of semiconductor light sources synchronously emits light with the sub-frame signals of the frame signals included in the output video signal for displaying video image of a same color synchronously.

23. The video display system according to claim 21 further comprising:
as plurality of semiconductor light sources emitting different color lights, wherein an emission cycle of each of the semiconductor light sources for emitting each color is shorter than a cycle of the sub-frame signal for displaying the sub-frame video images of the corresponding same colors according to a frame signal of the input video signal.

24. The video display system according to claim 21, wherein:
the image processing unit receives the sub-frame video signals for displaying the sub-frame video images of a plurality of colors further include a sub-frame video signal for displaying a sub-frame video image of a blue (B) color having a smaller number of gray scale levels than the number of gray scale levels for displaying the sub-frame video images of other colors.

25. The video display system according to claim 21, wherein:
the image processing unit receives the sub-frame video signals for displaying the sub-frame video images of a plurality of colors includes the sub-frame signals for displaying sub-frame video image of one color among white (W), gray (Gy) and black (K), with a smaller number of gray scale levels than the number of gray scale levels of the sub-frame signals for displaying video images of other colors.

26. The video display system according to claim 21, further comprising:
a plurality of semiconductor light sources for emitting different color lights, wherein said plurality of semiconductor light sources further emits a white illumination light by simultaneously emitting the plurality of semiconductor light sources.

27. The video display system according to claim 21, wherein:
a plurality of the semiconductor light sources of different colors emit a color-combined illumination light, wherein each of the plurality of semiconductor light sources for each of said colors are controlled to synchronously change an emission pattern according to the output sub-frame video signal for displaying sub-frame video image of a corresponding color.

28. The video display system according to claim 21, wherein:
the SLM further comprising a mirror device implemented with a plurality of deflectable micromirrors.

* * * * *